US010549254B2

(12) United States Patent
Jaffrey

(10) Patent No.: US 10,549,254 B2
(45) Date of Patent: Feb. 4, 2020

(54) SULFUR PRODUCTION

(71) Applicant: Breakthrough Technologies, LLC, Boston, MA (US)

(72) Inventor: Kamal Jaffrey, Winchester, MA (US)

(73) Assignee: Breakthrough Technologies, LLC, Boston, MA (US)

( * ) Notice: Subject to any disclaimer, the term of this patent is extended or adjusted under 35 U.S.C. 154(b) by 0 days.

(21) Appl. No.: 16/354,624

(22) Filed: Mar. 15, 2019

(65) Prior Publication Data

US 2019/0209998 A1    Jul. 11, 2019

Related U.S. Application Data

(62) Division of application No. 15/955,170, filed on Apr. 17, 2018, now Pat. No. 10,300,454.

(60) Provisional application No. 62/522,446, filed on Jun. 20, 2017, provisional application No. 62/486,489, filed on Apr. 18, 2017.

(51) Int. Cl.
*B01J 19/12* (2006.01)
*C01B 3/04* (2006.01)
*C01B 17/04* (2006.01)
*A62D 3/10* (2007.01)

(52) U.S. Cl.
CPC .............. *B01J 19/124* (2013.01); *A62D 3/10* (2013.01); *C01B 3/04* (2013.01); *C01B 17/0495* (2013.01); *B01J 19/126* (2013.01); *B01J 2219/0875* (2013.01); *B01J 2219/1215* (2013.01); *B01J 2219/1269* (2013.01); *B01J 2219/1293* (2013.01)

(58) Field of Classification Search
CPC .............. B01J 19/124; B01J 2219/1293; B01J 19/126; B01J 2219/1269; B01J 2219/1215; B01J 2219/0875; A62D 3/10; C01B 17/0495; C01B 3/04
USPC ............ 204/157.43, 157.44, 157.63; 422/24, 422/186.3
See application file for complete search history.

(56) References Cited

U.S. PATENT DOCUMENTS

| 3,756,934 A | 9/1973 | Sagan et al. |
| 3,933,608 A | 1/1976 | Haas et al. |
| 3,997,416 A | 12/1976 | Confer |
| 4,210,503 A | 7/1980 | Confer |

(Continued)

FOREIGN PATENT DOCUMENTS

| CN | 205730823 U | 11/2016 |
| CN | 106943856 A | * 7/2017 |

(Continued)

OTHER PUBLICATIONS

Derwent abstract of CN-106943856-A (Year: 2017).*

(Continued)

*Primary Examiner* — Nicholas A Smith
*Assistant Examiner* — Colleen M Raphael
(74) *Attorney, Agent, or Firm* — Mintz Levin Cohn Ferris Glovsky and Popeo, P.C.

(57) ABSTRACT

A system includes a first chamber, a second chamber, an ultraviolet light source and a microwave source. The first chamber includes an inlet. The second chamber is adjacent the first chamber and includes an outlet and a waveguide. The ultraviolet light source resides within the waveguide of the second chamber. Related apparatus, systems, techniques and articles are also described.

14 Claims, 48 Drawing Sheets

(56) References Cited

U.S. PATENT DOCUMENTS

| | | | |
|---|---|---|---|
| 5,211,923 A | | 5/1993 | Harkness et al. |
| 5,256,265 A | * | 10/1993 | Cha .................... B01D 53/8637 |
| | | | 204/157.3 |
| 5,377,426 A | * | 1/1995 | Pare ....................... B01J 19/126 |
| | | | 219/690 |
| 5,675,909 A | | 10/1997 | Pare |
| 5,732,476 A | * | 3/1998 | Pare, Jr. ................ B01J 19/126 |
| | | | 219/690 |
| 5,931,557 A | | 8/1999 | Danilychev |
| 6,242,752 B1 | | 6/2001 | Soma et al. |
| 6,610,990 B1 | | 8/2003 | Moruzzi |
| 7,220,391 B1 | | 5/2007 | Huang et al. |
| 7,390,500 B2 | | 6/2008 | Muller |
| 7,455,828 B2 | | 11/2008 | Selinger et al. |
| 7,608,557 B2 | | 10/2009 | Tohji et al. |
| 8,328,906 B2 | | 12/2012 | Miller et al. |
| 8,354,432 B2 | | 1/2013 | Carter et al. |
| 8,734,654 B2 | | 5/2014 | Foret |
| 8,747,889 B2 | | 6/2014 | Gale et al. |
| 2001/0025781 A1 | * | 10/2001 | Linkous .................... C01B 3/04 |
| | | | 204/157.4 |
| 2004/0036034 A1 | | 2/2004 | Hur et al. |
| 2004/0234584 A1 | | 11/2004 | Muller et al. |
| 2005/0226922 A1 | | 10/2005 | Ameri et al. |
| 2006/0116279 A1 | | 6/2006 | Kogoi et al. |
| 2007/0265307 A1 | | 11/2007 | Cavezza et al. |
| 2007/0284315 A1 | | 12/2007 | Collins et al. |
| 2008/0131337 A1 | | 6/2008 | Lucas et al. |
| 2009/0118400 A1 | | 5/2009 | Sawaguchi |
| 2009/0162259 A1 | | 6/2009 | Nowak et al. |
| 2009/0314185 A1 | | 12/2009 | Whellock |
| 2011/0111013 A1 | | 5/2011 | Salman et al. |
| 2011/0151003 A1 | | 6/2011 | Jackson et al. |
| 2013/0023448 A1 | | 1/2013 | Glasscott et al. |
| 2013/0273119 A1 | | 10/2013 | Engqvist et al. |
| 2014/0005617 A1 | | 1/2014 | Choi et al. |
| 2014/0069011 A1 | | 3/2014 | Yoon et al. |
| 2014/0243765 A1 | | 8/2014 | Yu et al. |
| 2014/0271799 A1 | | 9/2014 | Venkatraman et al. |
| 2015/0218180 A1 | | 8/2015 | McCarthy et al. |
| 2016/0355411 A1 | | 12/2016 | Fahs, II |
| 2018/0297004 A1 | | 10/2018 | Jaffrey |

FOREIGN PATENT DOCUMENTS

| | | |
|---|---|---|
| WO | WO-0015734 A1 | 3/2000 |
| WO | WO-2007102701 A1 | 9/2007 |
| WO | WO-2015191554 A1 | 12/2015 |

OTHER PUBLICATIONS

Partial International Search Report and Provisional Written Opinion corresponding to International Patent Application No. PCT/US2018/027877, dated Jul. 9, 2018 (10 pages).

* cited by examiner

SULFUR PRODUCTION

CROSS-REFERENCE TO RELATED APPLICATIONS

The present application is a divisional of U.S. patent application Ser. No. 15/955,170, entitled "SULFUR PRODUCTION," filed Apr. 17, 2018, which claims priority under 35 U.S.C. § 119(e) to U.S. Patent Provisional Application No. 62/486,489, entitled "SULFUR PRODUCTION," filed Apr. 18, 2017, and U.S. Patent Provisional Application No. 62/522,446, entitled "SULFUR PRODUCTION," filed Jun. 20, 2017, each of which is incorporated by reference herein in its entirety.

TECHNICAL FIELD

The subject matter described herein relates to producing sulfur and/or hydrogen from a sulfur compound.

BACKGROUND

Crude oil or petroleum is generally processed and refined in an industrial refinery and refined petroleum products such as such as asphalt base, fuel oil, diesel, gasoline, kerosene and liquefied petroleum gas and the like can be separated based on their different boiling points. The petroleum products mostly contain varieties of hydrocarbons having different carbons numbers or structures and also contain oxygen compounds such as phenol, ketones, and carboxylic acids, nitrogen compounds such as indole, acridine, hydroxyquinolino, and aniline, sulfur compounds thiol, sulfide, disulfide, tetrahydrothiphene, thiophene, alkylthiophene, benzothiophene, dibenzothiophene, alkyl dibenzothiophene, transition metal compounds containing nickel, vanadium, molybdenum and the like, and inorganic salts.

Sulfur compound contained in the petroleum can be released as hydrogen sulfide gas ($H_2S$) that is also included as vast majority in natural gases and the hydrogen sulfide gas are processed and converted into elemental sulfur and hydrogen gas, which is known as "desulfurization". In a certain example in the related art, Claus process produces elemental sulfur from hydrogen sulfide gas released from the refinery process by combustion and catalytic chemical reactions.

However, for conventional desulfurization processes, large and complex facilities are necessary and the chemical reactions during desulfurization are corrosive to those facilities. Moreover, efficiency of the desulfurization processes and operations is not sufficient to yield productivity. Further, other raw materials may be used for the current conventional desulfurization.

SUMMARY

In an aspect, a system includes a first chamber, a second chamber, an ultraviolet light source and a microwave source. The first chamber includes an inlet. The second chamber is adjacent the first chamber and includes an outlet and a waveguide. The ultraviolet light source resides within the waveguide of the second chamber.

One or more of the following features can be included in any feasible combination. For example, the microwave source is configured to radiate microwave energy into the first chamber and the waveguide of the second chamber such that the microwave energy contacts the ultraviolet light source. The ultraviolet light source includes an internal gas that generates ultraviolet light upon contact with the microwave energy. The waveguide can include an end configured such that the microwave energy forms a standing wave within the waveguide. The second chamber can further include a first electrode configured to have a negative charge; and a second electrode configured to have a positive charge, the first electrode and the second electrode being external to the ultraviolet light source and internal to the waveguide.

The system can include a tube assembly within the waveguide and containing the ultraviolet light source, a wall of the tube assembly can be transparent to ultraviolet light and microwave energy. The first chamber can be located between the microwave source and the second chamber such that the microwave energy is generated by the microwave source and passes through the first chamber to the second chamber.

The system can include a plurality of tube assemblies adjacent the first chamber, each of the plurality of tube assemblies including a tube assembly outlet, each tube assembly including a wall that is transparent to ultraviolet light and microwave energy. The system can include a plurality of ultraviolet light sources, each residing within a respective one of the tube assemblies. The microwave source can be configured to radiate the microwave energy into the first chamber and into the plurality of tube assemblies such that the microwave energy contacts the plurality of ultraviolet light sources. The plurality of ultraviolet light sources can include the internal gas that generates ultraviolet light upon contact with the microwave energy.

The system can include a hydrogen sulfide source coupled to the inlet. The system can include a gas-solid separator coupled to the outlet and configured to separate sulfur from hydrogen gas.

The ultraviolet light source can radiate the ultraviolet light having a wavelength ranges from about 280 nm to 300 nm. The second chamber can be elongate and can extend along a primary axis. The ultraviolet light source can be elongate along the primary axis and can reside within the second chamber along the primary axis. The second chamber can include a first electrode configured to have a negative charge and a second electrode configured to have a positive charge. The first electrode and the second electrode can be external to the ultraviolet light source and internal to the waveguide. The first electrode can be elongate along the primary axis and can be arranged above the ultraviolet light source. The second electrode can be elongate along the primary axis and can be arranged below the ultraviolet light source.

The second chamber can form a hydrocyclone. The light source can reside on a vortex finder located within the hydrocyclone.

In another aspect, hydrogen sulfide is provided into a first chamber adjacent a second chamber and a microwave source radiating microwave energy into the first chamber. The hydrogen sulfide is contacted with microwave energy generated by a microwave source. The hydrogen sulfide is provided to the second chamber. The second chamber includes an outlet and a waveguide. An ultraviolet light source resides within the waveguide of the second chamber. The hydrogen sulfide is contacted with ultraviolet light within the second chamber. The ultraviolet light is generated by the ultraviolet light source. The microwave source is configured to radiate the microwave energy into the first chamber and the waveguide of the second chamber such that the microwave energy contacts the ultraviolet light source. The ultraviolet light source includes an internal gas that generates the ultraviolet light upon contact with the microwave energy. Contacting of the hydrogen sulfide with the ultraviolet light results in hydrogen gas and sulfur.

One or more of the following features can be included in any feasible combination. For example, the waveguide can include an end configured such that the microwave energy forms a standing wave within the waveguide. The second chamber can include a first electrode configured to have a negative charge and a second electrode configured to have a positive charge, the first electrode and the second electrode being external to the ultraviolet light source and internal to the waveguide. The hydrogen sulfide can be provided to a plurality of tube assemblies adjacent the first chamber, each of the plurality of tube assemblies including a tube assembly outlet, a plurality of ultraviolet light sources each residing within a respective one of the plurality of tube assemblies. The microwave source can be configured to radiate the microwave energy into the first chamber and into the plurality of tube assemblies such that the microwave energy contacts the plurality of ultraviolet light sources. The plurality of ultraviolet light sources can include the internal gas that generates ultraviolet light upon contact with the microwave energy.

The sulfur can be separated, using a gas-solid separator, from the hydrogen gas. The ultraviolet light source can radiate the ultraviolet light having a wavelength ranges from about 280 nm to 300 nm. The second chamber can be elongate and can extend along a primary axis. The ultraviolet light source can be elongate along the primary axis and can reside within the second chamber along the primary axis. The second chamber can include a first electrode configured to have a negative charge; and a second electrode configured to have a positive charge, the first electrode and the second electrode being external to the ultraviolet light source and internal to the waveguide. The first electrode can be elongate along the primary axis and can be arranged above the ultraviolet light source. The second electrode can be elongate along the primary axis and can be arranged below the ultraviolet light source.

A temperature for decomposing the hydrogen sulfide can be performed at a temperature range of about 0 to 125 degrees Celsius. The hydrogen sulfide can be provided into the first chamber at a pressured of 0.1 to 10 atm. The ultraviolet light and the microwave energy can be contacted with the hydrogen sulfide for about 0.01 seconds to 15 minutes. The hydrogen sulfide can be collected from natural gas or petroleum oil can be processed to generate the hydrogen sulfide.

In yet another aspect, a system includes a first heat exchanger, a second heat exchanger, a first separator, a third heat exchanger, a fourth heat exchanger, and a second separator. The first heat exchanger includes a first input, a second input, a first output, and a second output. The second heat exchanger includes a third input, a fourth input, a third output, and a fourth output. The first output is operably coupled to the third input. The first separator is operably coupled between the third output and the second input. The third heat exchanger includes a fifth input, a sixth input, a fifth output and a sixth output. The fifth input is operably coupled to the first separator. The fourth heat exchanger includes a seventh input, an eighth input, a seventh output, and an eighth output. The seventh input is operably coupled to the fifth output. The second separator is operably coupled between the seventh output and the sixth input and between the seventh output and the fourth input.

One or more of the following features can be included in any feasible combination. For example, the first heat exchanger can be configured to transfer heat between a stream provided to the first input and a stream provide to the second input. The stream provided to the first input can exit the first output and the stream provided to the second input can exit the second output. The second heat exchanger can be configured to transfer heat between a stream provided to the third input and a stream provide to the fourth input. The stream provided to the third input can exit the third output and the stream provided to the fourth input can exit the fourth output. The third heat exchanger can be configured to transfer heat between a stream provided to the fifth input and a stream provide to the sixth input. The stream provided to the fifth input can exit the fifth output and the stream provided to the sixth input can exit the sixth output. The fourth heat exchanger can be configured to transfer heat between a stream provided to the seventh input and a stream provide to the eighth input. The stream provided to the seventh input can exit the seventh output and the stream provided to the eighth input can exit the eighth output.

The first separator can be configured to separate liquid and gas and the second separator can be configured to separate liquid and gas.

The system can include a cooling unit operably coupled to the eighth input and the eighth output. The system can include a gas source coupled to the first input and providing a gas including hydrogen sulfide, carbon dioxide, and methane to the first input. The system can include a methane holding unit operatively coupled to the sixth output. The system can include a carbon dioxide holding unit operatively coupled to the fourth output. The system can include a hydrogen sulfide holding unit operatively coupled to the second output.

The second heat exchanger and the first separator can comprise a first condenser. The fourth heat exchanger and the second separator can comprise a second condenser. The system can include a photo-reactor as described above in which the second output is operatively coupled to the inlet of the first chamber.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
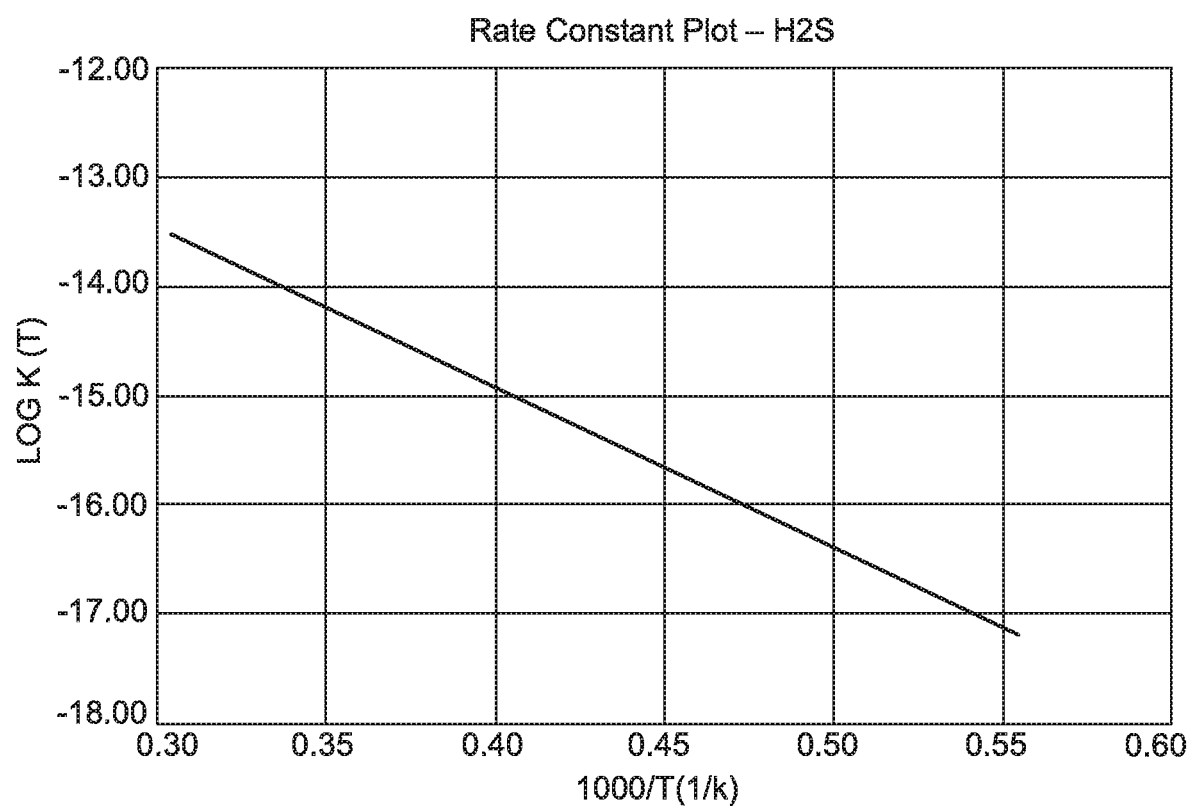
FIG. 1 shows a graph of rate constant for dissociating hydrogen sulfide ($H_2S$) into hydrogen gas and sulfur.

The term "reactor" as used herein refers to a chamber or vessel where a chemical reaction may occur. The reactor may be provided to maintain a certain volume for the reaction, and further provided with a function to control a temperature and/or a pressure of the reactions.

The term "sulfur" and "sulfur product" as used herein, refers to compounds comprising elemental sulfur. In certain embodiments, the elemental sulfur may exist in solid state, polyatomic molecules such as $S_6$, $S_7$, $S_8$, $S_9$ or Sit, $S_{18}$ in normal conditions.

The term "dissociation" refers to bond breaking between at least two atoms.

The term "bond dissociation energy" refers to an amount of energy required to breaking a bond between at least two atoms.

The term "radiating" refers to emitting an energy in form of light or heat to an object.

The terminology used herein is for the purpose of describing particular embodiments only and is not intended to limit the subject matter. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present subject matter can include producing sulfur or sulfur product that includes substantially homogenous elemental sulfur. The elemental sulfur may be obtained from desulfurization process, for example, by removing sulfur containing compounds from natural gas, coal, crude oil or petroleum, and converting the removed sulfur containing compounds into elemental sulfur. The current subject matter is not limited to processing fuels but can extend to other applications, such as desulfurizing within a molasses processing facility, which can contain large amounts of hydrogen sulfide, and biogas from a waste treatment facility.

In some implementations, desulfurization may be performed by radiating hydrogen sulfide with microwaves and UV light to decompose hydrogen sulfide into hydrogen and elemental sulfur. The microwaves can serve to thermally excite the hydrogen sulfide, thereby beneficially causing bond vibration and increasing bond length, and the UV light can cause bond disassociation. As a result, the present systems and methods do not involve ionization, but rather involve cleaving the hydrogen sulfide bonds. The thermal excitation of the hydrogen sulfide advantageously increases the ability of the hydrogen sulfide to absorb the UV light, resulting in greater bond dissociation and consequently, elemental sulfur production. Furthermore, the thermal excitation of the hydrogen sulfide provides the ability to effect bond disassociation using higher UV wavelengths, which have greater bond penetration power, and therefore, result in a more effective cleaving of the hydrogen bonds that would not otherwise occur with lower UV wavelengths.

Furthermore, in some implementations, the microwaves can form a standing wave, which, due to the polarity of hydrogen sulfide, can adjust molecular position of the hydrogen sulfide thereby increasing effective UV absorption area, thereby increasing elemental sulfur production, compared to when a standing wave is not used. An electrodeless UV lamp can be used as the UV light source and the UV lamp can be driven by the microwave source that is also radiating the hydrogen sulfide.

Hydrogen sulfide ($H_2S$) gas can be abundantly produced during oil refinery processes or can be collected as components of natural gases. Accordingly, hydrogen sulfide may be provided useful resources for sulfur production. Hydrogen sulfide may be decomposed into hydrogen gas and elemental sulfur using the present system and methods resulting in higher yields, as compared to conventional systems and methods. This is because, as compared to conventional systems and methods, the present systems and methods can dissociate S—H bonds at a faster rate, thereby decreasing retention time, and dissociate S—H bonds using lower amounts of energy. As a result, the formation of other species during bond disassociation can be reduced or minimized.

Hydrogen sulfide comprises two S—H bonds which can be dissociated upon energy input. The hydrogen sulfide bond in $H_2S$ may be broken or dissociated sequentially. For example, a first bond may be broken when sufficient energy greater than the first bond dissociation energy, e.g., 381 KJ/mol at 298K, is applied, and a second may be broken when the energy greater than the second bond dissociation energy, e.g. 344 KJ/mol at 298K, is applied.

$$H_2S(g) \rightarrow S(s) + H_2(g) \qquad (1)$$

$$H_2S \rightarrow H + SH \quad 381 \text{ KJ/mol} \qquad \text{(2) first S—H bond breaking (at a temperature of 298K)}$$

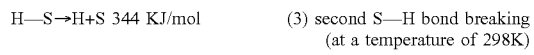

$$H-S \rightarrow H + S \quad 344 \text{ KJ/mol} \qquad \text{(3) second S—H bond breaking (at a temperature of 298K)}$$

In FIG. 1, theoretical rate constant for the reaction (1) is shown within various temperature ranges. For instance, the rate constant may be determined by activation energy for the decomposition reaction of the hydrogen sulfide at certain temperature conditions.

However, without wishing to be bound to the theory, the first and second dissociation of the hydrogen sulfide bonds may be initiated and performed by supplying sufficient energy to the hydrogen sulfide reactant molecules. The energy for dissociating S—H bonds of hydrogen sulfide may be supplied by radiating light. For example, the light radiation may be within ultraviolet light range. The following Table 1 list energy of UV light at various wavelengths.

| Type of UV light | Wavelength λ (nm) | energy (kJ) |
|---|---|---|
| UV-C | 100 | 1196.66 |
| | 110 | 1087.87 |
| | 120 | 997.21 |
| | 130 | 920.50 |
| | 140 | 854.75 |
| | 150 | 797.77 |
| | 160 | 747.91 |
| | 170 | 703.92 |
| | 180 | 664.81 |
| | 190 | 629.82 |
| | 200 | 598.33 |
| | 210 | 569.84 |
| | 220 | 543.93 |
| | 230 | 520.29 |
| | 240 | 498.61 |
| | 250 | 478.66 |
| | 260 | 460.25 |
| | 270 | 443.21 |
| | 280 | 427.38 |
| UV-B | 290 | 412.64 |
| | 300 | 398.89 |
| | 310 | 386.02 |
| | 320 | 373.95 |
| UV-A | 330 | 362.62 |
| | 340 | 351.96 |
| | 350 | 341.90 |
| | 360 | 332.40 |
| | 370 | 323.42 |
| | 380 | 314.91 |
| | 390 | 306.83 |
| | 400 | 299.16 |

UV light having sufficient energy to break the first and the second S—H bond of hydrogen sulfide light may be irradiated for suitably time, until desired amount or yield of producing sulfur is obtained. For example, UV radiation may be performed for about 0.01 seconds to 15 min, about 1 second to 30 seconds, or about 0.01 seconds to 15 seconds. It is also contemplated that the UV radiation may be performed for an amount of time that does not fall outside any of these recited ranges.

Further, each dissociation of S—H bonds may be initiated and performed in various temperature ranges. Preferably, the temperature may range from about 27° C. to 35° C., from about 20° C. to 40° C., or from about 0° C. to 125° C. For example, the bond dissociation energy of hydrogen sulfide or the activation energy for initiating the reaction may vary in different temperature ranges and the energy required for reactions (1) to (3) may be suitably determined based on reaction temperature. It is also contemplated that the temperature does not fall outside any of these recited ranges.

Hydrogen sulfide for producing the sulfur may be substantially homogeneous homogeneity greater than about 80 vol %, 85 vol %, 90 vol %, 95 vol %, or 99 vol %. In some embodiments, the hydrogen sulfide may be compressed to have a pressure of about 1 bar to 200 bar. In certain embodiments, the hydrogen sulfide is compressed to have a pressure of about 0.1 atm to 10 atm, of about 0.1 atm to 1 atm, or of about 0.1 atm to 0.5 atm. It is also contemplated that the pressure does not fall outside any of these recited ranges.

In some embodiments, the hydrogen sulfide may be heated or supplied in the form of hot gas (generated via microwave) depending at least in part on the feed temperature of the hydrogen sulfide into the system. In certain embodiments, the hydrogen sulfide is heated or suppled as a hot gas at a temperature of about 25° C. to 200° C., of about 80° C. to 120° C., of about 100° C. It is also contemplated that the temperature does not fall outside any of these recited ranges. It is further contemplated that the temperature can be between any of these recited values.

In other embodiments, the hydrogen may be heated or supplied in the form of a vapor.

The decomposed hydrogen sulfide produces hydrogen gas and elemental sulfur. The sulfur product may be obtained in a solid form having molecular formula such as $S_6$, $S_7$, $S_8$, $S_9$ or Sit, $S_{18}$ after the reaction is completed. The sulfur product may be substantially homogeneous and include homogeneity greater than about 80 atom %, 85 atom %, 90 atom %, 95 atom %, or 99 atom %. Preferably, the sulfur product may be in forms of particles having an average diameter less than about 5 mm, less than about 1 mm, less than about 900 μm, less than about 800 μm, less than about 700 μm, less than about 600 μm, less than about 500 μm or of about 100 μm to 500 μm. In addition, hydrogen gas may be collected as being separated from the sulfur product and may have homogeneity greater than about 80 vol %, 85 vol %, 90 vol %, 95 vol %, or 99 vol %. In some implementations, the sulfur can be amorphous.

The present subject matter can include a method of producing sulfur or elemental sulfur by desulfurization process. The method can include providing hydrogen sulfide into a reactor and decomposing the hydrogen sulfide.

The hydrogen sulfide may be supplied continuously. In some embodiments, the hydrogen sulfide gas may be supplied or provided to maintain the partial pressure thereof in the reactor of about 0.1 atm to 10 atm, of about 0.1 atm to 1 atm, or of about 0.1 atm to 0.5 atm. It is also contemplated that the pressure does not fall outside any of these recited ranges.

Alternatively, the initial pressure of the hydrogen sulfide in the reactor may be of about 0.1 atm to 10 atm, of about 0.1 atm to 1 atm, or of about 0.1 atm to 0.5 atm. It is also contemplated that the initial pressure does not fall outside any of these recited ranges. It is further contemplated that the initial pressure can be between any of these recited values.

The reactor may have a temperature range of about 27° C. to 35° C., from 20° C. to 40° C., or from about 0° C. to about 125° C., or alternatively, the decomposition of the hydrogen sulfide may be performed at a temperature range of 27° C. to 35° C., from 20° C. to 40° C., or from about 0° C. to about 125° C. For example, the reactor may be heated using flame, electric furnace, air stream or the like. In one embodiment, the decomposition of the hydrogen sulfide may be performed at about ambient temperature. It is also contemplated that the temperature does not fall outside any of these recited ranges. In other embodiments, the temperature may be between any of these recited values.

Energy can be supplied to decompose the hydrogen sulfide in the reactor. The energy source for decomposition or dissociating the hydrogen sulfide may be UV light. The UV light may have a wavelength ranging from about 100 nm to about 300 nm, from about 200 nm to about 300 nm, from about 280 nm to about 300 nm, or from about 290 nm to about 300 nm. UV light may be radiated for about 0.01 seconds to 15 min, about 1 second to 30 seconds, or about 0.01 seconds to 15 seconds. It is also contemplated that the UV light may be radiated for a period of time that does not fall outside any of these recited time ranges. It is further contemplated that the UV light may be radiated for a period of time between any of these recited values.

Figure 2:
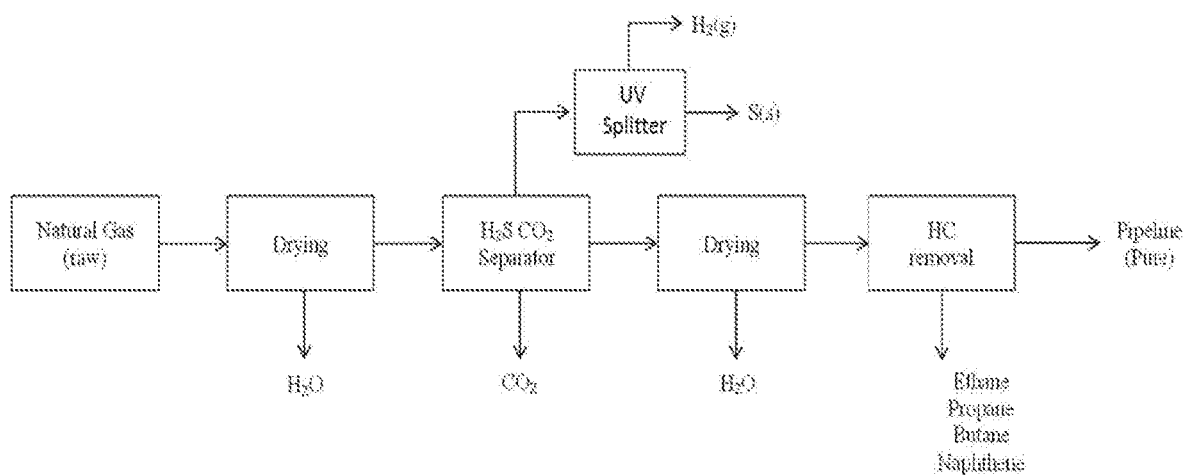
FIG. 2 shows exemplary processes of producing sulfur from natural gas according to an exemplary embodiment of the present subject matter.

In an exemplary embodiment of the present subject matter, a method of producing sulfur from natural gas is provided. As shown in FIG. 2, natural gases (e.g. methane mixtures) containing large quantities of hydrogen sulfide ($H_2S$) or other sulfur compounds may be desulfurized. The desulfurization method may not be particularly limited and any methods generally used in the oil refinery can be used without limitation.

The natural gas may be processed, e.g. drying, to remove water or water vapor ($H_2O$), and further processed to separate hydrogen sulfide and carbon dioxide ($CO_2$). While not necessary, this separation of the hydrogen sulfide from water vapor and carbon dioxide is found to be beneficial in that it minimizes the presence of oxygen during the present desulfurization process. Without wishing to be bound to a single theory, it is believed that the presence of oxygen during the desulfurization process negatively impacts the efficiency of the present desulfurization process. The separated hydrogen sulfide may be transferred to a reaction chamber where decomposition reaction may occur. The hydrogen sulfide may be present in hot vapor or gas phase at the controlled temperature and partial or internal pressure thereof. The decomposition may be performed by radiating UV light until desired product yield is obtained.

Figure 3:
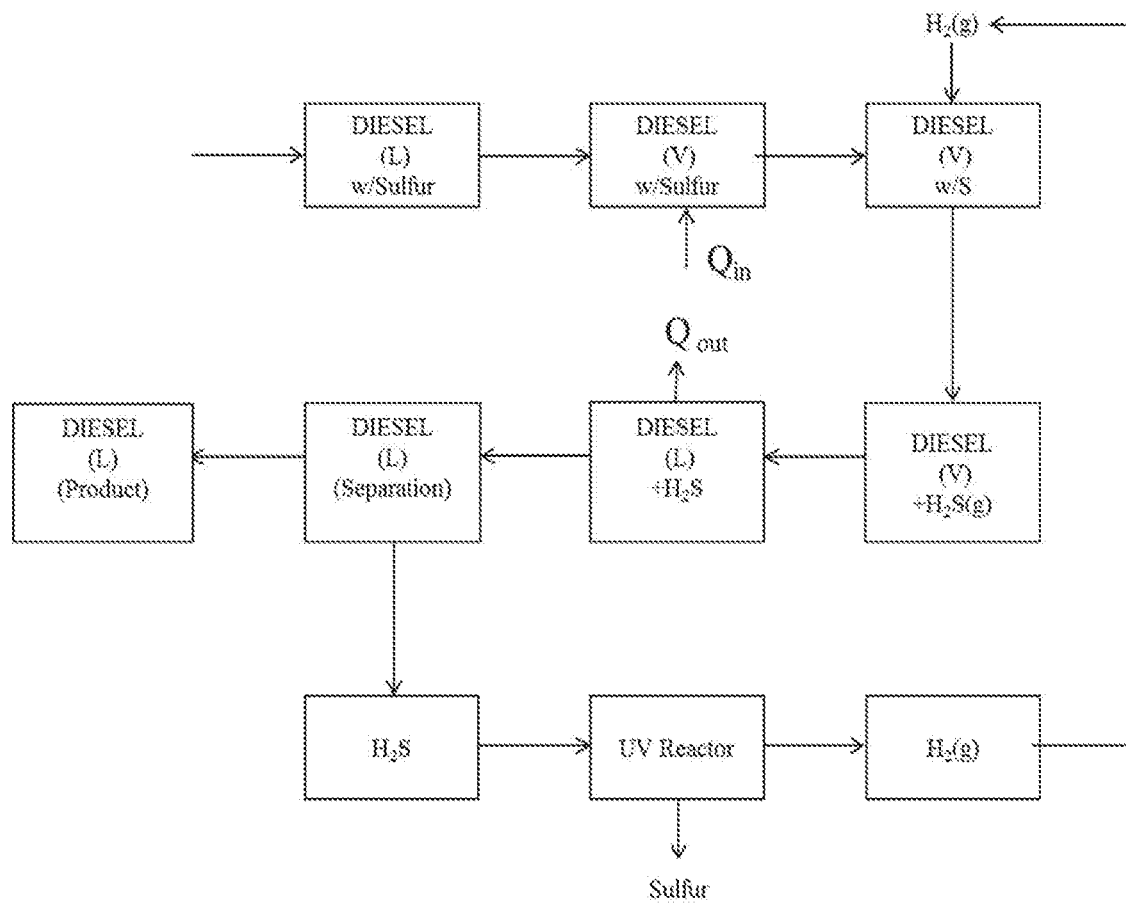
FIG. 3 shows exemplary processes of producing sulfur from diesel or diesel vapor according to an exemplary embodiment of the present subject matter.

In an exemplary embodiment of the present subject matter, a method of producing sulfur from diesel (petroleum oil) is provided. As shown in FIG. 3, diesel oil containing sulfur compounds may be desulfurized as described above. For example, diesel may be vaporized and by adding hydrogen gas, hydrogen sulfide may be produced from the sulfur compounds in the diesel vapor, the hydrogen sulfide gas may be separated subsequently. The separated hydrogen sulfide may be transferred to a reactor for producing sulfur product. The hydrogen sulfide may be present in hot vapor or gas phase at the controlled temperature and partial or internal pressure thereof. The decomposition may be performed by radiating UV light until desired product yield is obtained.

UV light radiation for decomposing hydrogen sulfide gas may also be continuously controlled based on initial reaction condition, e.g. temperature and pressure of initial reactant gas (hydrogen sulfide), or by monitoring product yield. UV light radiating device may be continuously controlled by adjusting parameters such as time, intensity or wavelength.

The method of producing sulfur may include separating and collecting the sulfur product from the hydrogen gas after bond disassociation. The hydrogen gas may be ventilated, e.g., via outlet of the reactor, or the hydrogen gas may be filtered using a gas permeable membrane. In some embodiments, the hydrogen gas may be separately collected and recycled.

The method of producing sulfur may further comprise cooling the sulfur product. The cooled sulfur product may be stabilized and particulated. For example, thus produced sulfur may be formed in particles as described above, e.g., microparticles, such that the processed sulfur product can be used as raw materials for various chemical reactions and processes.

Figure 8:
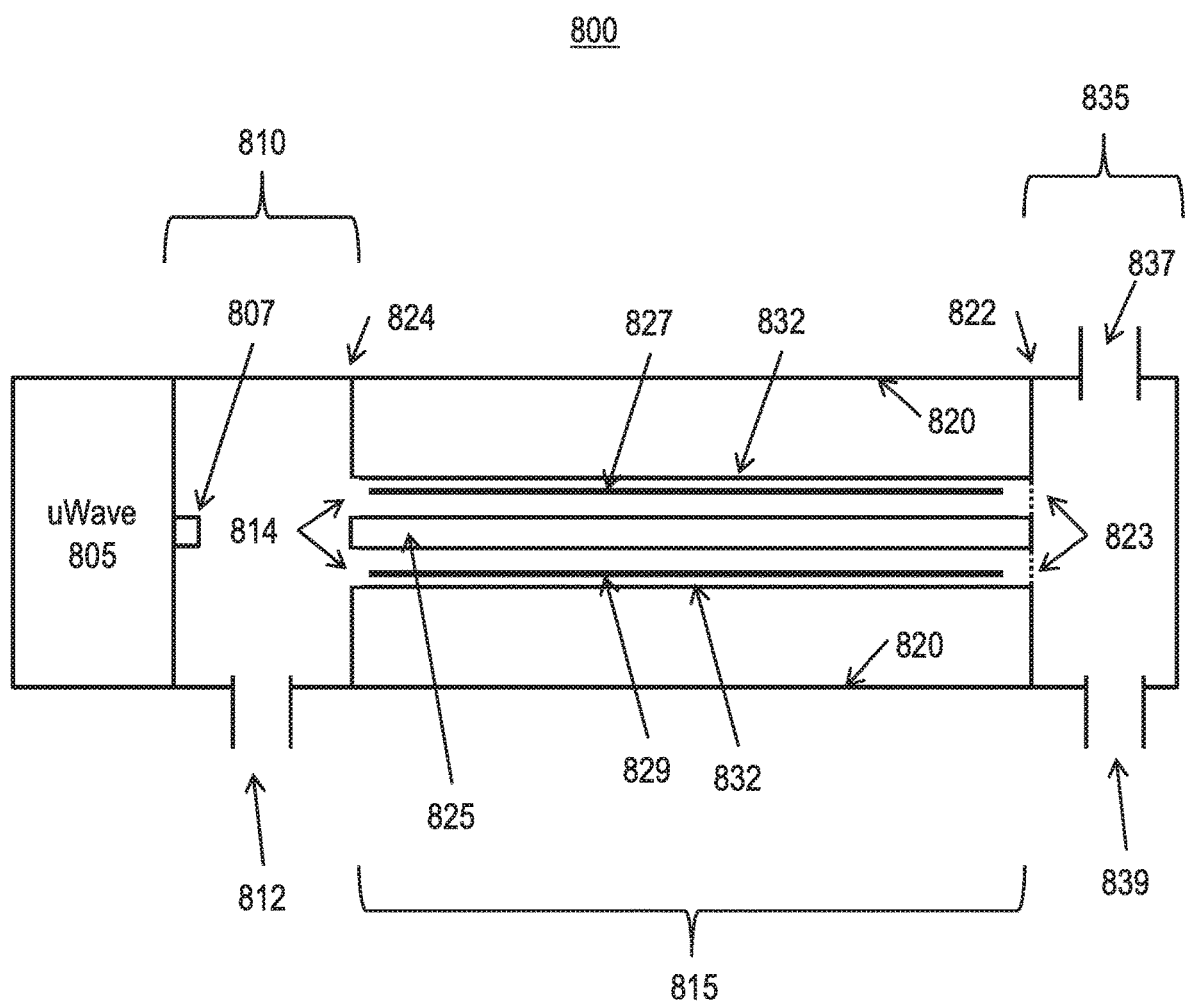
FIG. 8 is a longitudinal cross section of an example photo-reactor for decomposing hydrogen sulfide into hydrogen gas and sulfur.

FIG. 8 is a longitudinal cross section of an example photo-reactor 800 for decomposing hydrogen sulfide into hydrogen gas and sulfur. The photo-reactor 800 can be coupled to a hydrogen sulfide source (e.g., in a hydrocarbon processing facility) and/or coupled to a gas-solid separator to separate sulfur from hydrogen gas. The photo-reactor 800 can include a microwave source 805, a first chamber 810, a second chamber 815, and a third chamber 835. The photo-reactor 800 can be formed in a generally cylindrical shape (e.g., a tube).

The first chamber 810 can include an inlet 812 for receiving an input stream including hydrogen sulfide. The first chamber 810 can be adjacent the second chamber 815 and the input stream can include hydrogen sulfide and can flow from the first chamber 810 into the second chamber 815 through an opening 814. The first chamber 810 can be formed of a suitable material for petroleum processing such as stainless steel.

The second chamber 815 can be elongate and cylindrical along a primary axis. The second chamber 815 can include a waveguide 820, which, in the illustrated example, is formed by a wall of the second chamber 815. The second chamber 815 is thus formed of a suitably conductive material such as stainless steel. In some implementations, the waveguide 820 may be formed by another structure. The waveguide 820 includes a first waveguide end 822 at an end of the second chamber 815 that is non-adjacent the first chamber 810, and a second waveguide end 824 that is adjacent the first chamber 810. As illustrated in FIG. 8, the first waveguide end 822 is integral with an end of the second chamber 815. The second chamber 815 can include an outlet 826 that is non-adjacent the first chamber 810.

Figure 9:
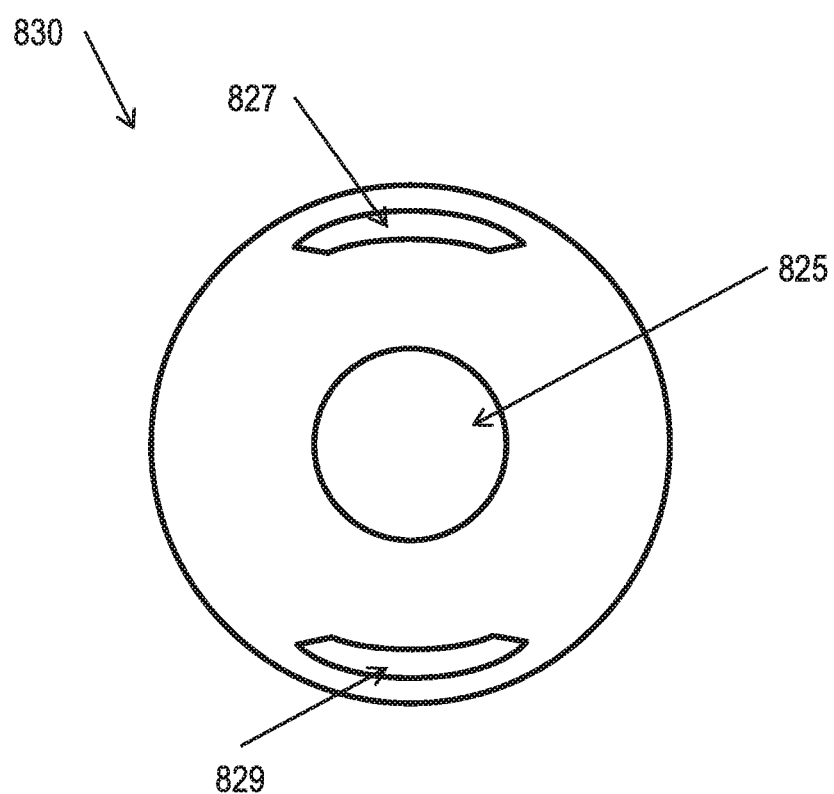
FIG. 9 is a cross-sectional view of a tube assembly.

A tube assembly 830 can reside within the second chamber 815 and can extend along a primary axis of the second chamber 815. An ultraviolet light source 825 can also reside within the tube assembly 830. In addition the ultraviolet light source 825, a negative electrode 827 and a positive electron 829 can reside within the tube assembly 830. The negative electrode 827 and the positive electrode 829 can be external to the ultraviolet light source 825 and internal to the waveguide 820. The negative electrode 827 and positive electrode 829 can be plate shaped. The negative electrode 827 can be located or arranged above the ultraviolet light source 825 and the positive electrode 829 can be located or arranged below the ultraviolet light source 825. FIG. 9 is a cross-sectional view of the tube assembly 830. The cross-sectional view illustrated in FIG. 9 is perpendicular to the cross-sectional view of FIG. 8.

In other embodiments, in addition to the ultraviolet light source 825, a proton exchange membrane can reside within the tube assembly 830.

In some implementations, a wall 832 of the tube assembly 830 is transparent to both ultraviolet light and microwave energy. The wall 832 may be formed of a suitably transparent material such as quartz. In some implementations, the wall 832 extends from an inner surface to the waveguide 820. The quartz or other suitably appropriate material (e.g., glass) can provide structural support as well as be transparent to ultraviolet light and microwave energy.

The ultraviolet light source 825 can include an electrodeless lamp, which can include a gas discharge lamp in which the power required to generate light is transferred from outside the lamp to gas inside via an electric or magnetic field. This is in contrast with a gas discharge lamp that uses internal electrodes connected to a power supply by conductors that pass through the lamp. There can be a number of advantages to an electrodeless lamp, including extending lamp life because electrodes can fail, and power savings because internal gases that are higher efficiency can be used that would react if in contact with an electrode.

Further, one of ordinary skill will appreciate that the use of an electrodeless lamp, as opposed to plasma, in the systems and method presented herein can have advantages. For example, compared to plasma, one advantage to using the electrodeless lamp is the cost-savings because plasma is highly dependent on, and therefore consumes a substantial amount of, electricity. Another advantage can include the extended lifetime of the electrodeless lamp relative to plasma. Unfortunately, due to high temperatures that can be generated by the plasma arc, decreased arc mobility, etc., the electrodes can prematurely fail or erode during use, thereby decreasing electrode lifetime. Moreover, using plasma as a radiation source can have its own drawbacks, such as ignition, sustainability, and confinement.

The ultraviolet light source 825 can generate light within a range of wavelengths, for example, between 100 um and 300 um, between 280 um and 300 um, and the like. The gas contained in the lamp can include: argon, mercury, and iodine. In some implementations, the lamp can include argon at 25 KPa and 20 mg of mercury. Other gases, amounts, and pressures are possible.

The second chamber 815, ultraviolet light source 825, negative electrode 827, and positive electrode 829 can be elongate and extend along the primary axis of the second chamber 815.

The third chamber 835 can be adjacent the second chamber 815 and can include two outlets (first outlet 837 and second outlet 839). The third chamber 835 can serve as an initial separation space for extracting hydrogen gas through the first outlet 837 and sulfur and any other materials present through the second outlet 839. In some implementations, the third chamber 835 can include a gas-solid separator such as a cyclone and need not be integral with the second chamber 815.

The microwave source 805 can be adjacent the first chamber 810 and can include an emitter 807 for radiating microwave energy. The microwave source 805 can emit electromagnetic energy at frequencies between 200 MHz and 300 GHz (corresponding wavelengths between 100 cm and 0.1 cm). In one implementation, the microwave source 805 emits electromagnetic energy at frequencies between about 900 MHz and 2.45 GHz. In some implementations, the microwave source 805 emits electromagnetic energy at a frequency of about 2.45 GHz. It is also contemplated that the present microwave source can emit microwaves at a frequency between any of these recited values.

The microwave source 805 can be arranged to radiate microwave energy into the first chamber 810 and the waveguide 820 of the second chamber 815 and to contact the ultraviolet light source 825. When the microwave energy contacts the ultraviolet light source 825, the ultraviolet light source 825 can generate ultra violet light. In some implementations, the microwave source 805 can be arranged to radiate microwave energy so that the microwave energy passes through the first chamber 810 to reach the second chamber 815. The microwave energy produced by the microwave source 805 can thermally excite hydrogen sulfide residing within the first chamber 810 and simultaneously drive/excite the ultraviolet light source 825. Such an arrangement can be efficient in that little radiated energy is lost because it can serve to both thermally excite the hydrogen sulfide and generate the ultraviolet light, both of which contribute to bond disassociation (e.g., creating hydrogen gas and elemental sulfur from hydrogen sulfide). Moreover, this arrangement can enable tuning of the microwave source such that only the amount of energy needed for bond disassociated is input to the system with little energy wasted to unnecessary thermal heating.

Figure 10:
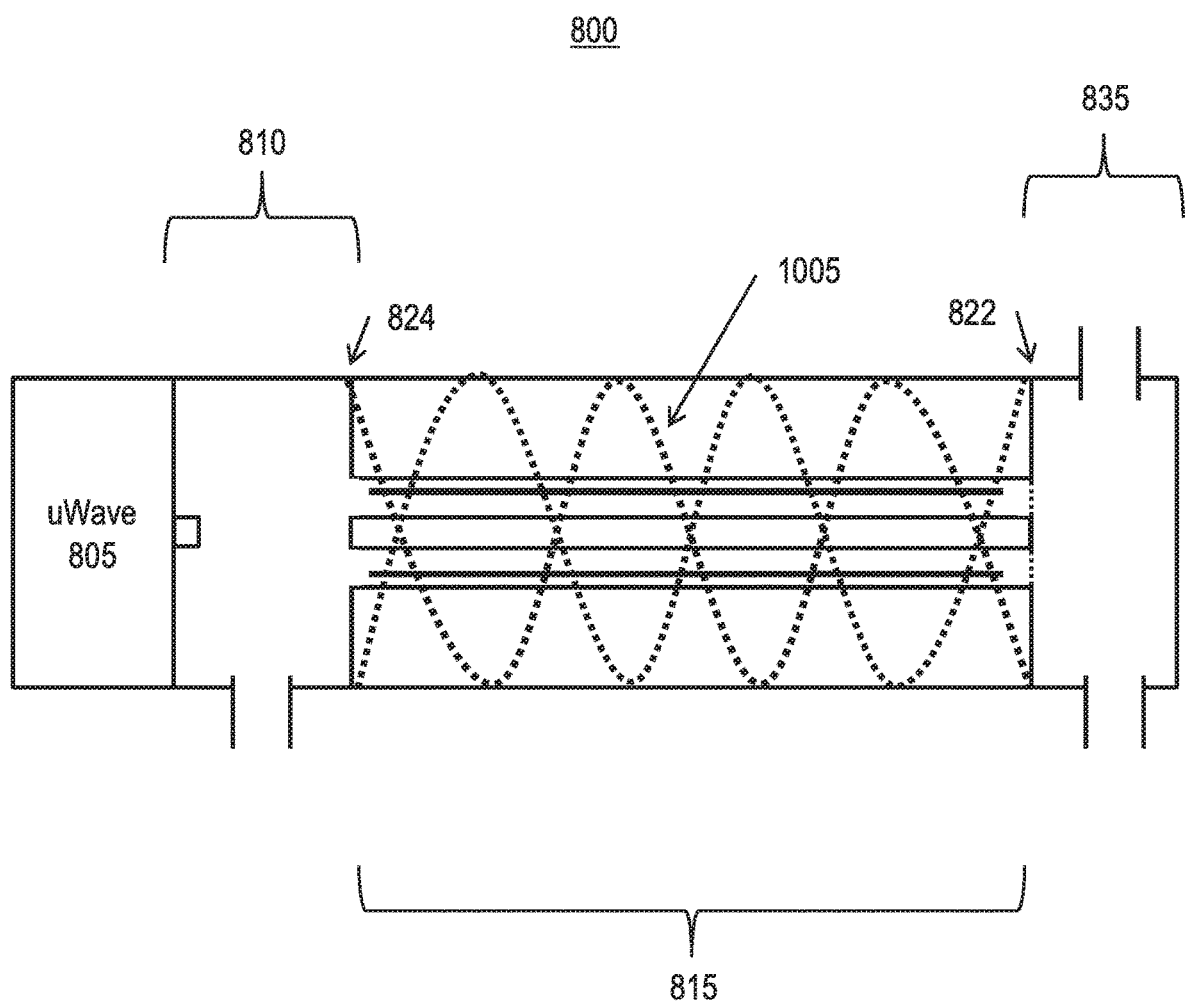
FIG. 10 illustrates the photo-reactor of FIG. 8 with a standing wave.

First waveguide end 822 and second waveguide end 824 can be formed such that the second chamber 815 and/or waveguide 820 serves as a resonator because microwave energy radiated into the second chamber 815 is reflected. This arrangement can result in the formation of a standing wave within the second chamber as a result of interference between waves reflected back and forth within the second chamber 815 and/or waveguide 820. A standing wave (also referred to as a stationary wave) can include a wave in which each point on the axis of the wave has an associated constant amplitude. For example, FIG. 10 illustrates the photo-reactor 800 of FIG. 8 with a standing wave 1005 illustrated. Locations at which the amplitude is minimum are called nodes and locations where the amplitude is maximum are called antinodes. The photo-reactor 800 can be designed/controlled such that positive amplitude values of the standing wave are positioned on the positive electrode 829 and negative amplitude values of the standing wave are positioned on the negative electrode 827.

In operation, a flow of hydrogen sulfide gas is introduced into inlet 812 under a pressure and a temperature. The hydrogen sulfide gas is contacted with microwave energy in the form of microwaves radiated by the microwave source 805. When contacted with microwave energy, the hydrogen sulfide is thermally excited. The thermally excited hydrogen sulfide flows into the second chamber 815 including into the interior of the tube assembly 830. The thermally excited hydrogen sulfide is contacted with the standing wave. Because hydrogen sulfide is polar in that the molecule has an uneven distribution of electrons, the molecule has a positively charged side and a negatively charged side. The hydrogen sulfide in the presence of the standing wave will align (e.g., orient) itself with the standing wave. This will increase the molecule's effective cross-sectional area for ultraviolet light absorption. As a result, hydrogen sulfide exposed to a standing wave and ultraviolet light will absorb more energy from the ultraviolet light than hydrogen sulfide that is not in the presence of a standing wave.

The thermally excited hydrogen sulfide exposed to ultraviolet light can result in bond disassociations and the creation of hydrogen ions ($H^+$) and sulfur ions ($S^{2-}$). The hydrogen can be attracted to the negative electrode 827 and the sulfur can be attracted to the positive electrode 829. This can cause the hydrogen and sulfur to physically separate, which reduces the amount and likelihood that these radicals will react to form hydrogen sulfide. This can act as a form of quenching (e.g., stopping or reducing the reverse reaction). The negative electrode 827 can be arranged above the positive electrode 829 because the hydrogen is lighter than the sulfur (thus the sulfur will be pulled downwards by gravity). Alternatively, the positive and negative electrodes 827, 829 can be replaced with a proton exchange membrane which can act as a form of quenching.

The resident time of the hydrogen sulfide within the second chamber 815 can be controlled by controlling the length of the second chamber 815 and the flow rate of the hydrogen sulfide into the photo-reactor 800. In addition, the energy imparted by the microwave source 805 and the ultraviolet light source 825 to the hydrogen sulfide can affect the required resident time.

The hydrogen and sulfur can exit the second chamber 815 through the second chamber outlet 823 and hydrogen, being lighter, can exit through the first outlet 837 while sulfur, being heavier, can exit through the second outlet 839. In some implementations, a gas-solid separator such as a cyclone can be used.

While the above example operation has been described with pure hydrogen sulfide provided as input to the photo-reactor 800, contaminants can also be included. Common contaminants can include carbon dioxide, methane, and other hydrocarbons. These contaminants can exit the photo-reactor 800 through the second outlet 839 along with the sulfur. By reducing the amount of contaminants in the hydrogen sulfide, energy efficiency in the system is improved because more energy is consumed when the contaminants are exposed to the microwave energy and ultraviolet light.

In addition, the frequencies/wavelengths of ultraviolet light generated by the ultraviolet light source 825 can be varied by controlling and/or modifying the microwave source 805. By changing the frequency/wavelength of the microwave energy, the frequency of the light generated by the ultraviolet light source 825 can change. Changing the frequency/wavelength of the ultraviolet light can enable an operator to tune the photo-reactor 800 based on the expected contaminants in the input stream to improve efficiency. The ultraviolet light frequencies/wavelengths can be tuned to frequencies/wavelengths where the hydrogen sulfide has a higher absorption coefficient and the contaminants have a lower absorption coefficient. Thus, some implementations of the photo-reactor 800 need not be redesigned for each application.

Figure 11:
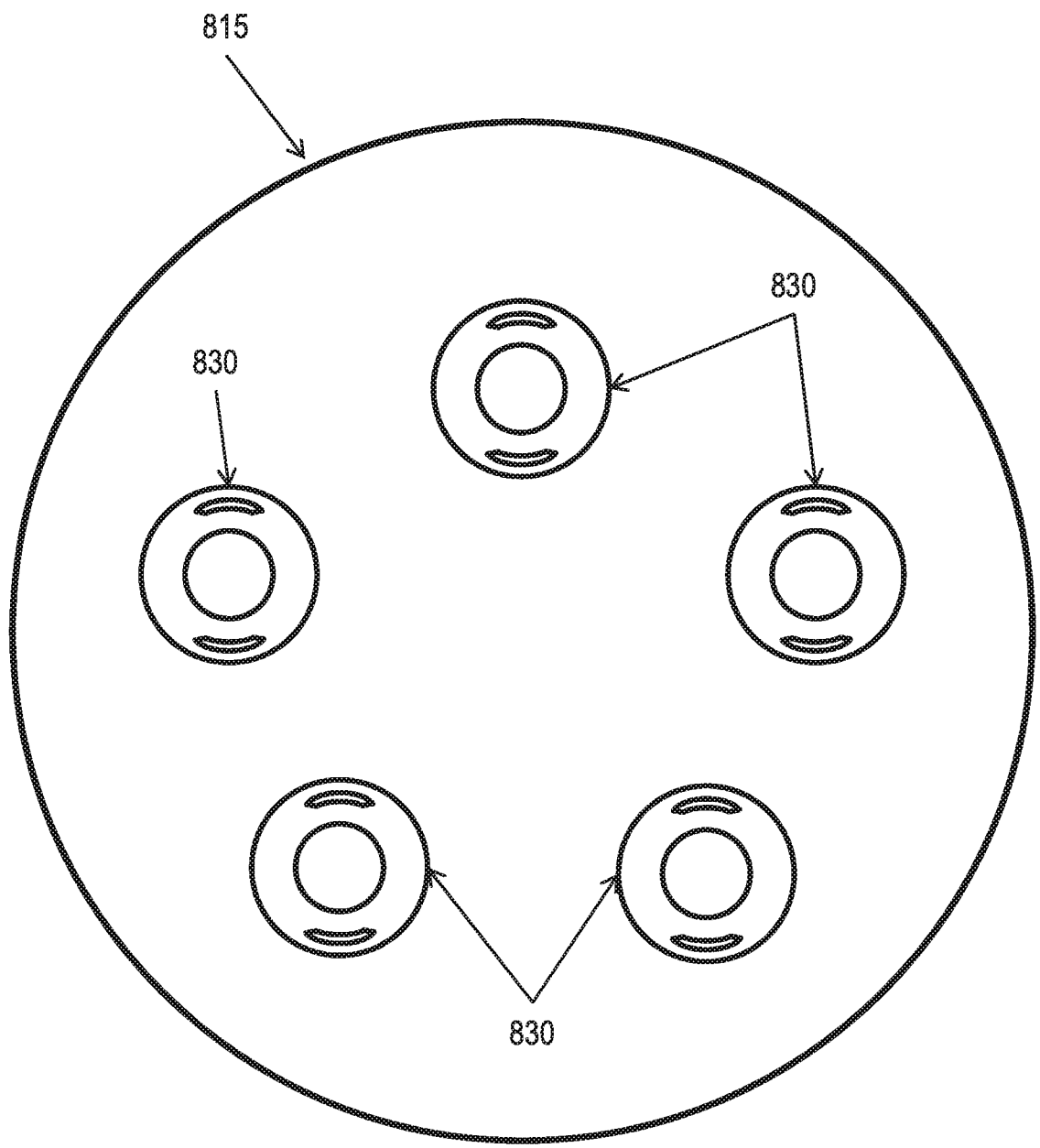
FIG. 11 is a cross-sectional view of another example photo-reactor having multiple tube assemblies.
Figure 12:
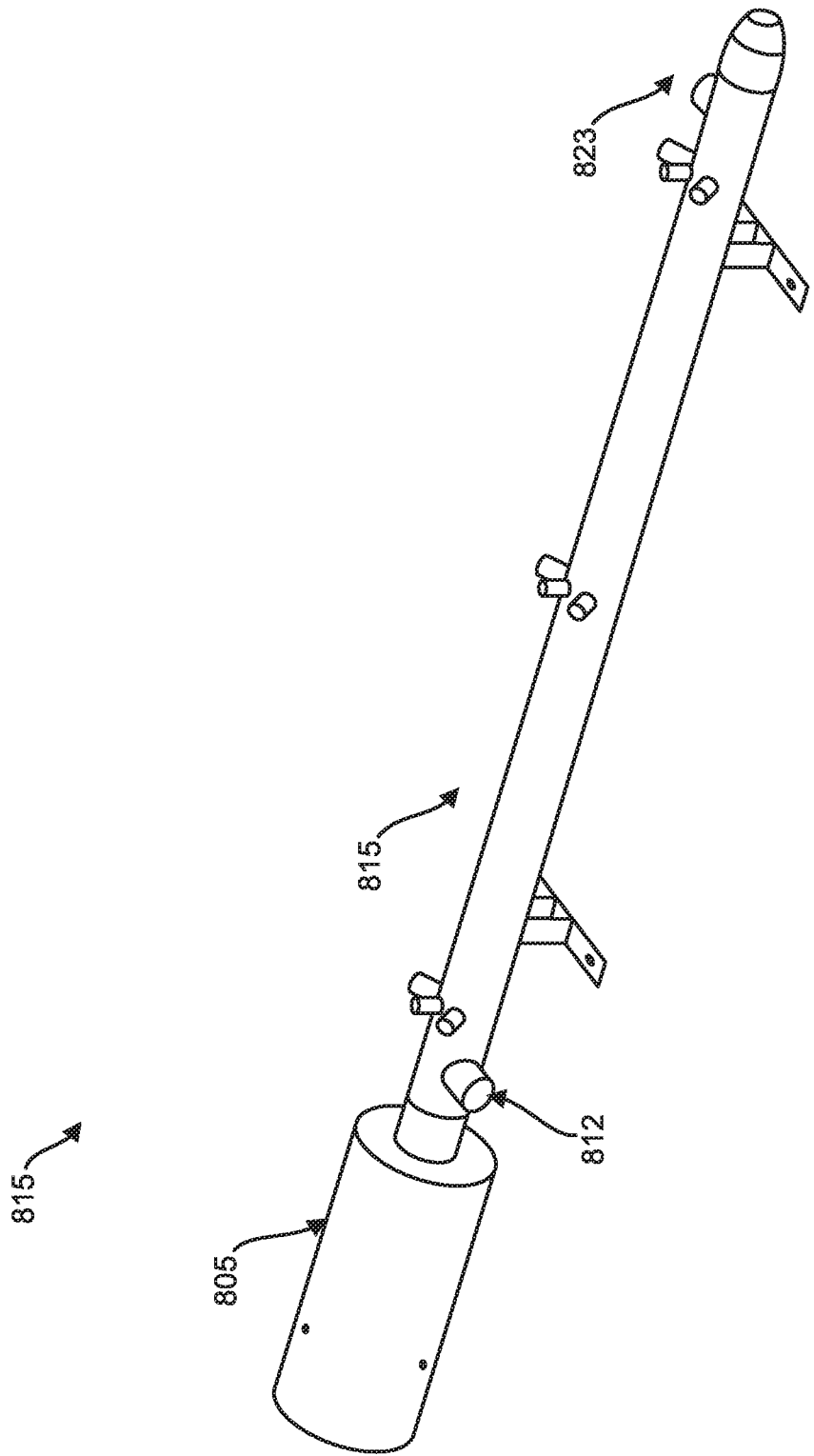
FIGS. 12-17 are views of an example photo-reactor according to some implementations of the current subject matter.
Figure 13:
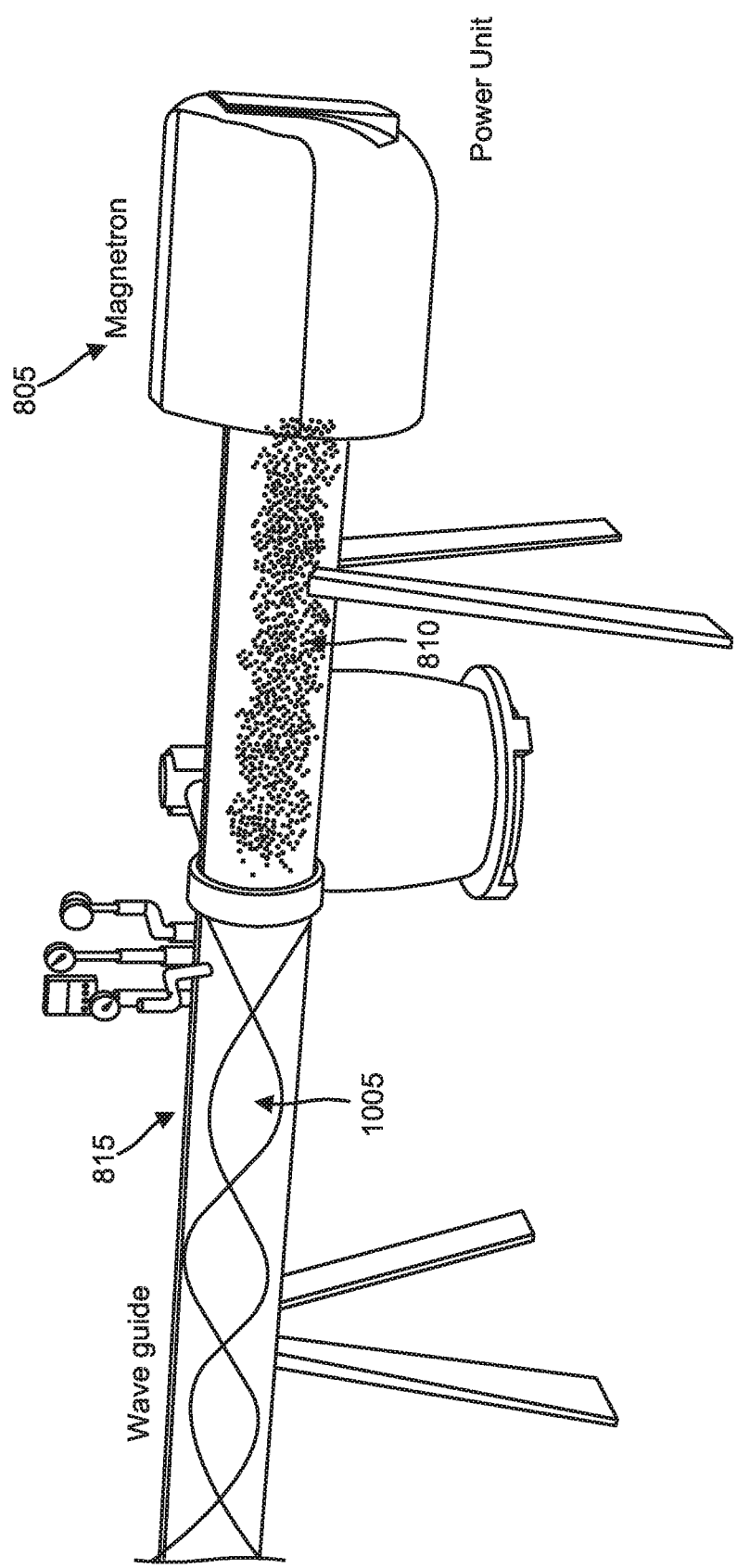
Figure 14:
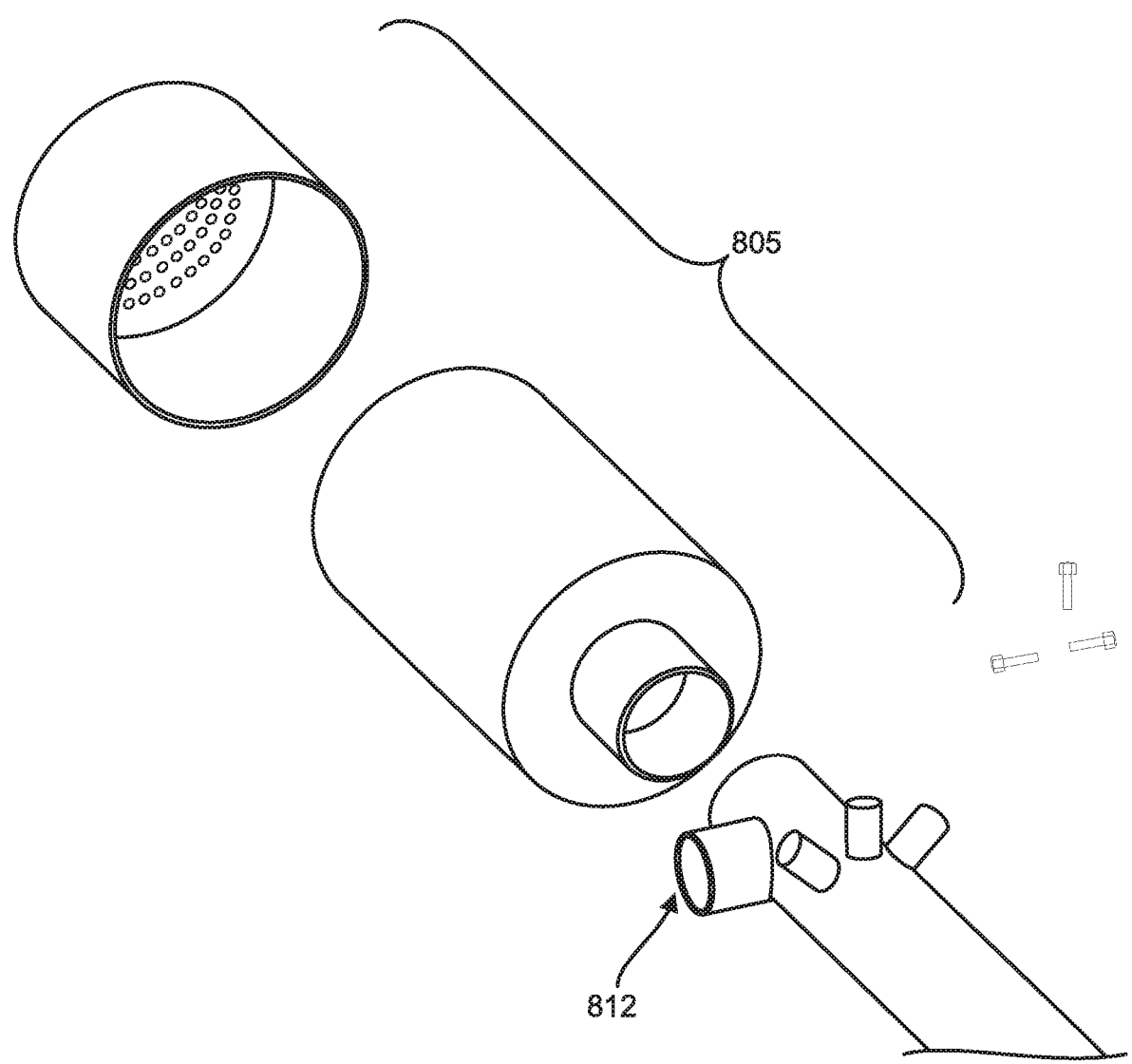
Figure 15:
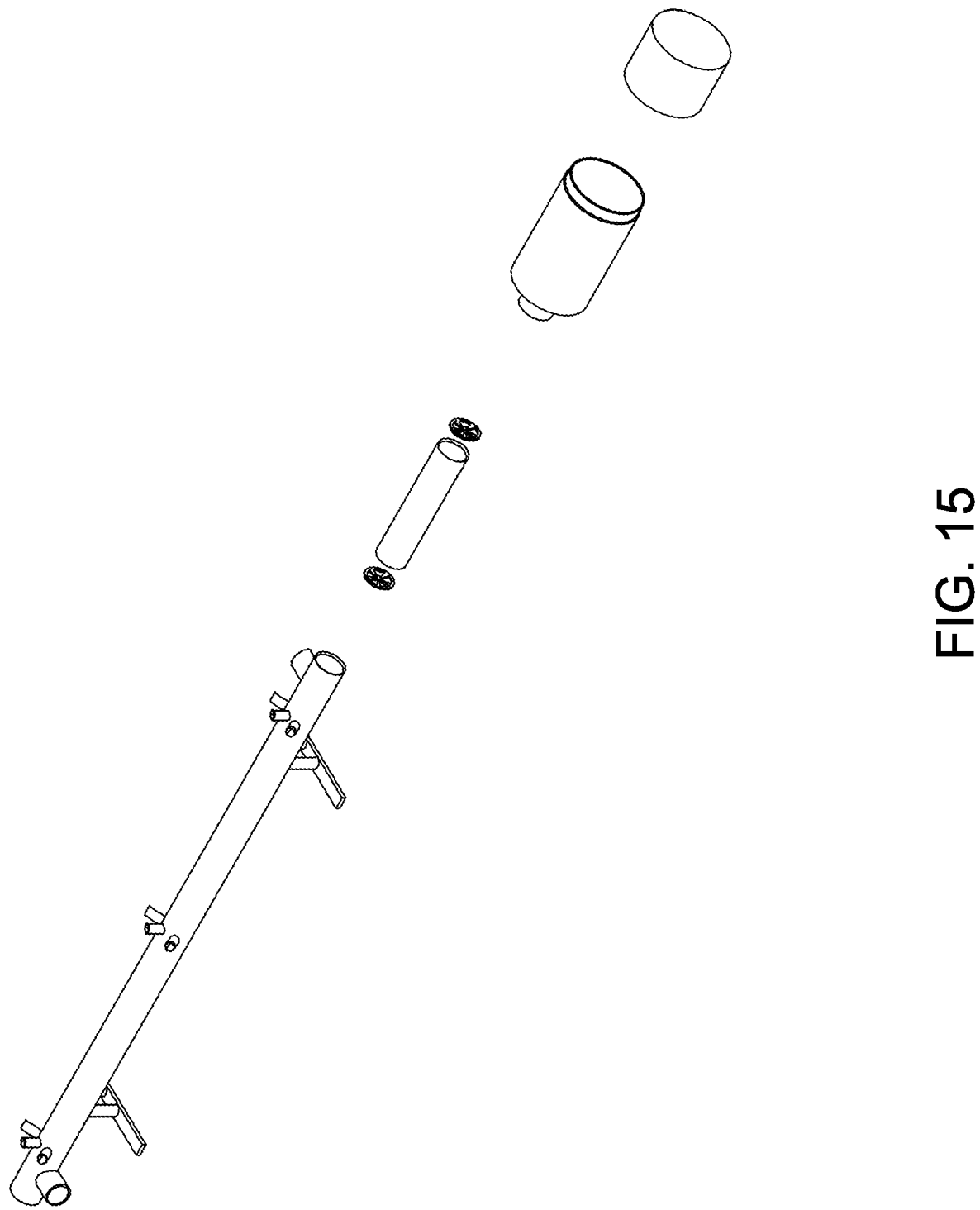
Figure 16:
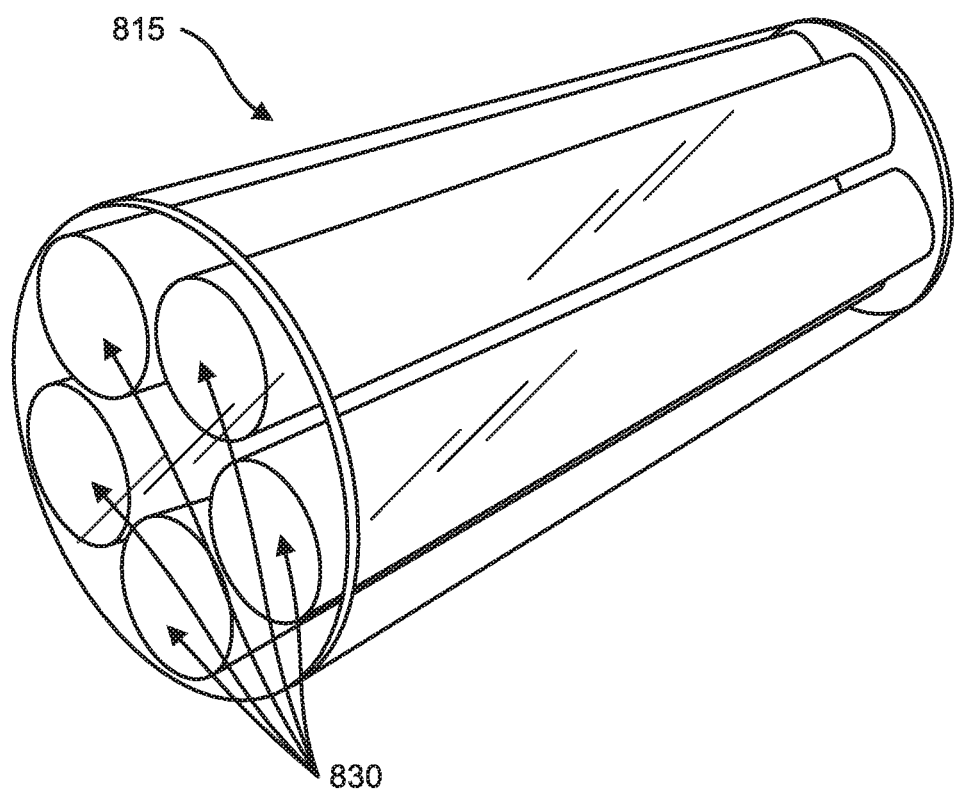
Figure 17:
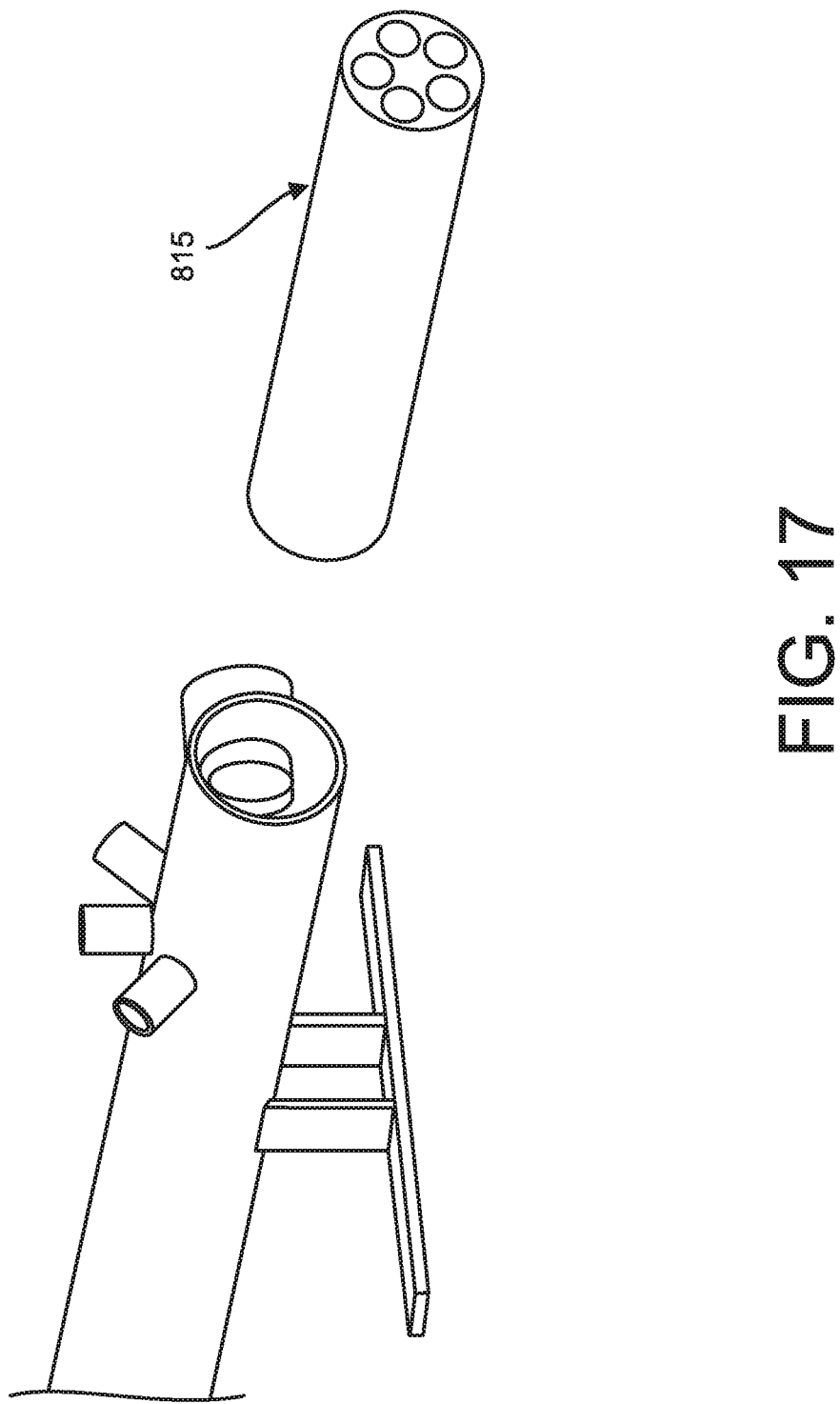

Some implementations can include multiple tube assemblies 830 arranged in parallel. For example, FIG. 11 is a cross-sectional view of another example second chamber 815 having multiple tube assemblies 830. The cross-sectional view illustrated in FIG. 11 is perpendicular to the cross-sectional view of FIG. 8. The tube assemblies 830 are arranged within the second chamber 815 and each can have its own ultraviolet light source 825, negative electrode 827 and positive electrode 829. A region 1105 between the tube assemblies can be formed of a material that is transparent to both ultraviolet light and microwave energy, such as quartz. The arrangement of FIG. 11 allows for light emitted from one ultraviolet light source 825 to not only illuminate hydrogen sulfide within its tube assembly 830 but to also illuminate hydrogen sulfide within the other tube assemblies 830. The multiple ultraviolet light sources 825 can be excited/driven by a common microwave source 805 and reside within a common waveguide. In some implementations, each tube assembly 830 includes a respective waveguide 820.

FIGS. 12-17 are views of an example photo-reactor 800 according to some implementations of the current subject matter.

Figure 18:
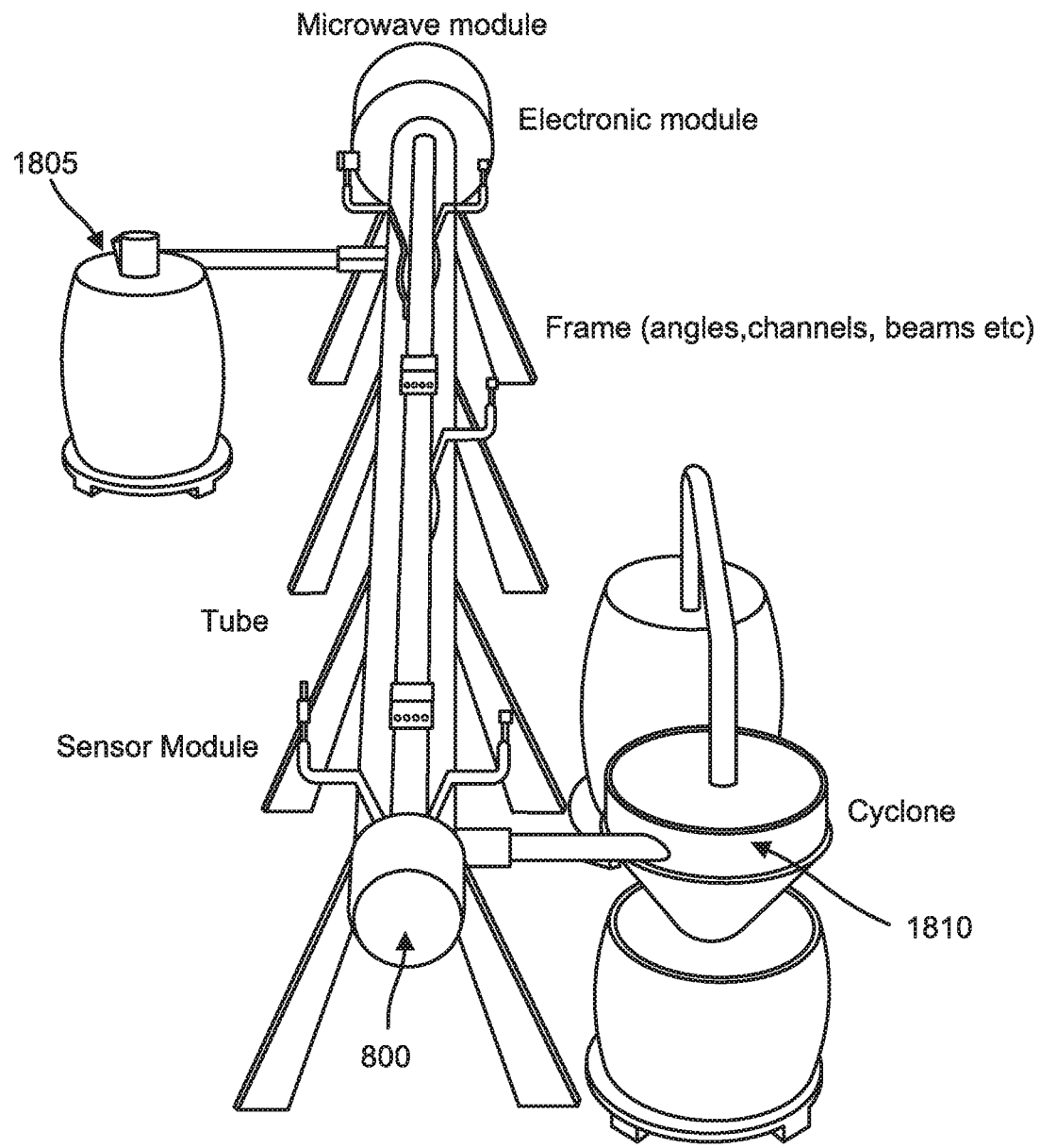
FIG. 18 illustrates an example system for decomposing hydrogen sulfide.
Figure 19:
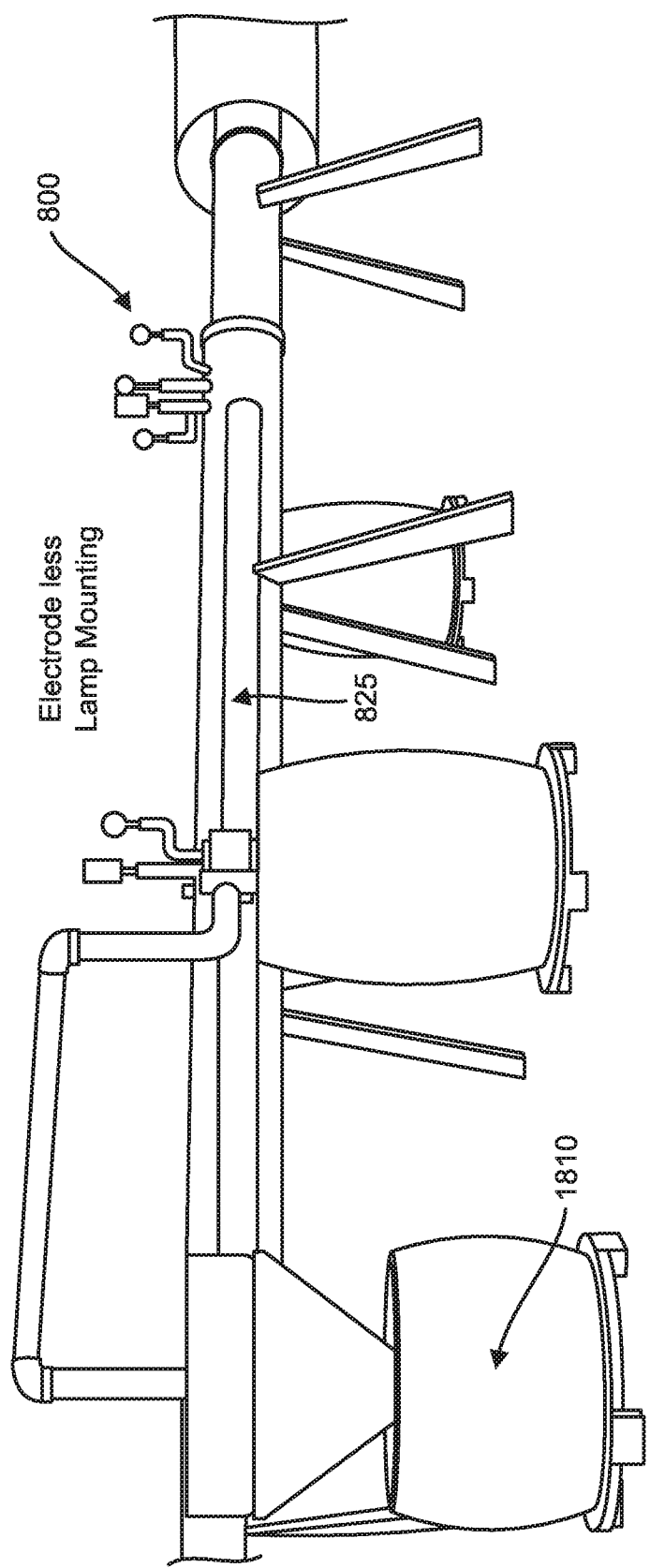
FIGS. 19-25 illustrate various views of the example system of FIG. 18.
Figure 20:
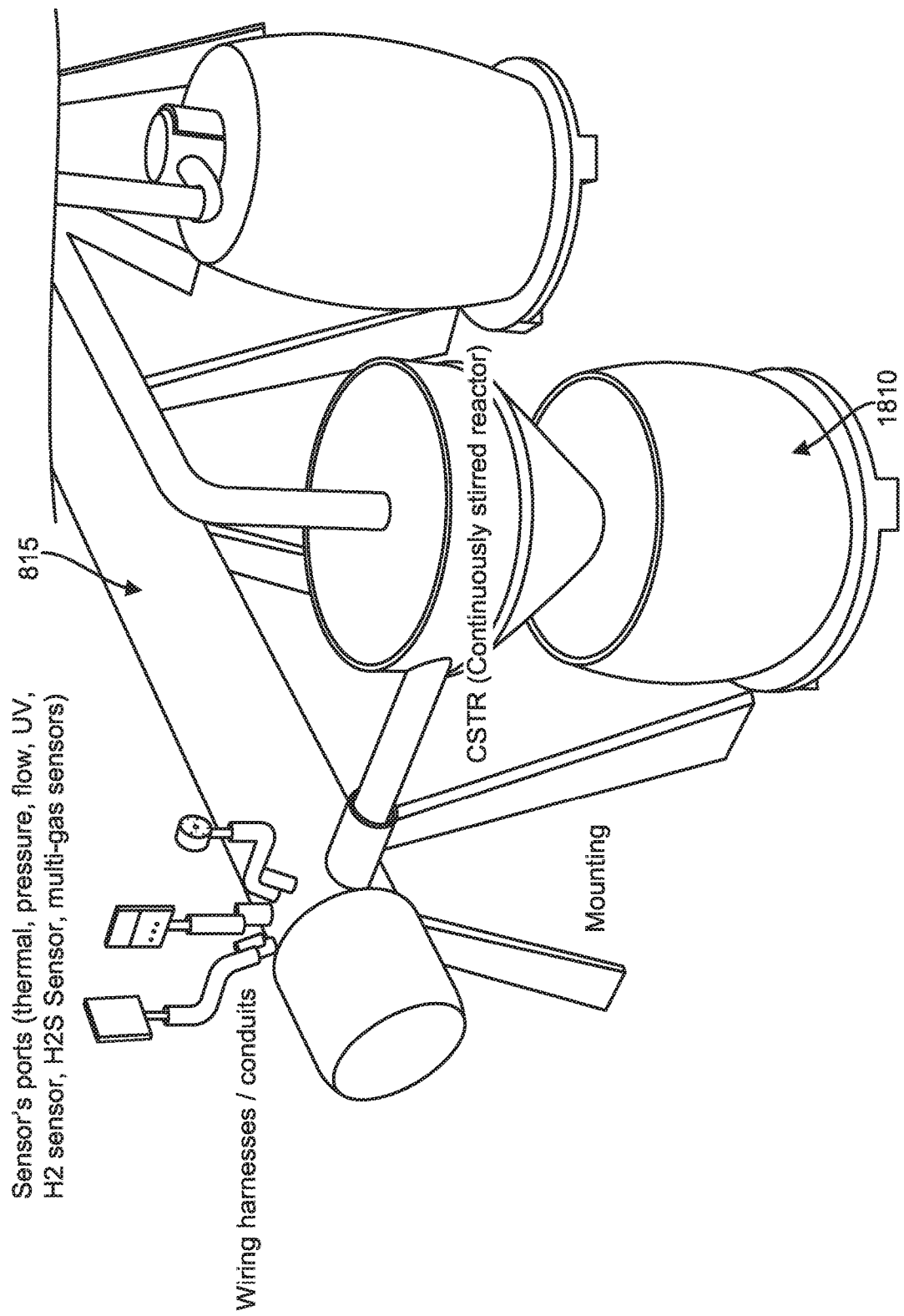
Figure 21:
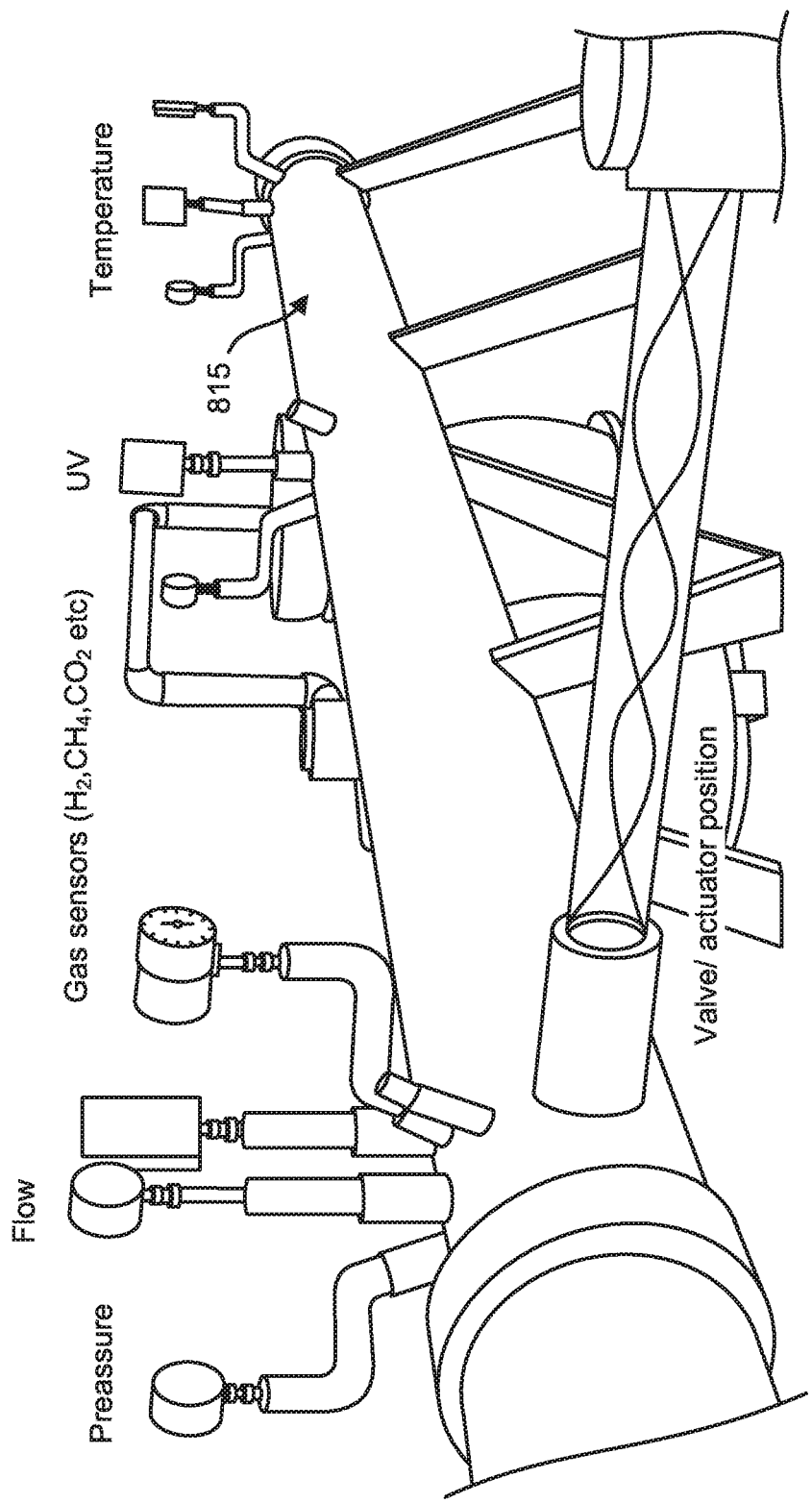
Figure 22:
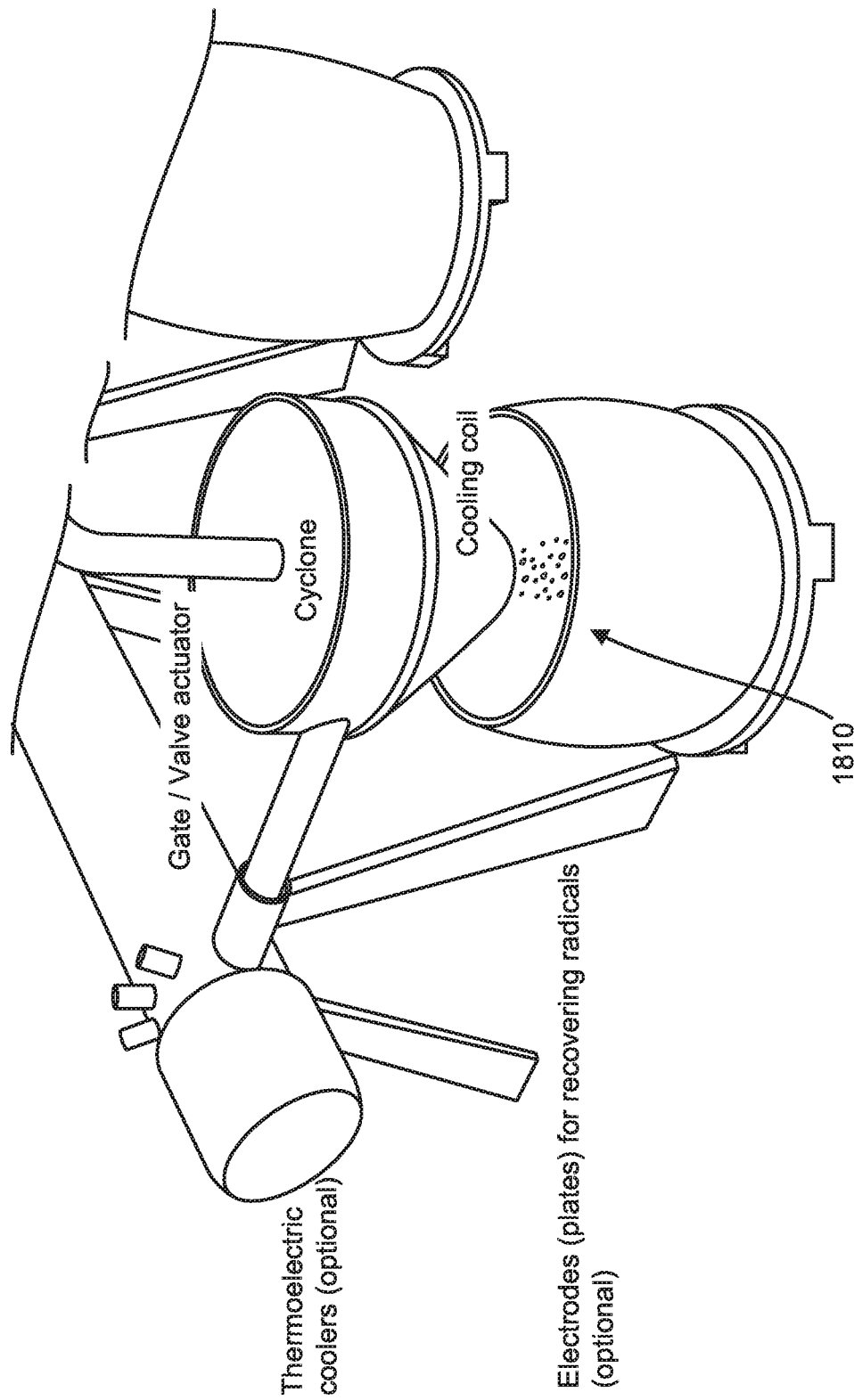
Figure 23:
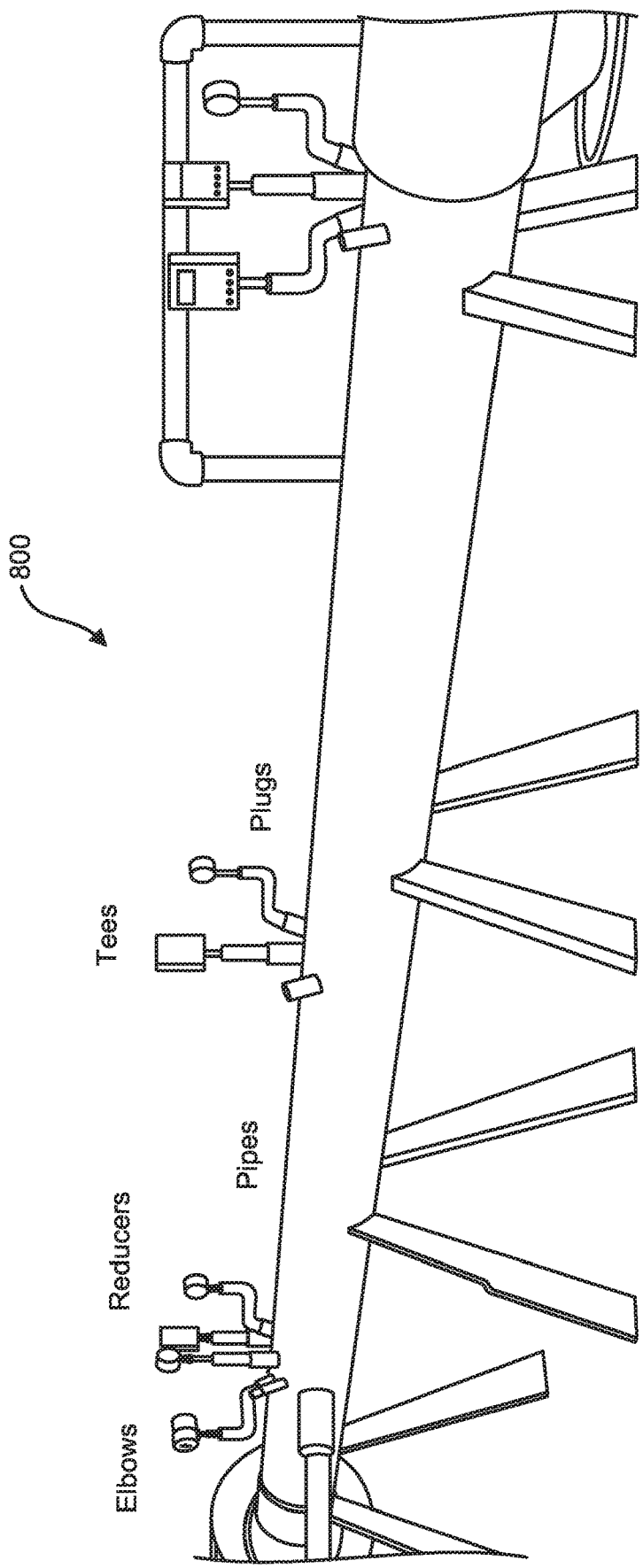
Figure 24:
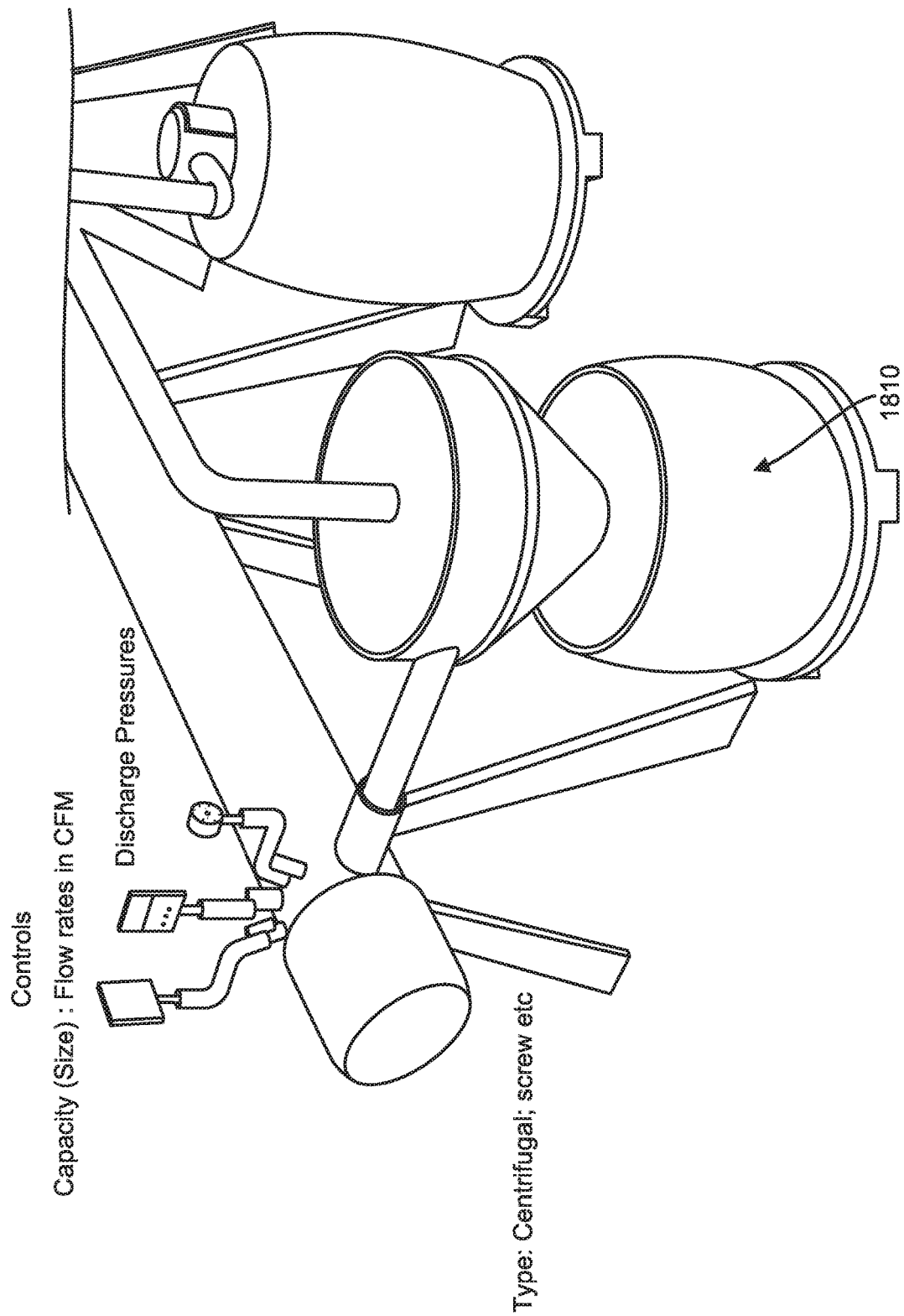
Figure 25:
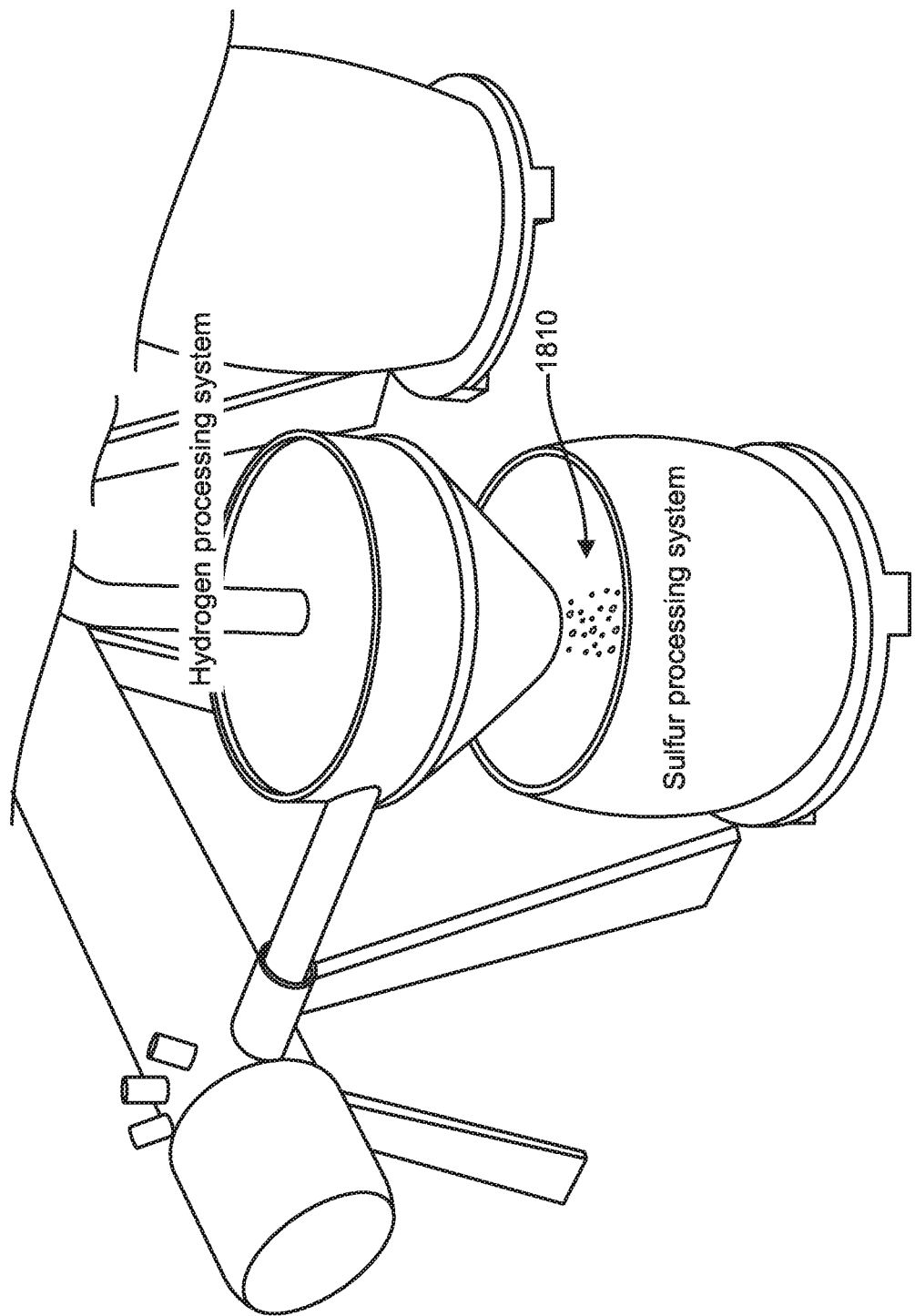
Figure 26:
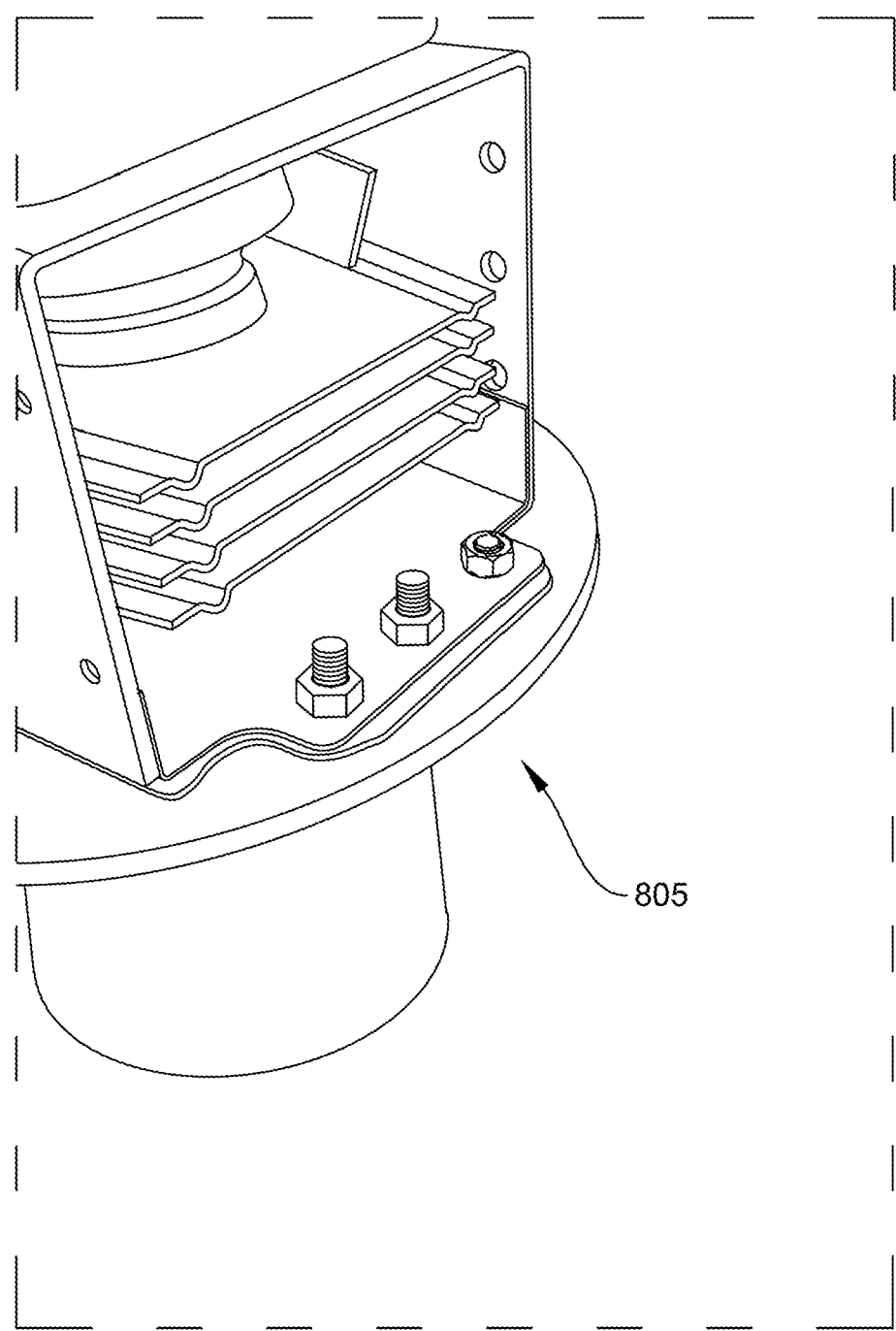
FIGS. 26-29 illustrate views of an example microwave source.
Figure 27:
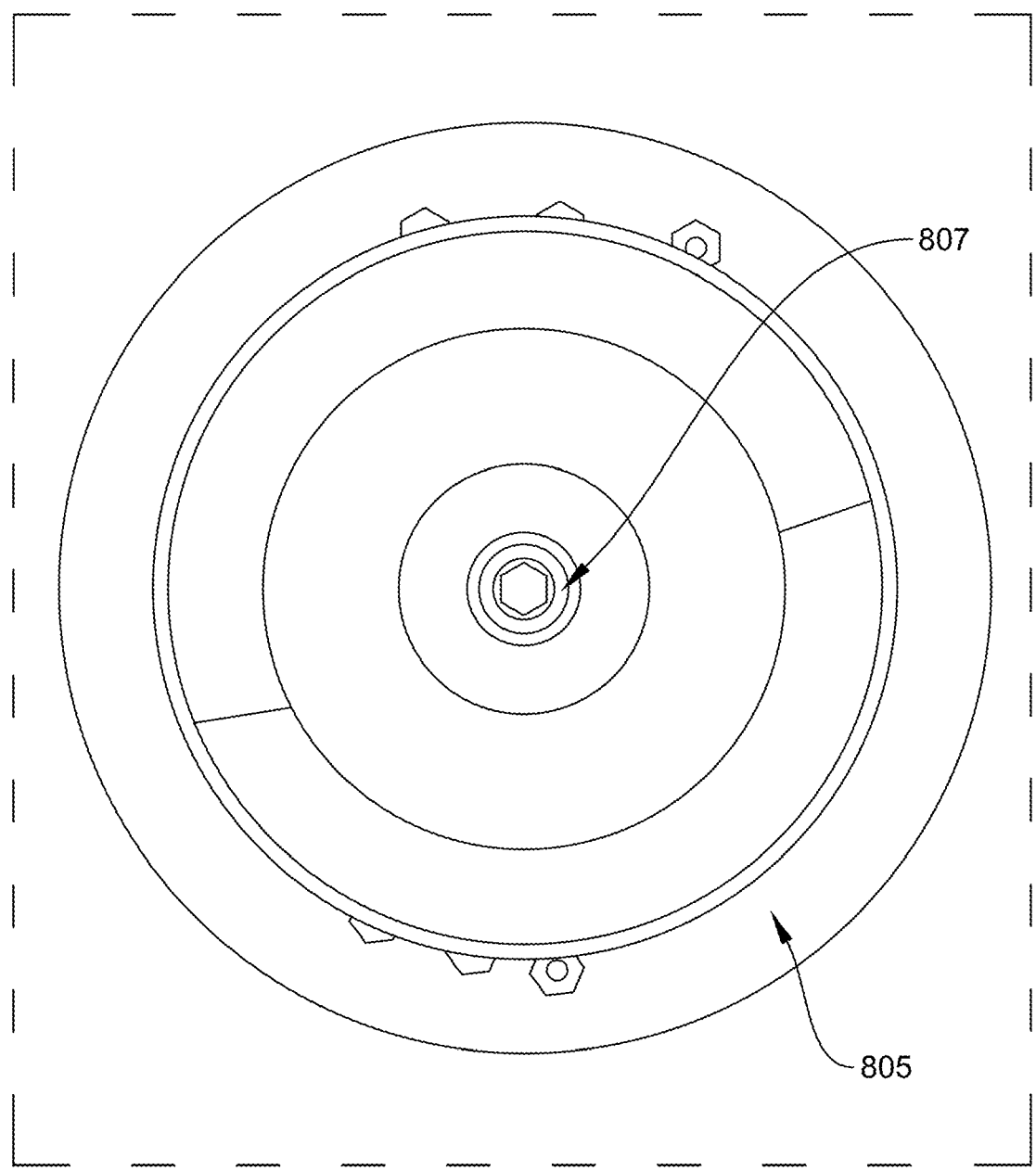
Figure 28:
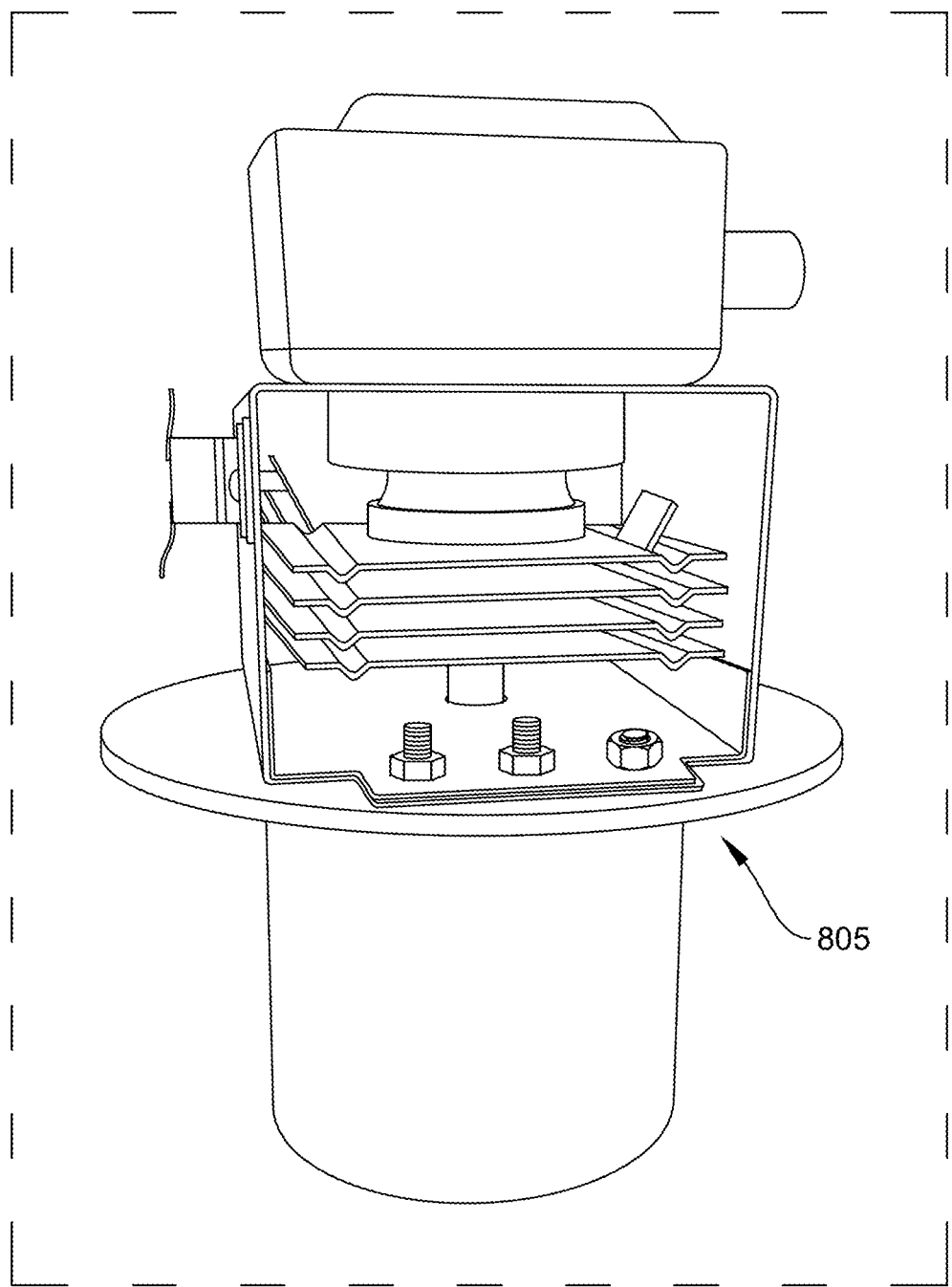
Figure 29:
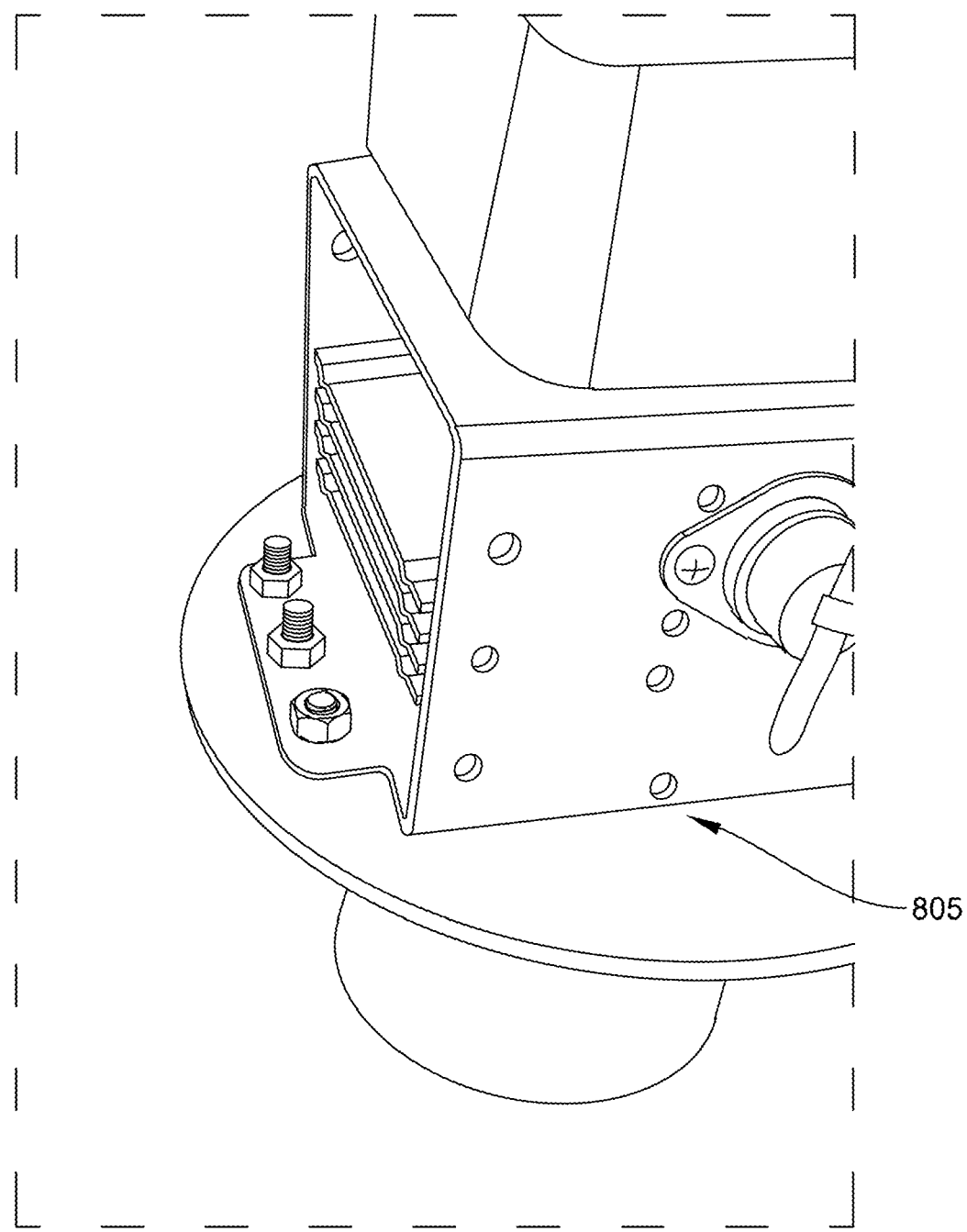

FIG. 18 illustrates an example system 1800 for decomposing hydrogen sulfide. The system 1800 includes a photo-reactor 800, hydrogen sulfide source 1805, and gas-solid separator 1810. FIGS. 19-25 illustrate various views of the example system 1800.

FIGS. 26-29 illustrate views of an example microwave source 805. In the illustrated example, the microwave source 805 is a magnetron.

Figure 30:
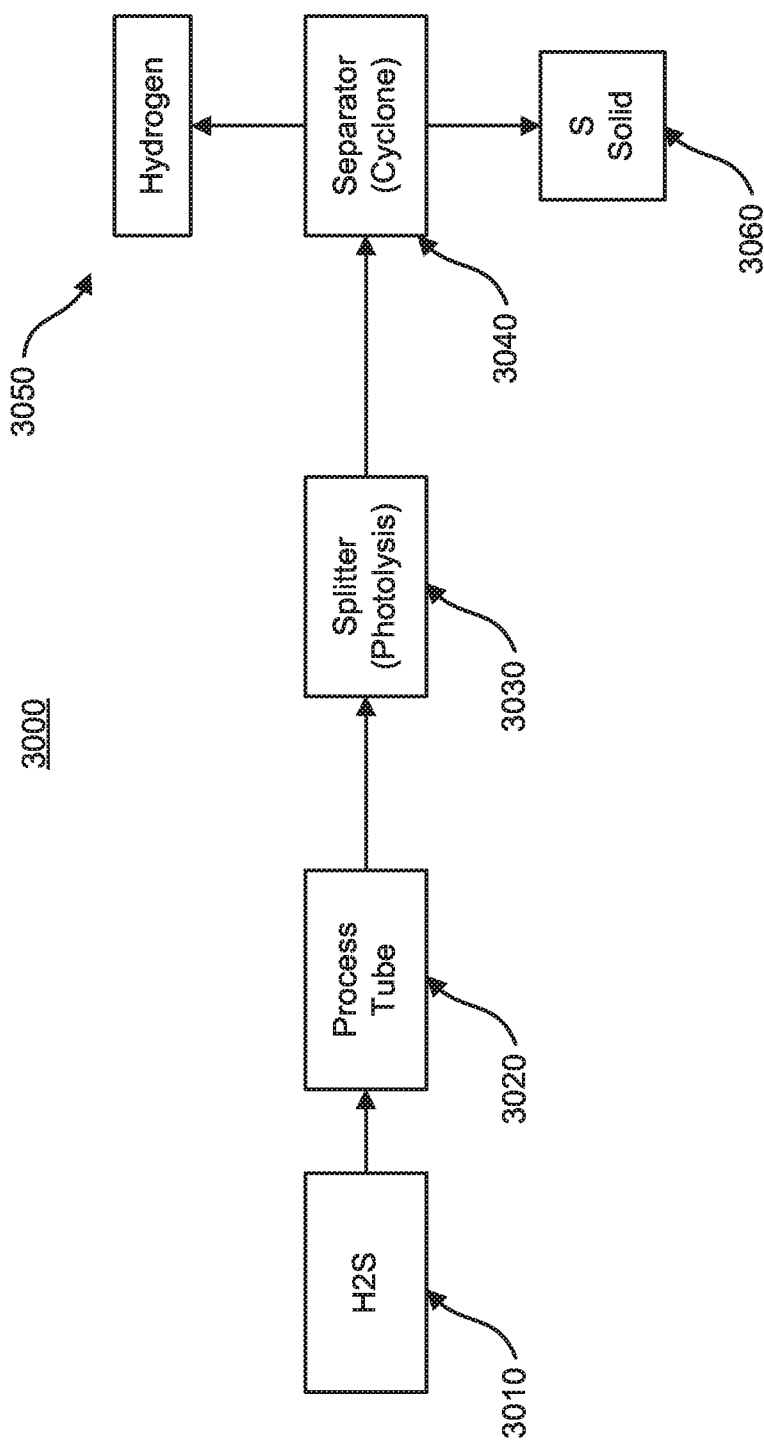
FIG. 30 is a system block diagram illustrating the example processing flow of desulfurization.

FIG. 30 is a system block diagram illustrating the example processing flow 3000 of desulfurization. At 3010, hydrogen sulfide is provided. At 320, the hydrogen sulfide is present in a process tube (e.g., first chamber 810). At 3030, the hydrogen sulfide is split using photolysis (e.g., in a second chamber 815). At 3040, a separator (e.g., a cyclone) 3040 separates the split hydrogen sulfide into hydrogen gas 3050 and sulfur 3060.

Figure 31:
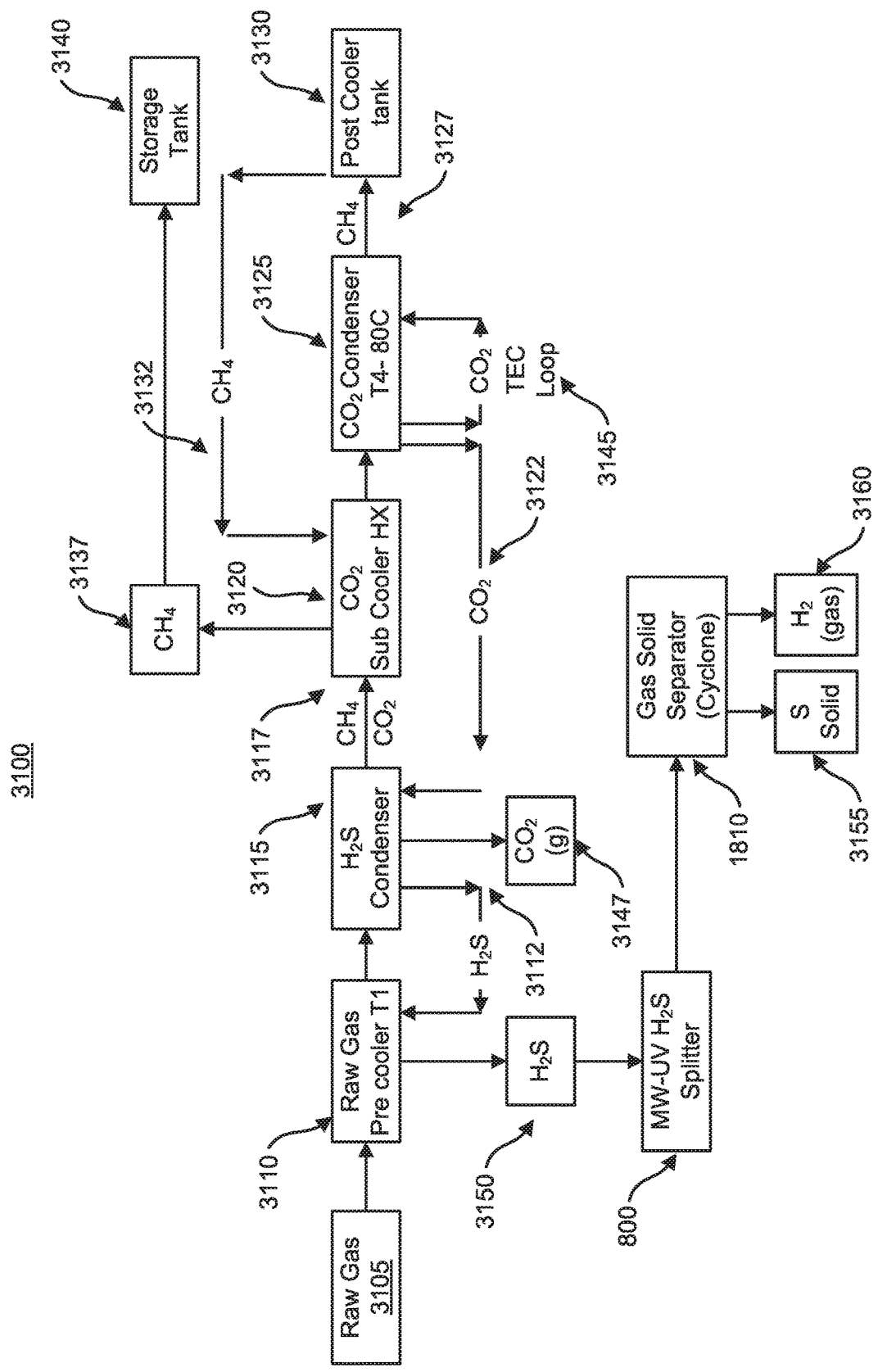
FIG. 31 is a system block diagram illustrating a system block diagram of example process for a biogas distillery for processing raw gas.

FIG. 31 is a system block diagram illustrating an example system 3100 for a waste distillery for processing raw gas. Raw gas can include hydrogen sulfide, carbon dioxide, and methane. The raw gas may be produced from, for example, animal waste. The system 3100 removes hydrogen sulfide, carbon dioxide, and methane from the raw gas and further can decompose the hydrogen sulfide into hydrogen gas and sulfur. System 3100 can include one or more energy recycling circuits that feeds a cold stream from further down in the process back to cool an input stream for further processing. This approach recycles energy and reduces the load on cooling units.

System 3100 includes a raw gas receiving unit 3105, a raw gas pre-cooler 3110, a hydrogen sulfide condenser 3115, a carbon dioxide sub-cooler 3120, a carbon dioxide condenser 3125, and a post cooler tank 3130.

Raw gas receiving unit 3105 receives raw gas including hydrogen sulfide, carbon dioxide, and hydrocarbons such as methane. The raw gas is precooled at raw gas pre-cooler 3110, which reduces the temperature of the raw gas. The raw gas pre-cooler 3110 can include a heat exchanger that exchanges heat with a hydrogen sulfide output stream 3112 (e.g., exchanges heat between input streams raising the temperature of the hydrogen sulfide output stream 3112 while lowering the temperature of the raw gas stream). The cooled raw gas can be condensed at hydrogen sulfide condenser 3115. The hydrogen sulfide condenser 3115 can separate hydrogen sulfide from the raw gas thereby creating hydrogen sulfide output stream 3112 and desulfurized raw gas stream 3117. Hydrogen sulfide output stream 3112 can be a liquid and can be recycled through raw gas pre-cooler 3110 as described above.

The desulfurized raw gas 3117 includes carbon dioxide and methane in gaseous phase, which is subsequently cooled at carbon dioxide sub-cooler 3120. Carbon dioxide sub-cooler 3120 can include a heat exchanger that takes the desulfurized raw gas 3117 as a hot input stream and further takes a cooled methane stream 3132 as a cold input stream. Carbon dioxide sub-cooler 3120 raises the temperature of the cooled methane stream 3132 while lowering the temperature of the desulfurized raw gas 3117. Carbon dioxide condenser 3125 can condense carbon dioxide from the desulfurized raw gas 3117. Carbon dioxide condenser 3125 can separate the carbon dioxide and methane thereby producing a carbon dioxide output stream 3122 and a methane stream 3127. Carbon dioxide output stream 3122 can be recycled through hydrogen sulfide condenser 3115 as the cold input stream to the heat exchanger. Similarly, methane stream 3127 can be stored in a post cooler tank 3130, the output of which can be methane stream 3132, which can be used as the cold input stream to the heat exchanger of the carbon dioxide sub-cooler 3120. The cooled methane stream 3137 can be stored in a storage tank 3140.

The carbon dioxide condenser 3125 can be driven by a carbon dioxide thermal electric cooling element 3145, which includes a circuit for cooling a liquid, which is used by carbon dioxide condenser 3125 to condense/separate the carbon dioxide and methane. The carbon dioxide condenser 3125 can include a heat exchanger for exchanging heat between the cooled stream from the thermal electric cooling element 3145 and the relatively warmer carbon dioxide and methane gas received from the carbon dioxide sub-cooler 3120. Although the example illustrates a thermal electric cooling element, other cooling elements are possible.

Because the system 3100 recycles output streams 3112, 3122, and 3132 in order to perform cooling at steps that occur earlier in the process, the required cooling load on the carbon dioxide thermal electric cooling element is reduced.

Once the carbon dioxide output stream 3122, which can be a liquid when entering hydrogen sulfide condenser 3115, is warmed, it can be provided as an output gas 3147. Similarly, once hydrogen sulfide output stream 3112, which can be a liquid when entering raw gas pre-cooler 3110, is warmed, it can be provided as an output gas 3150.

In some implementations, the output hydrogen sulfide gas 3150 can be decomposed into sulfur 3155 and hydrogen 3160 using a photo-reactor 800 as described above with respect to FIG. 8 and a gas-solid separator 1810.

At 3120, the raw gas is cooled to separate the hydrogen sulfide from hydrocarbons (such as methane) and other contaminants (such as carbon dioxide). At 3130, the removed hydrogen sulfide can be processed to produce sulfur and hydrogen gas, for example, using the process described in FIG. 30. At 3140, the hydrogen sulfide free hydrocarbon and other contaminants may be processed.

Figure 32:
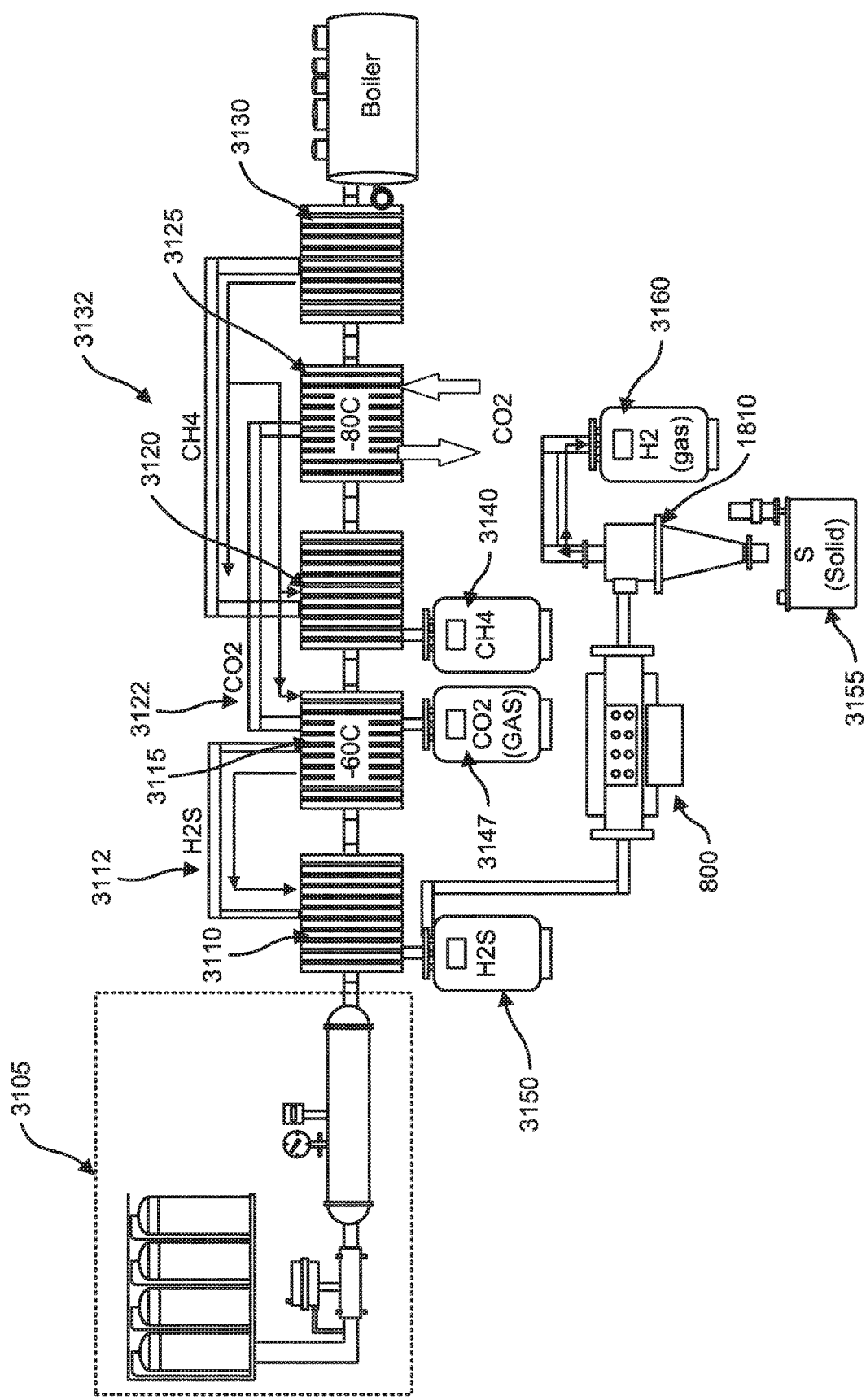
FIG. 32 is an example system for implementing the example process illustrated in FIG. 31.

FIG. 32 is a system block diagram of a variation of the example system 3100 illustrated in FIG. 31.

Figure 33:
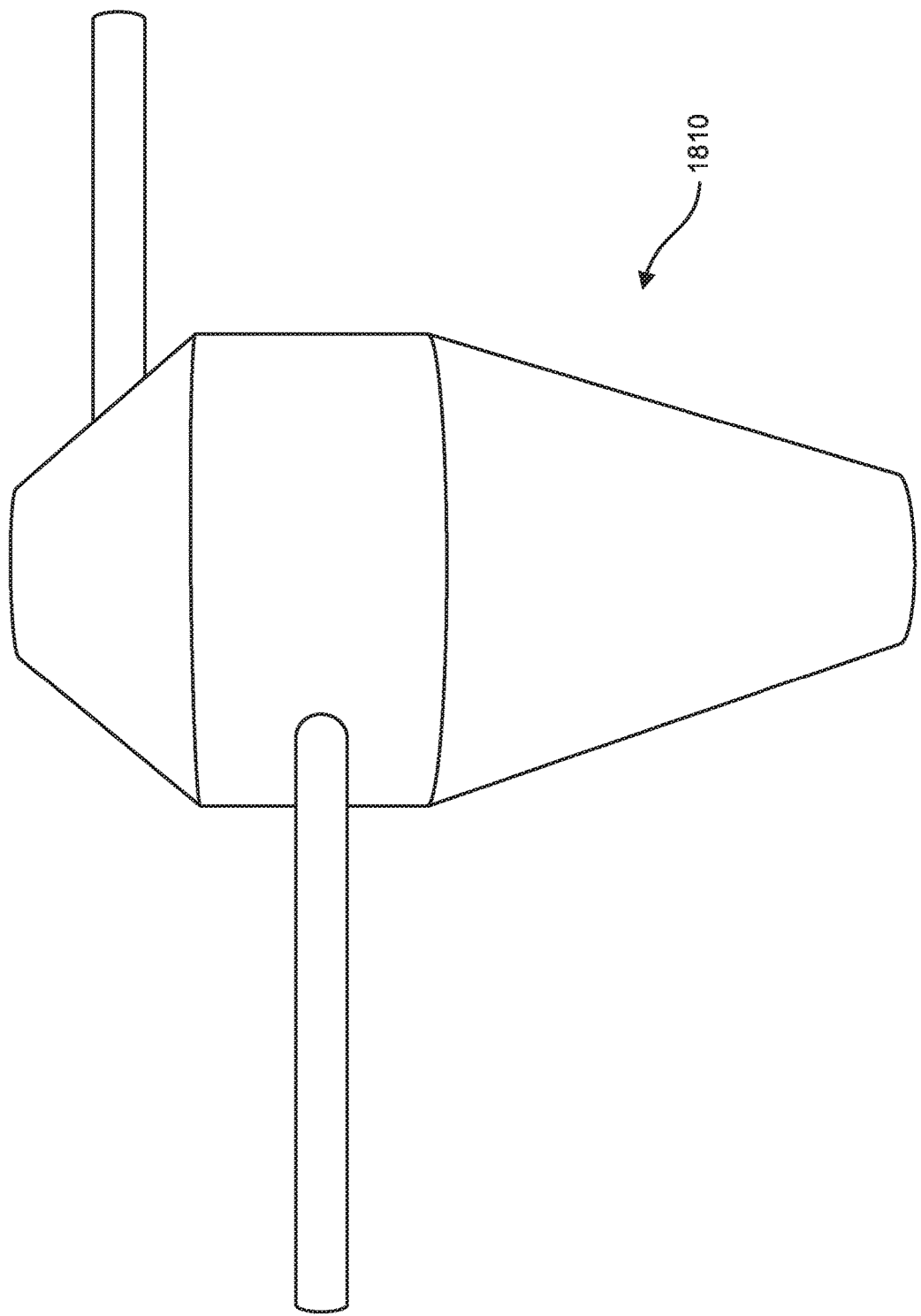
FIGS. 33-35 are views illustrating an example gas-solid separator.
Figure 34:
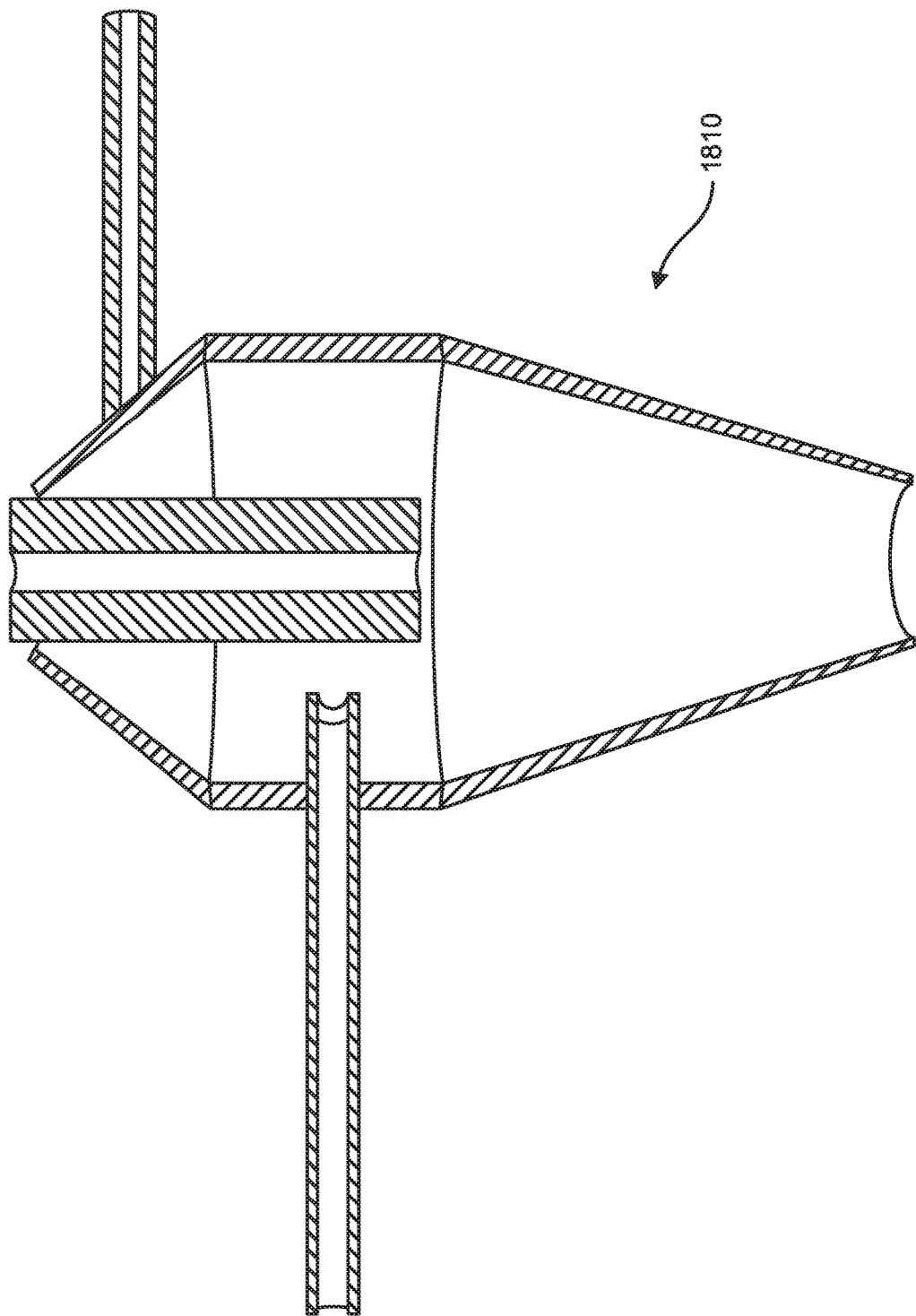
Figure 35:
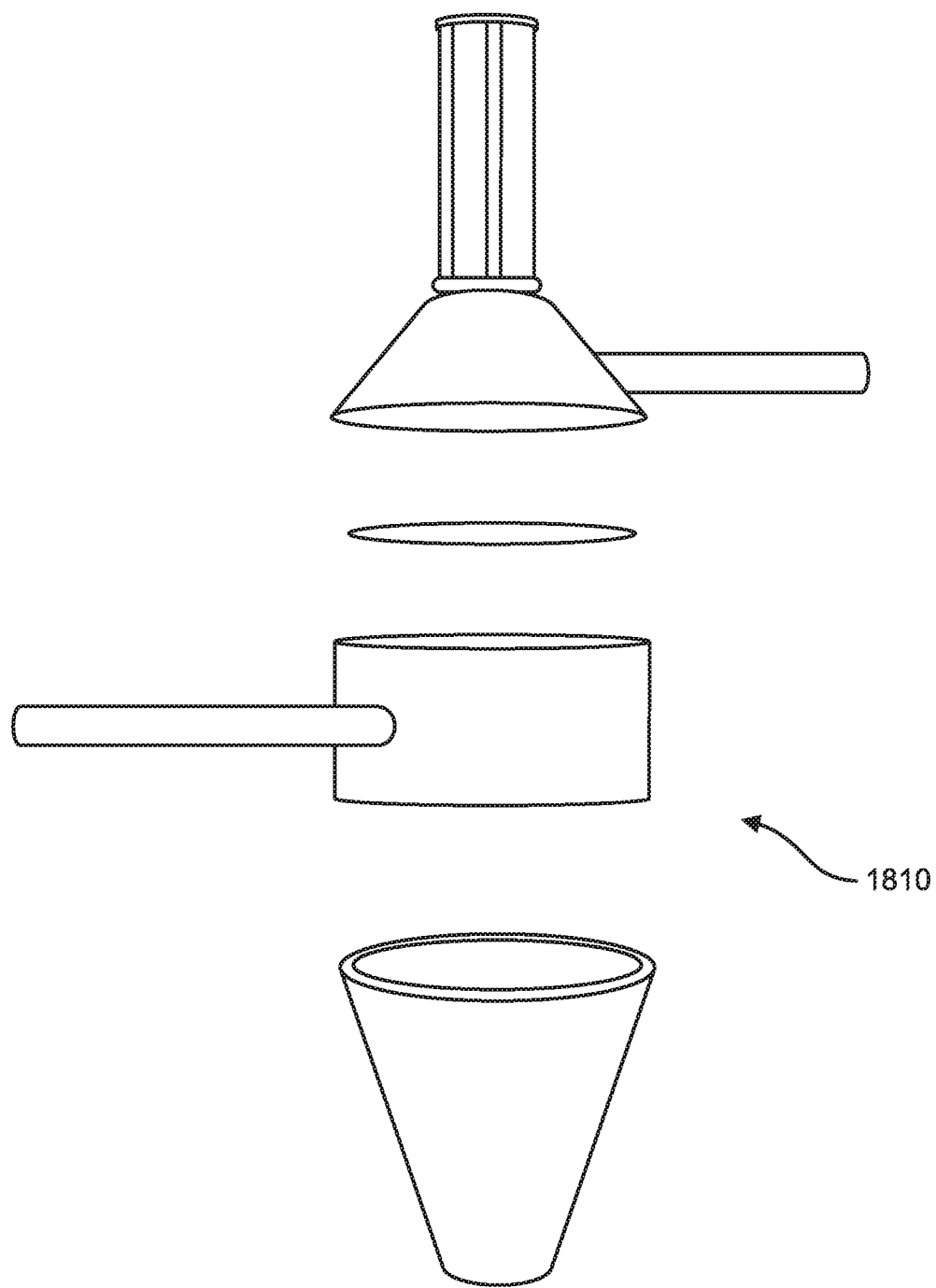

FIGS. 33-35 are views illustrating an example gas-solid separator 1810 in the form of a cyclone.

Figure 36:
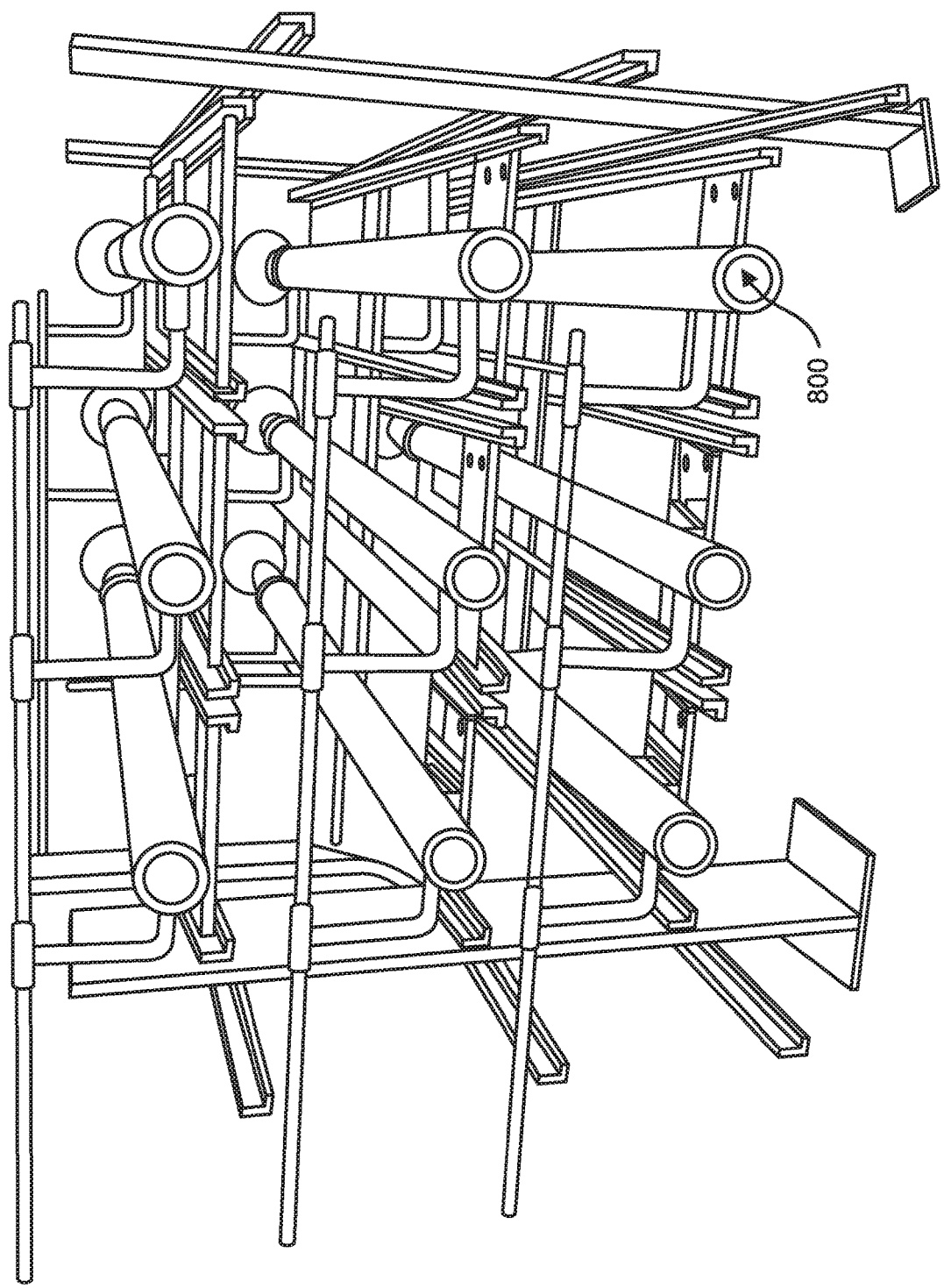
FIGS. 36-41 illustrate various views of an example array of photo-reactors.
Figure 37:
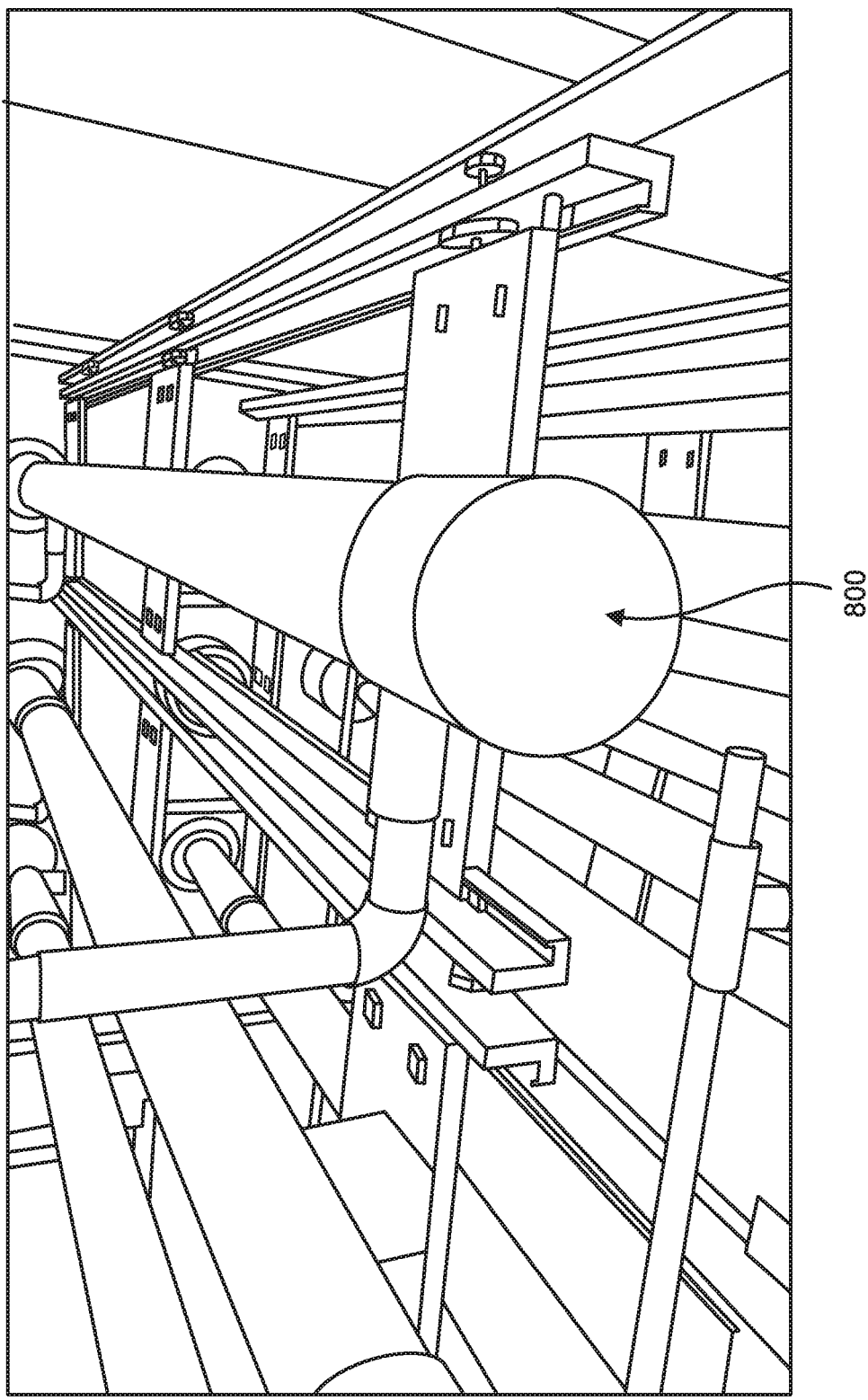
Figure 38:
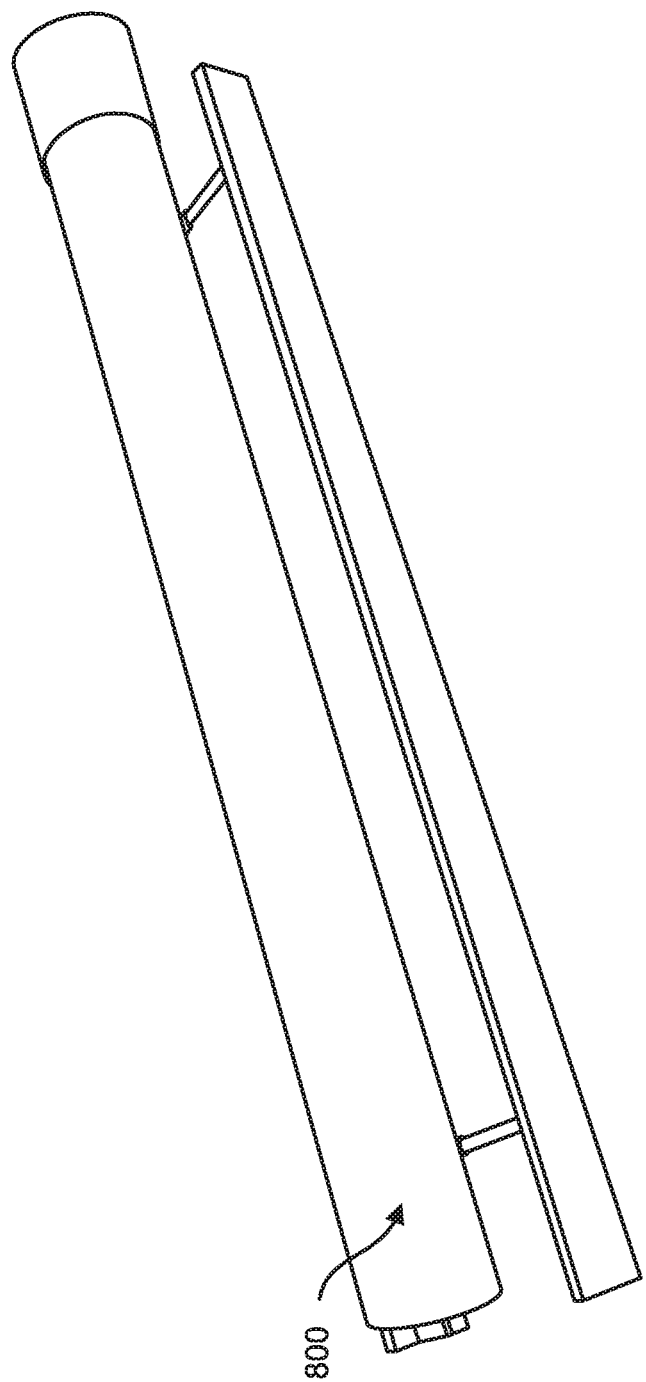
Figure 39:
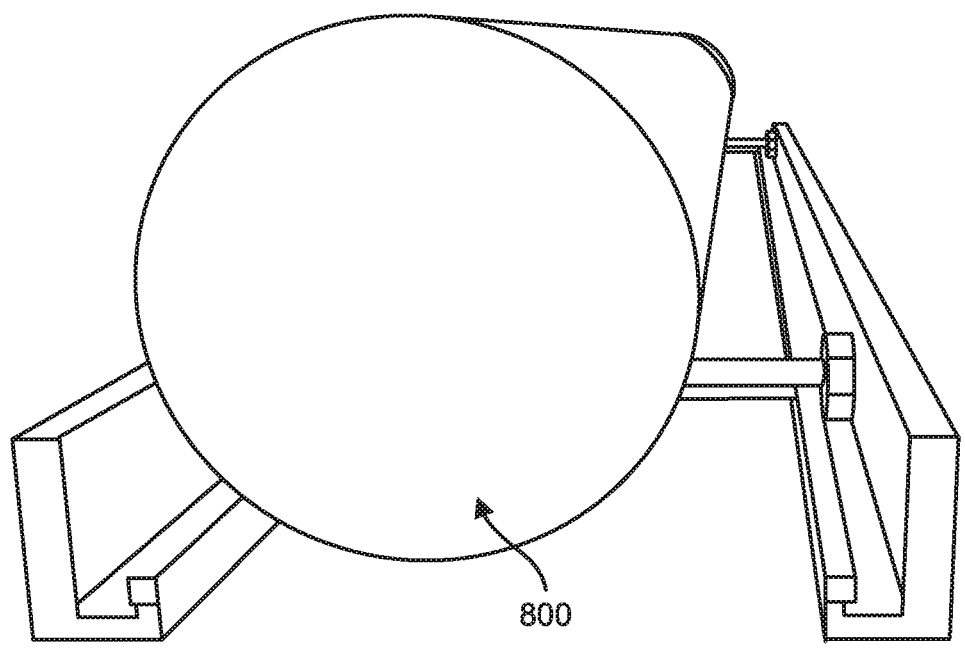
Figure 40:
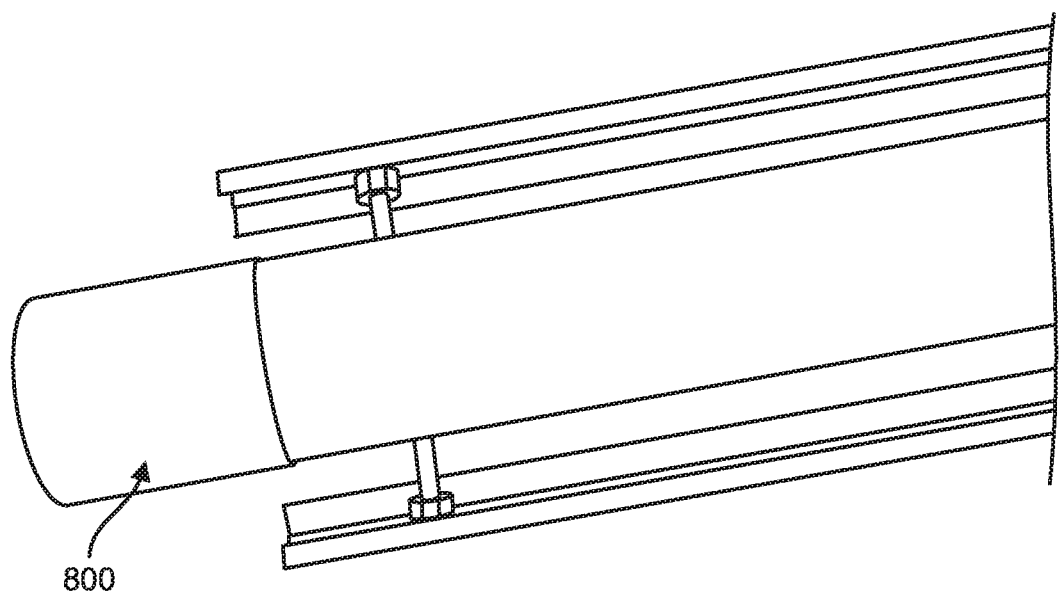
Figure 41:
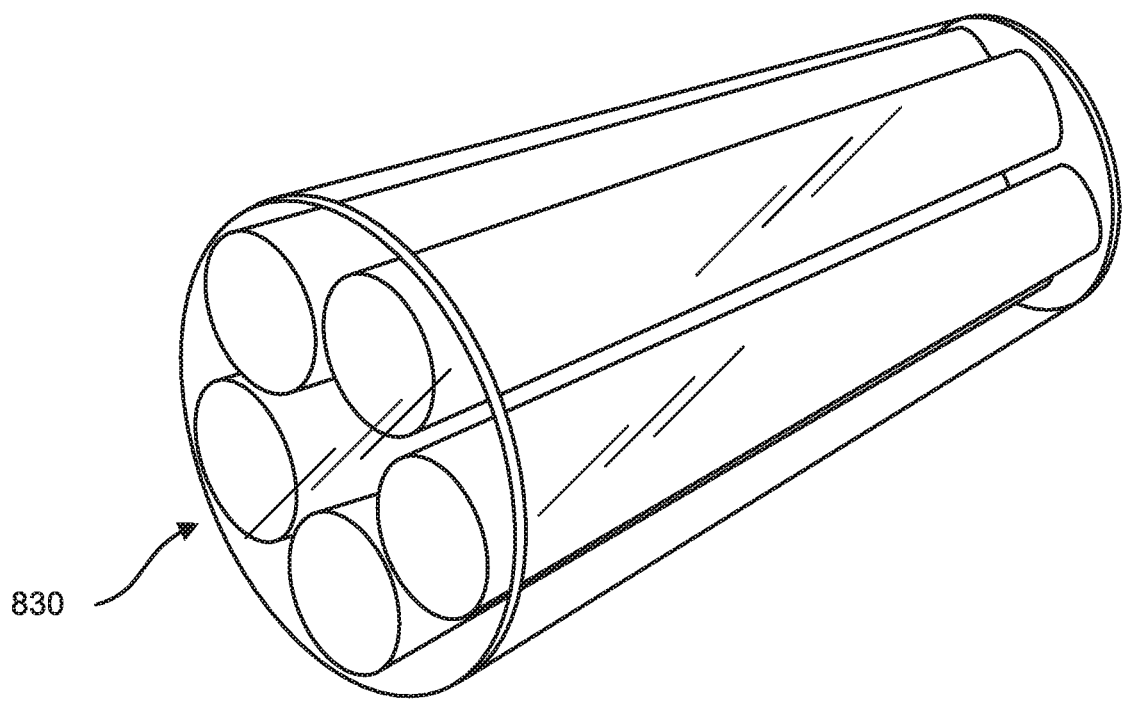
Figure 48:
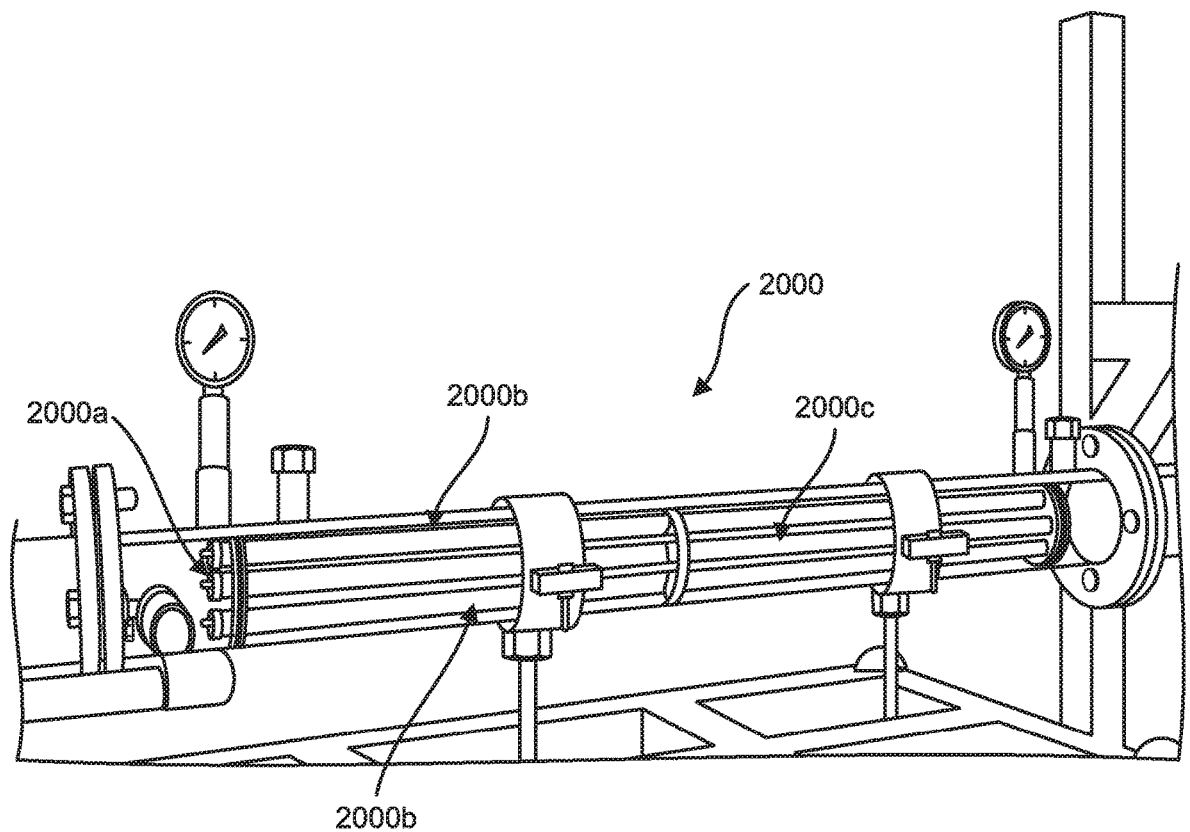

In some implementations, an array of photo-reactors can be used in parallel to scale any process. For example, FIGS. 36-41 illustrate various views of an example array of photo-reactors. Each photo-reactor includes a chamber through which the hydrogen sulfide can pass. Within the chamber is at least one ultraviolet light source for irradiating the hydrogen sulfide and decomposing the hydrogen sulfide into hydrogen and sulfide. In FIG. 36, the array of reactors includes 9 reactors (3×3 array) that can divide an input stream into 9 separate streams and process each stream independently and in parallel. The 9 output streams can be recombined for further processing or can be maintained as separate streams. Other implementations are possible, for example, FIG. 41 illustrates a 5 ultraviolet light chamber. Another exemplary array of photo-reactors is shown in FIG. 48 in which the array of photo-reactors 2000 includes 4 photo-reactors 2000a, 2000b, 2000c, and 2000d.

Another example system or apparatus according to the current subject matter can include an electronic module, lamp module, microwave module, reactor module, sensor module, extraction module, mounting structure, pipes/fittings, control module, blower module, separator/recovery module, and a safety module. The electronic module can include a microcontroller and a power controller. The lamp module can include an electrode less lamp and a lamp mounting. The microwave module can include a magnetron, power unit, and a wave guide. The reactor module can include a continuously stirred reactor (CSTR), mounting, sensor's ports (thermal, pressure, flow, UV, $H_2$ sensor, $H_2S$ sensor, multi-gas sensors, and the like), and wiring harnesses/conduits. The sensor module can include temperature, pressure, UV, flow, valve/actuator position, and gas sensors ($H_2$, $CH_4$, $CO_2$ and the like). The extraction module can include a cyclone, cooling coil, thermoelectric coolers, electrodes (e.g., plates) for recovering radicals, and gate/valve actuator. The mounting structure can include a tube, cyclone, microwave module, sensor module, electronic module, frame and (angles, channels, beams, and the like). Piping and fittings can include pipes, elbows, reducers, tees, plugs, and valves. Command and control module can include a computer and data acquisition board. Safety module can include safety (pressure) relief system, hydrogen control system, environmental monitoring system, and accidental UV exposure protection system. Blower module can include type: centrifugal; screw and the like; capacity (size): flow rates in CFM, discharge pressures, and controls. Separators and recovery module can include $CO_2$ liquefaction system for recovering $CO_2$ and other gases from the feed, hydrogen processing system, $CO_2$ processing system, and sulfur processing system.

In some embodiments, the present systems can include at least two chambers coupled and in fluid communication therewith. The first chamber can be configured to receive and thermally excite an input feed that includes at least a portion of hydrogen sulfide. The second chamber can be configured to receive the thermally excited feed, to decompose the hydrogen sulfide within the feed such that hydrogen and elemental sulfur result, and to separate the hydrogen and elemental sulfur as well as any other components that may be present in the input feed.

As discussed in more detail below, the first chamber can include a microwave source that can be configured to expose the input feed that is flowing in and through the first chamber to microwave energy. This exposure can increase ability of the hydrogen sulfide to absorb energy, such as UV light, which can enhance the effectiveness of photolytic desulfurization. Further, in some embodiments, the first chamber can be configured to facilitate the formation of a standing wave, which as discussed above, allows the hydrogen sulfide to align itself, thereby increasing its effective cross-sectional area for UV light absorption.

Further, as discussed in more detail below, the second chamber can include a light source, such as a UV light source, that is configured to expose the thermally excited feed to an effective amount of electromagnetic energy that can result in cleavage of the hydrogen-sulfide bonds, and thus the formation of hydrogen and elemental sulfur. While the second chamber can be coupled to a separator to isolate the elemental sulfur, in some implementations, the second chamber can be configured to isolate the elemental sulfur from the remaining feed components present within the second chamber. The second chamber can also be configured to separate the cleaved hydrogen from the remaining feed components.

Figure 4A:
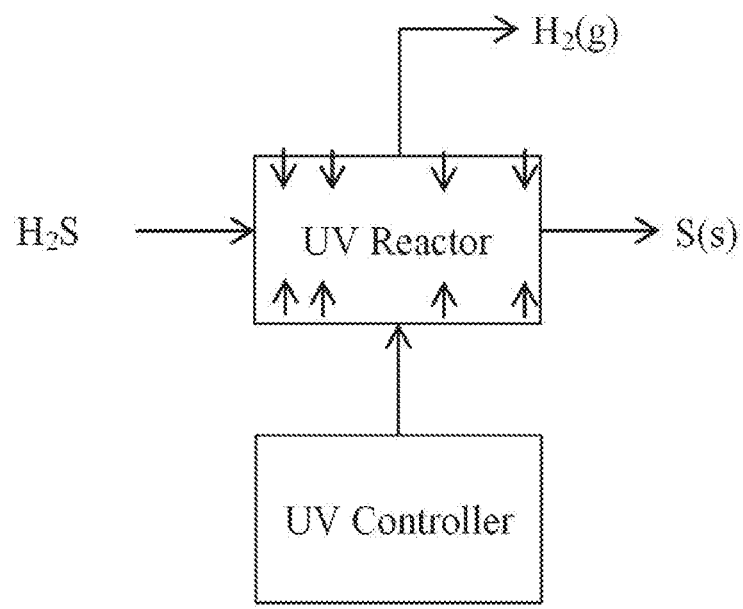
FIG. 4A illustrates an exemplary reactor according to an exemplary embodiment of the present subject matter.
Figure 4B:
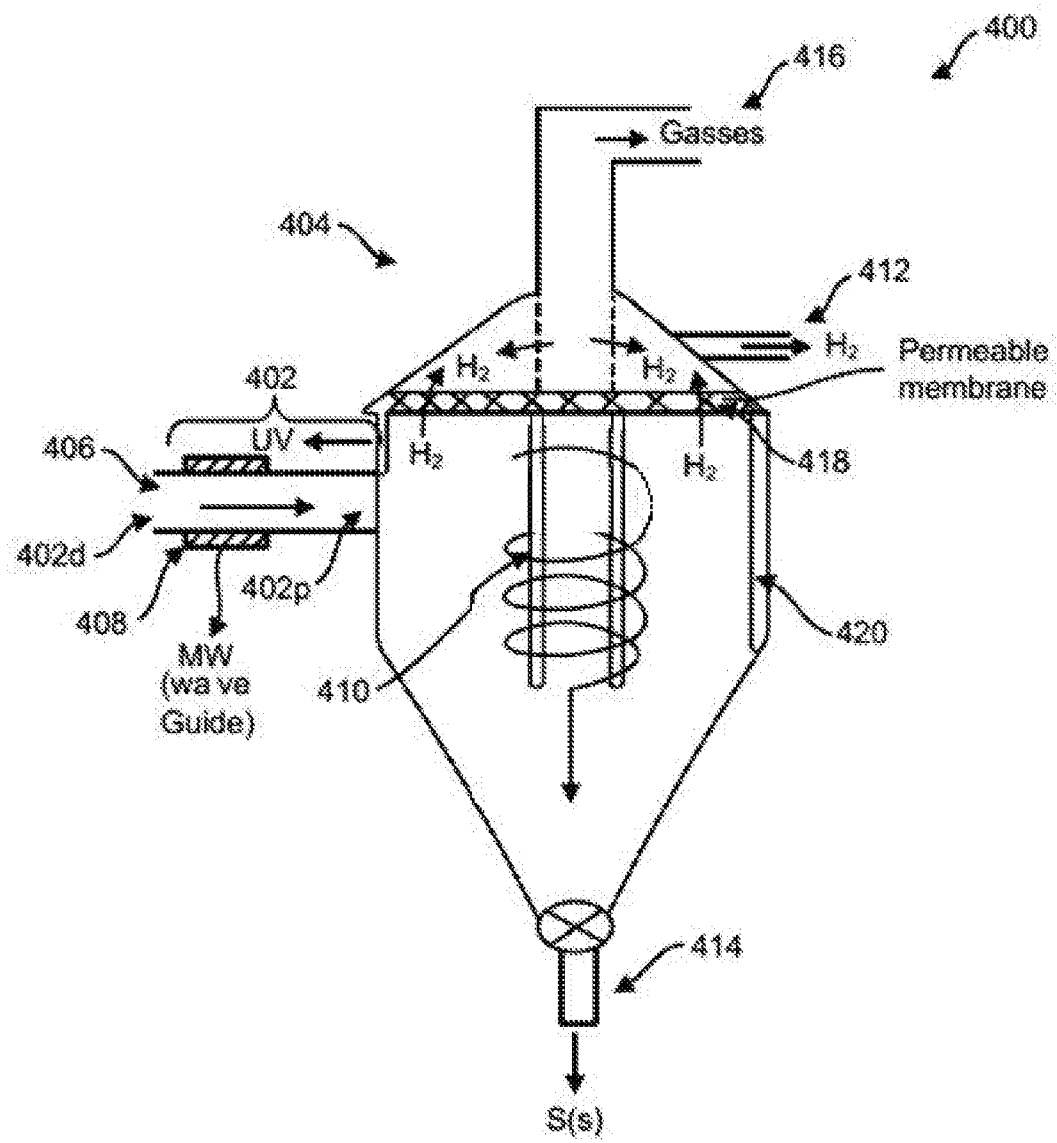
FIG. 4B illustrates an exemplary reactor according to an exemplary embodiment of the present subject matter.

FIG. 4B illustrates an exemplary embodiment of a desulfurization system 400. As shown, the system 400 includes two chambers 402, 404 coupled together and in fluid communication. The first chamber 402 includes an inlet 406 that receives an input feed (not shown). The input feed can be raw or processed feed having a compositional makeup that includes at least hydrogen sulfide. In some embodiments, the input feed can be in the form of a vapor of a gas.

The inlet 406 can supply the input feed at a constant flow rate, which can vary depending on the implementation of the system. The inlet 406 can include a gauge or valve to control the flow rate of the input feed. Alternatively, the flow rate of the input feed can be continuously changed, for example, to decrease, increase, or maintain product yield (e.g., elemental sulfur).

The first chamber 402 can also include a microwave source 408 that is positioned proximate to the inlet 406 (e.g., at a distal end 402d of the first chamber 402). The microwave source 408 emits microwave energy so as to thermally excite the hydrogen sulfide present in the input feed as it flows into and through the first chamber 402. As shown, the first chamber 402 can be elongate and cylindrical along a primary axis (e.g., a tube-like configuration). It is also contemplated herein that the first chamber 402 can have other configurations. Further, it is also contemplated that the first chamber 402 can be a photo-reactor similar to photo reactor 800 shown in FIG. 8 or an array of photo-reactors similar to array 2000 shown in FIG. 48.

The first chamber 402 can include a waveguide that is configured to guide the microwave energy through the first chamber (e.g., from the distal end 402d to the proximate end 402p of the first chamber 402 in which the proximate end 404p). In some embodiments, the waveguide can be formed by a wall of the first chamber 402. In such instances, the first chamber 402 can be formed of a suitably reflective material such as stainless steel. Further, at least a portion of the inner surface of the wall can be coated with a composition in desired areas for reflection. Alternatively, or in addition to, the first chamber 402 can include a separate waveguide (e.g., a waveguide that is not formed by the wall of the first chamber).

It should be noted that in some embodiments, the first chamber can include an array of sub-chambers that are structured similar to first chamber 402 as shown in FIG. 4B. The sub-chambers can be arranged in series or in parallel.

As shown in FIG. 4B, the proximal end 402p of the first chamber 402 couples to the second chamber 404. The second chamber 404 includes a light source 410. As such, the second chamber 404 can function as a photo-reactor. While the light source 410 can be configured to emit various types of light, in some implementations, the light source 410 emits UV light. In one embodiment, the light source 410 radiates UV light having a wavelength range from about 100 nm to about 300 nm, from about 200 nm to about 300 nm, from about 280 nm to about 300 nm, or from about 290 nm to about 300 nm. As shown, the light source 410 can be attached to at least a portion of the inner surface of the second chamber 404. In one embodiment, the light source 410 can be coupled to the entire inner surface. It is contemplated herein that the light source 410 can be positioned at other areas or coupled to a component of the second chamber 404, such as about a vortex finder 1022 in FIG. 42 as described in more detail below.

The radiation time and/or the intensity of light emitted within the second chamber 404 can be suitably adjusted by modifying the parameters of the light source 410. The light source 410 can be suitably selected from a radiating device that can intensify a particular range of wavelengths. An exemplary light source may include LED light, laser, and the like.

In use, as the input feed flows from the first chamber 402 and into the second chamber 404, the UV light emitted by the light source 410 is at least partially absorbed by the hydrogen sulfide. As a result, bond disassociate occurs, thereby producing hydrogen gas and elemental sulfur. While the second chamber 404 can have various shapes, the second chamber 404, as shown in FIG. 4B, takes the form of a cyclone, and therefore, the resulting hydrogen gas is ventilated from the second chamber 404 through a first outlet 412 positioned at a top portion thereof. Further, the resulting elemental sulfur exits the second chamber 404 through a second outlet 414 positioned at a bottom portion thereof. In addition, the remaining components of the feed present within the second chamber 404 can ventilate with the hydrogen gas through the first outlet 412 or with the elemental sulfur through second outlet 414. Alternatively, or in addition to, the remaining components can ventilate from the second chamber 404 through a third outlet 416. Any outlet of the second chamber 404 can include a gauge or valve to control the exit rate of the respective component(s).

Further, as shown in FIG. 4B, the second chamber 404 can include a gas permeable membrane 418 (e.g., a proton exchange membrane) that can be configured to separate the hydrogen gas from the remaining components of the feed and/or the elemental sulfur. As shown, the gas permeable membrane 418 substantially separates the hydrogen gas such that the hydrogen gas can ventilate through the first outlet 412 and the remaining feed component(s) can ventilate through the third outlet 416. Further, in some implementations where a reactant gas is present within the second chamber 404, the gas permeable membrane 418 can also be configured to separate the hydrogen gas from the reactant gas. In some embodiments, the gas permeable membrane 418 can include a catalyst.

As shown in FIG. 4B, the second chamber 404 can include a cooling element 420. The cooling element 420 can be configured to control or change the temperature of the elemental sulfur, for example, decrease the temperature to thereby particulate the elemental sulfur. As shown, the cooling element 420 can be can be coupled to the inner surface of the second chamber 404. In other embodiments, the cooling element 420 can be incorporated within, or coupled to the outer surface of, the wall of the second chamber 404 so as to form a jacketed second chamber. In another embodiment, the second chamber can be connected to a cooling device (e.g., heat exchanger). Non-limiting examples of suitable cooling elements include air, water, and the like of suitable temperature.

Further, the second chamber 404 can include or be connected to a heating device. The heating device can be configured to control the reaction temperature at the beginning of the decomposing reaction or during the decomposing reaction. Non-limiting examples of suitable heating devices include a flame, an electric furnace, a hot plate, and an air stream. Alternatively, or in addition to, a heating element can be incorporated within, or coupled to the outer surface of, a wall of the second chamber 404. Non-limiting examples of suitable heating elements include air, water, and the like of suitable temperature.

In some embodiments, the system 400 can include a controller or can be in wired or wireless communication with a controller. The controller refers to a hardware device that may include a memory and a processor. The memory is configured to store the modules and the processor is specifically configured to execute said modules to perform one or more processes. The control logic of the present subject matter may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN). The controller can be suitably connected to at least one component of the system, for example, the inlet, the outlets, the first chamber, the second chamber, the microwave source, and the light source, and control the reaction (decomposition condition). The controller may have a controlling algorithm that can suitably adjust conditions of the system.

FIGS. 42-47 illustrate another exemplary embodiment of a desulfurization system 1000. Aside from the differences described in detail below, the system 1000 can be similar to system 400 shown in FIG. 4B and is therefore not described in detail herein. Further, for purposes of simplicity, certain components of the system 1000 are not illustrated in FIGS. 42-47.

Figure 42:
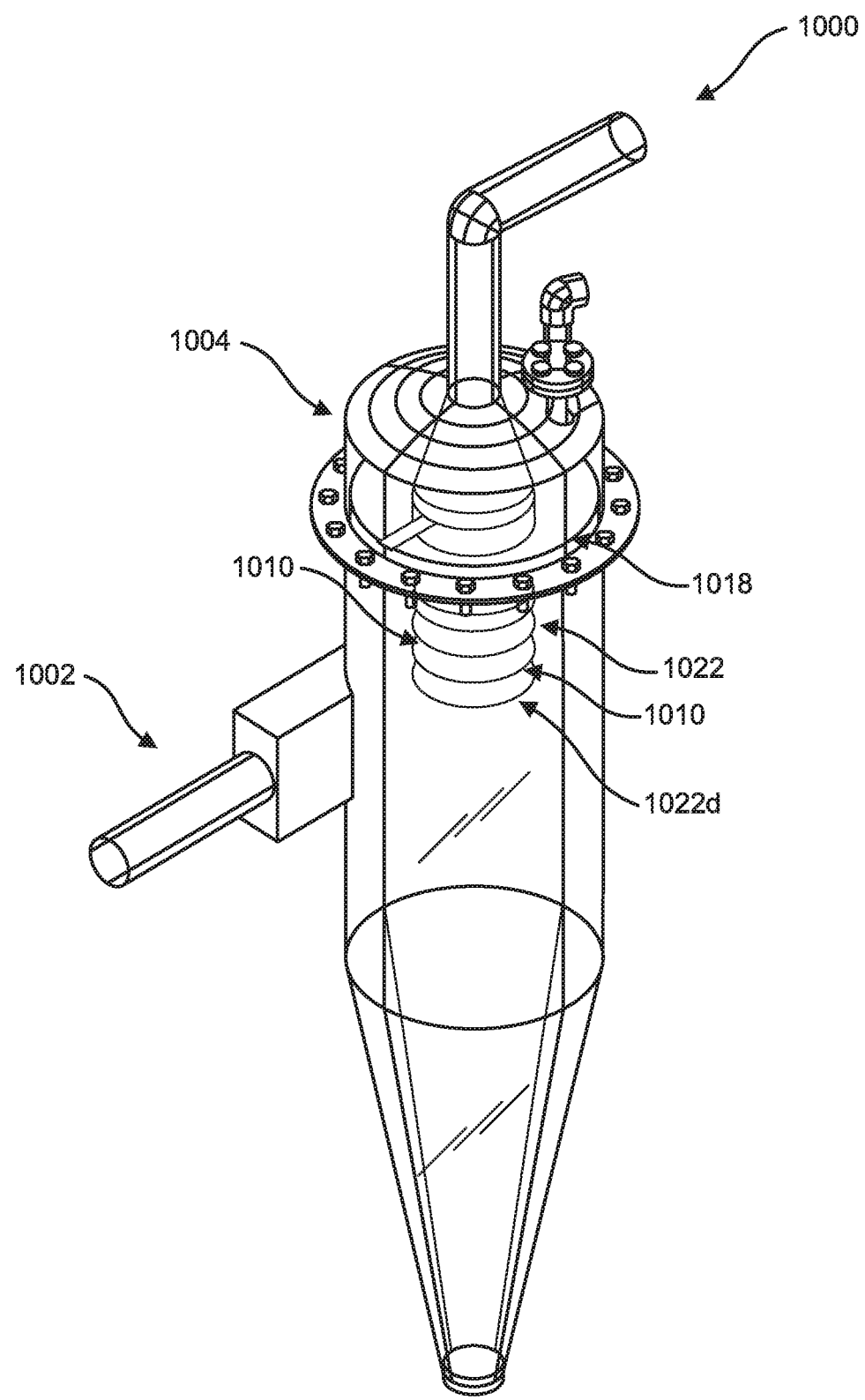
FIGS. 42-48 illustrate various views of exemplary reactors according to exemplary embodiments of the present subject matter.
Figure 43:
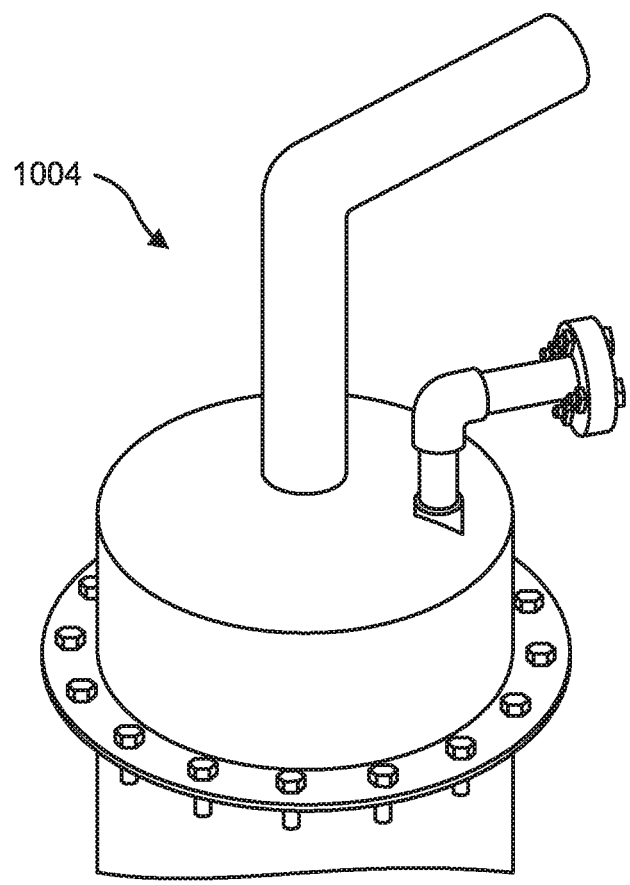
Figure 44:
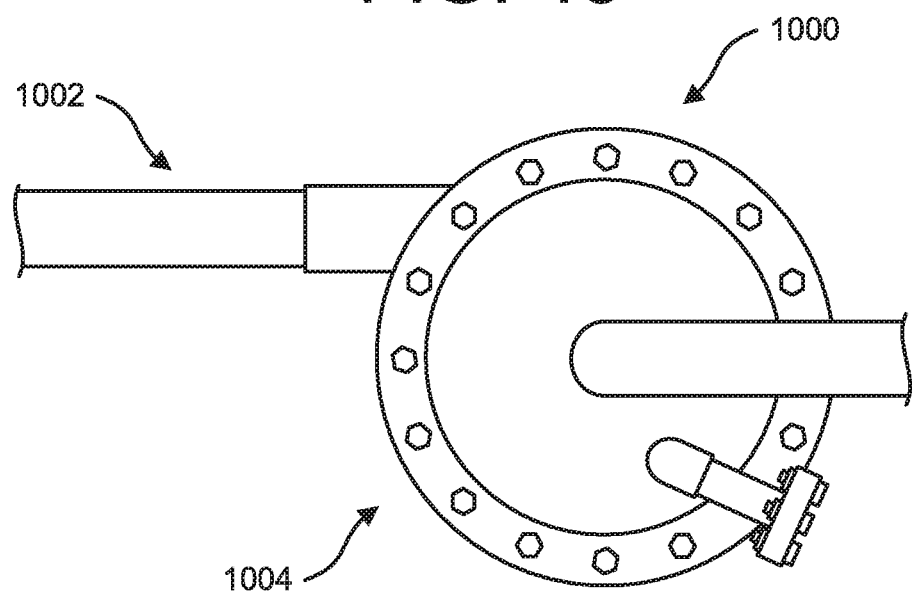
Figure 45:
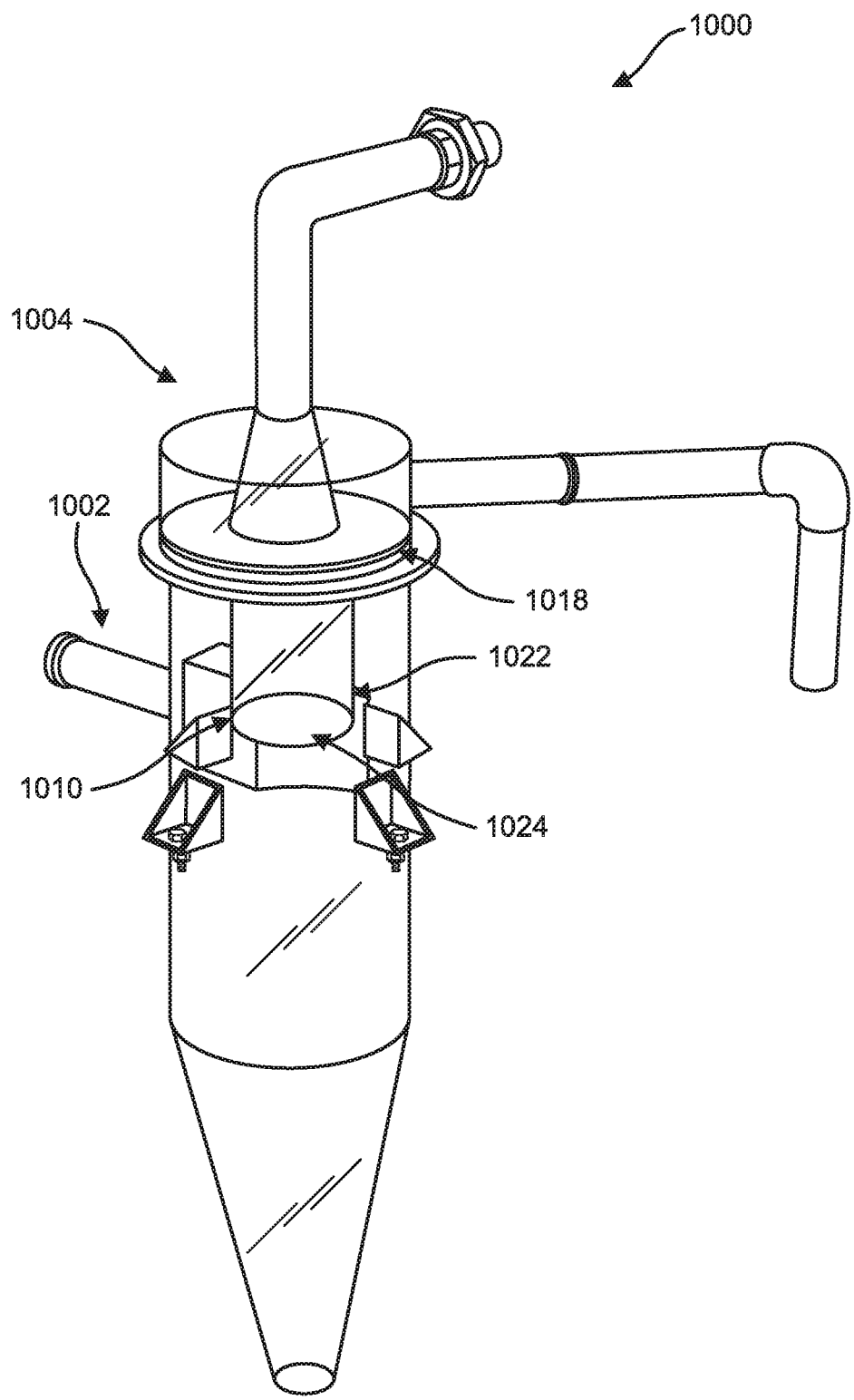
Figure 46:
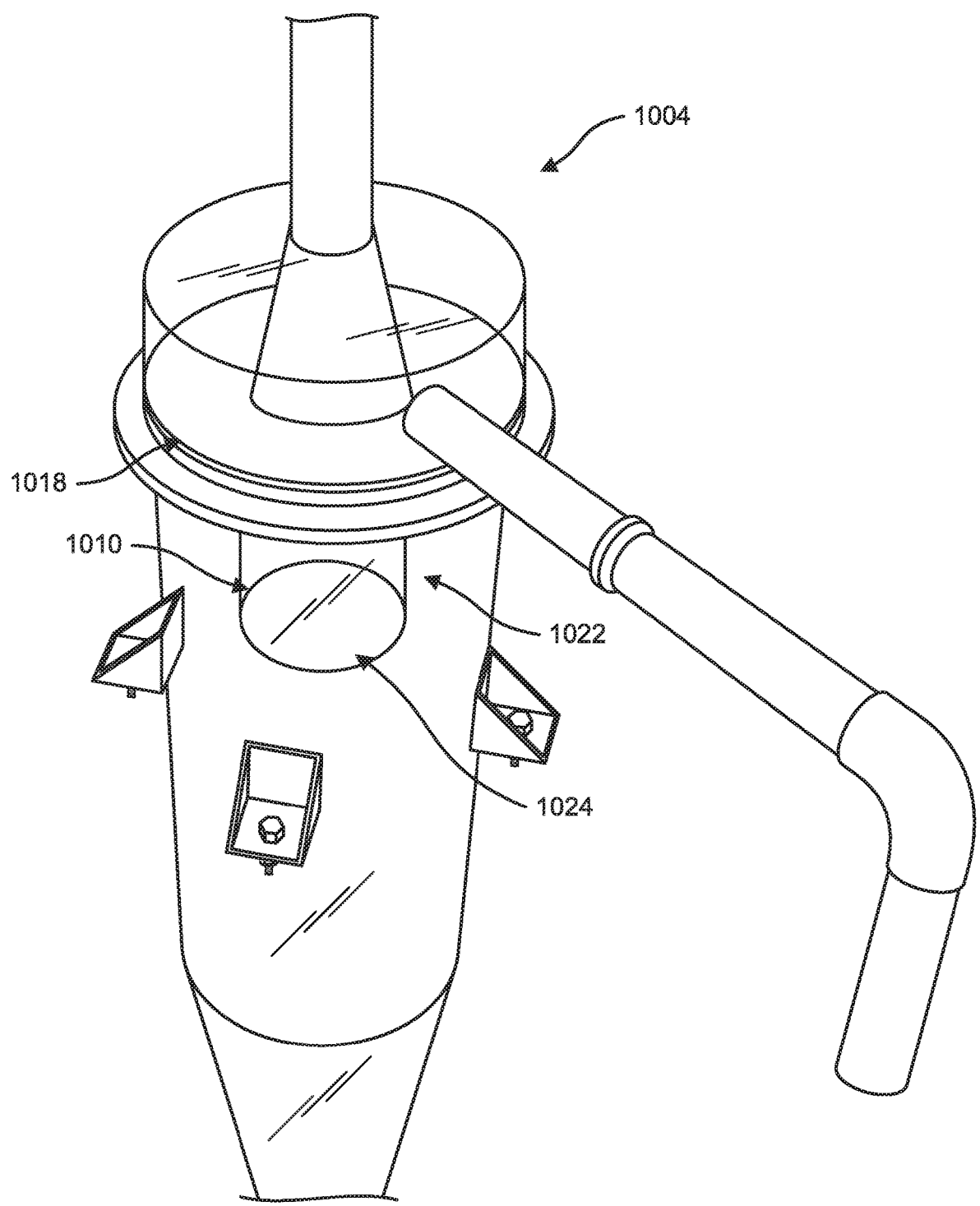
Figure 47:
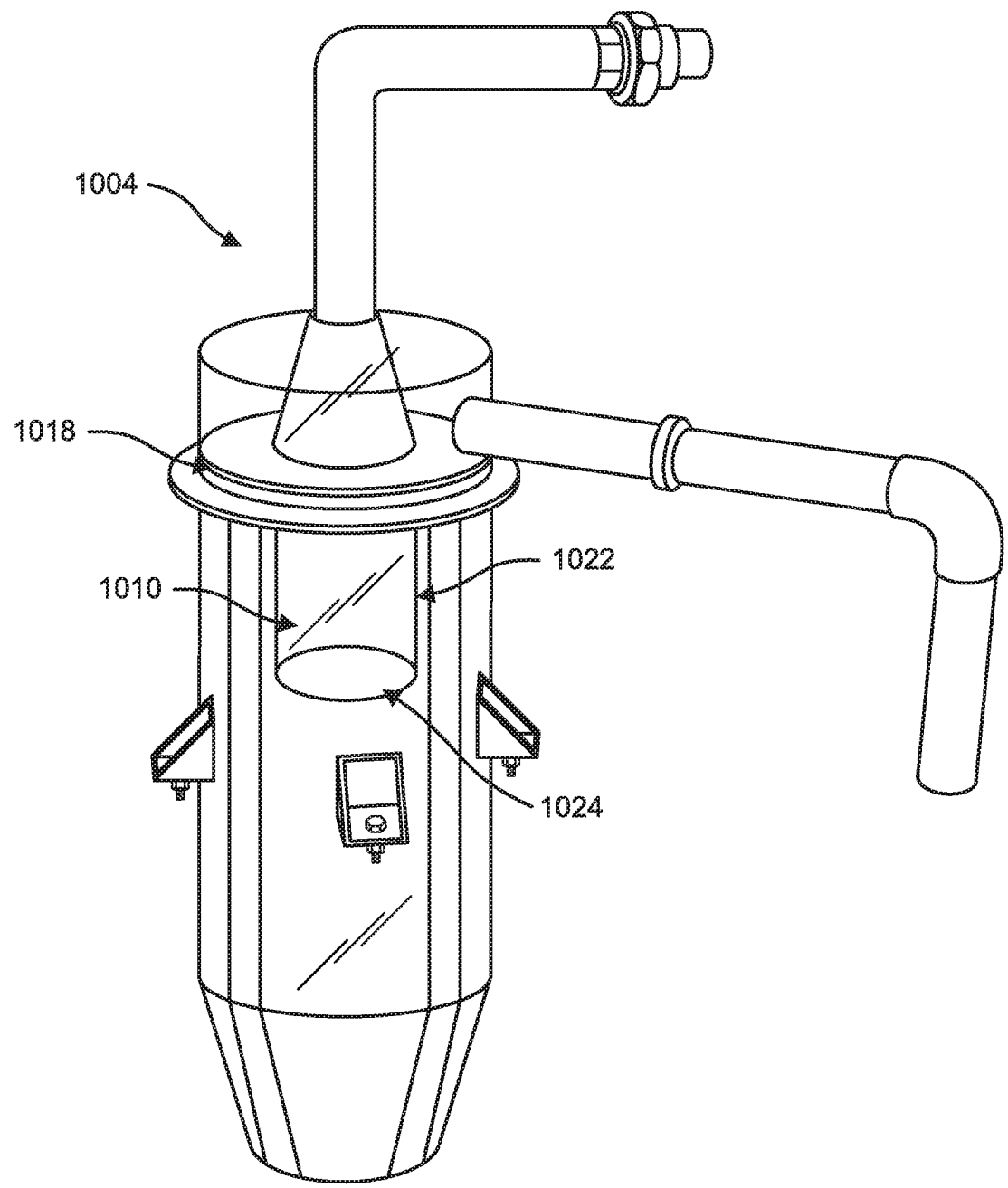

As shown in FIGS. 42 and 44-45, the system 1000 includes a first chamber 1002 and a second chamber 1004 coupled thereto. The first chamber 1002 can be a photo-reactor, like photo-reactor 800 shown in FIG. 8, or an array of photo-reactors, like array 2000 shown in FIG. 48. In some embodiments, the first chamber 1002 is directly coupled to the second chamber, as shown in FIGS. 42 and 44-45. In other embodiments, additional chambers or other components could be positioned between the first and second chambers 1002, 1004.

As shown in FIG. 42, the second chamber can include a light source 1010 positioned about a vortex finder 1022 in the second chamber 1004. While the light source 1010 can have a variety of configurations, as shown in FIGS. 42 and 45-47, the light source 1010 has a helical configuration that is wrapped about the outer surface of the vortex finder 1022. In use, a microwave source (not shown) can radiate the microwave energy into the second chamber 1004 such that the microwave energy contacts the light source 1010. In some embodiments, the light source 1010 can include an internal gas that generates ultraviolet light upon contact with the microwave energy.

Further, as shown in FIGS. 42 and 45-47, the second chamber 1004 includes two gas permeable membranes 1018, like gas permeable membrane 418 shown in FIG. 4B, and a second gas permeable membrane 1024. The second gas permeable membrane is positioned at the distal end 1022d of the vortex finder 1022. The second gas permeable membrane 1024 (e.g., a proton exchange membrane) can be configured similar to gas permeable membrane 418 and therefore is not discussed in detail herein.

The present subject matter can include a refinery system that includes the desulfurization system as described herein. The present subject matter can include a desulfurization system that includes the reactor as described herein. In particular, the desulfurization system may include a recyclization unit for introducing the hydrogen gas produced from the reactor into another stage of a fuel processing system that utilizes hydrogen as an input.

A first experiment was conducted to confirm the presence of sulfur and sulfur was extracted from hydrogen sulfide.

Figure 5:
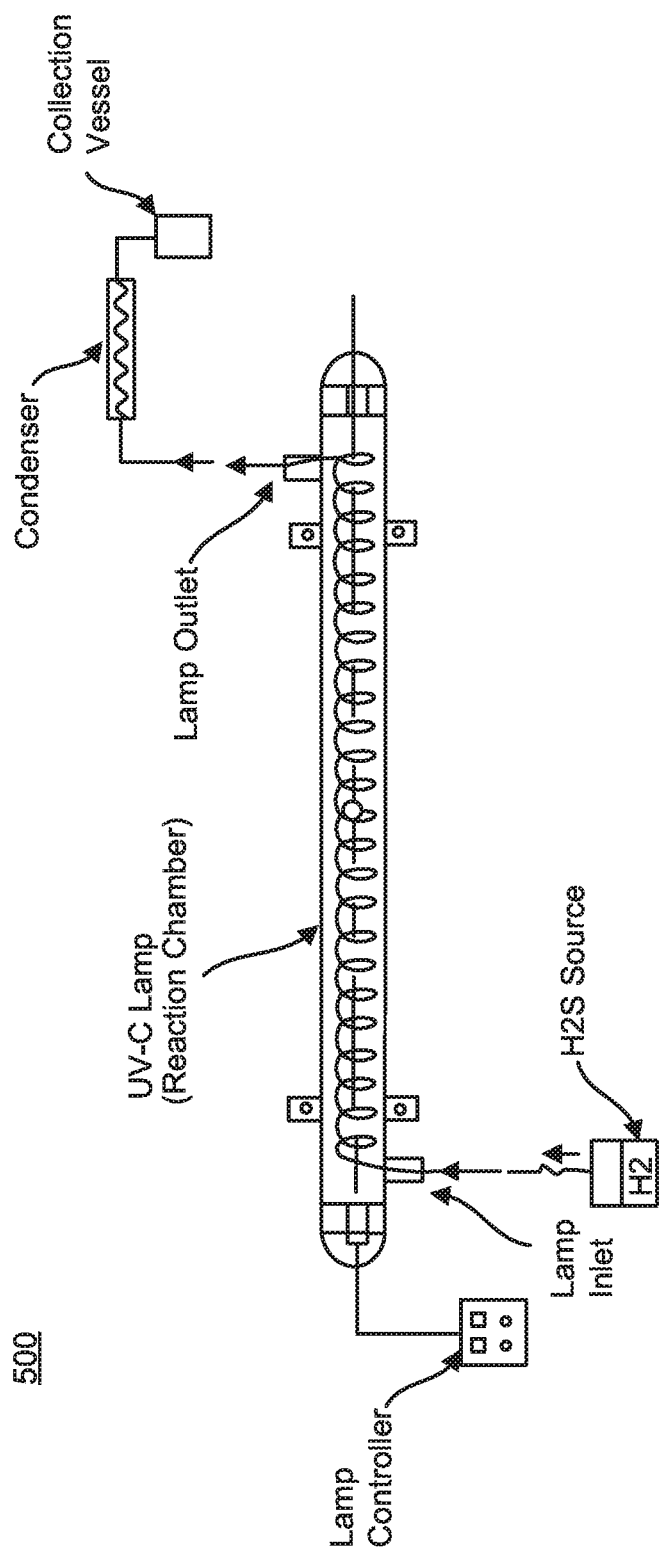
FIG. 5 is a block diagram illustrating an example.
Figure 6:
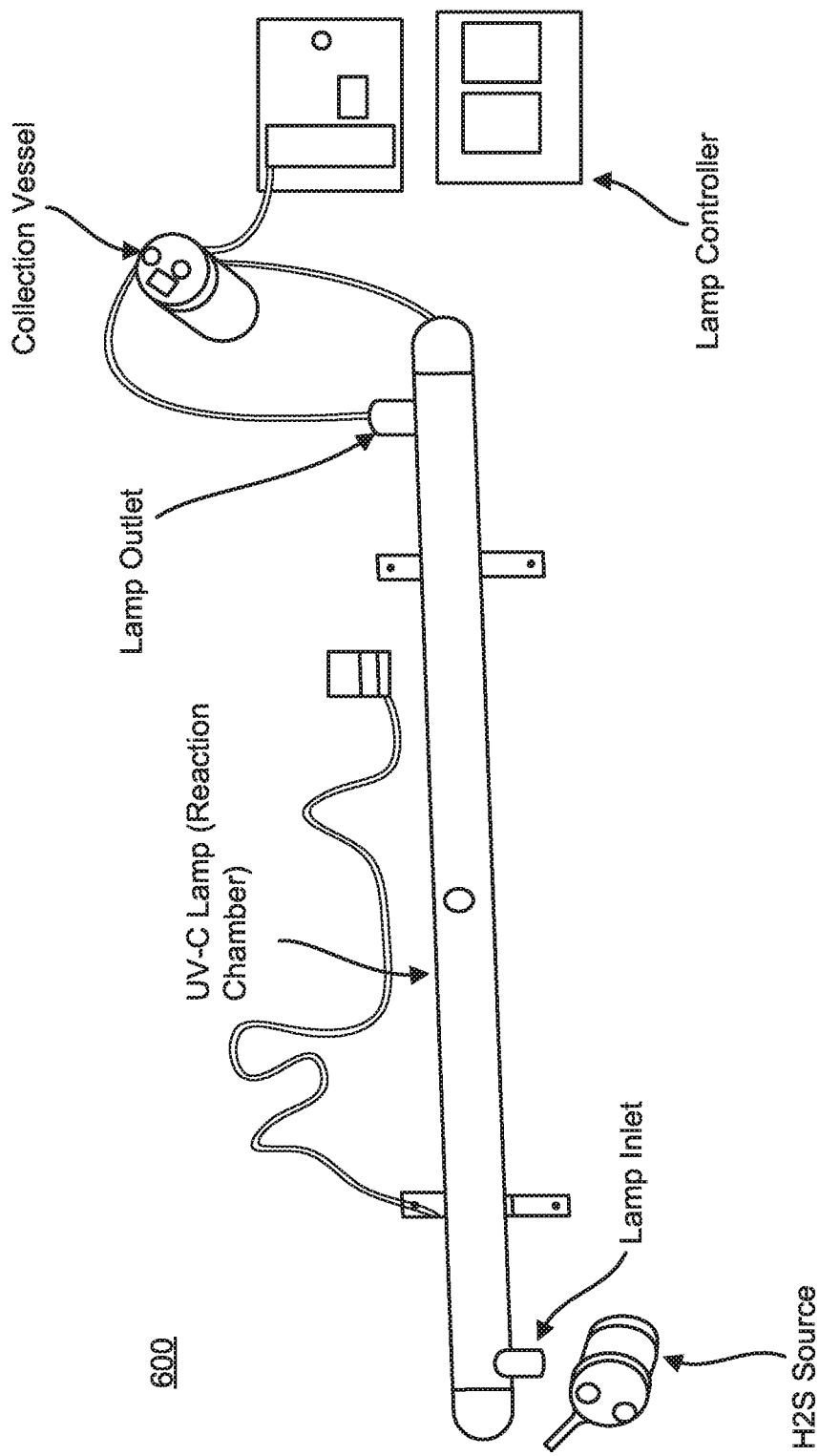
FIGS. 6 and 7 illustrate photographs of the example.
Figure 7:
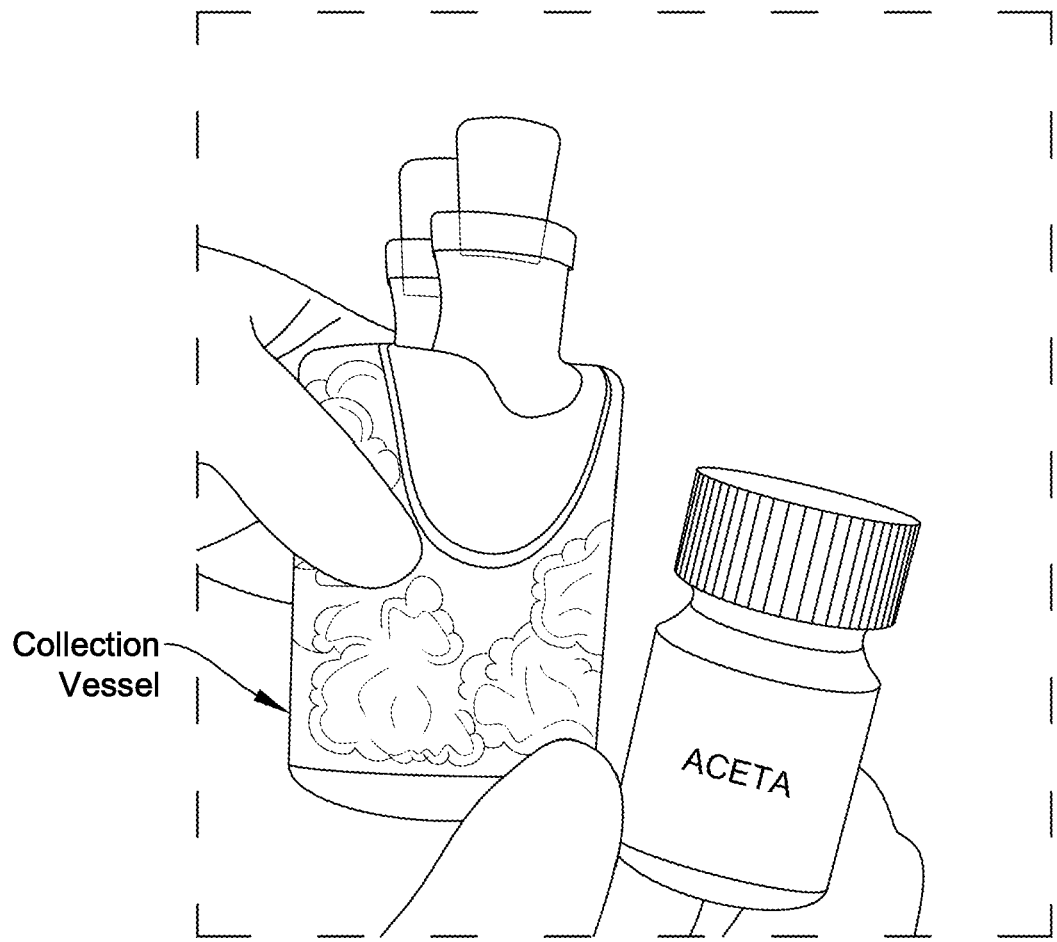

FIG. 5 is a block diagram illustrating test-setup 500 and FIGS. 6 and 7 illustrate photographs of the test-setup. The test-setup included a hydrogen sulfide source arranged to introduce hydrogen sulfide into an inlet of a reaction chamber including a UV-C lamp. The UV-C lamp (mercury based) is capable of irradiating gasses internal to the reaction chamber. An outlet of the UV-C lamp (reaction chamber) is connected to a collection vessel containing water. The reaction chamber was of approximately 115 cm in length. The UV-C lamp was driven at 234 volts and 0.002 Amps.

At 1 atm and a starting temperature of the reaction chamber of 27 degrees Celsius. Hydrogen sulfide was introduced into the lamp using sodium sulfide and hydrochloric acid. The output of the UV-C lamp was bubbled through pure water ($H_2O$) in the collection vessel. The hydrogen sulfide was allowed to flow through the UV lamp for 15 minutes. As illustrated in FIG. 7, left, the $H_2O$ contained in the collection vessel turned milky, indicating sulfur was present in the output stream of the reaction chamber. After 15 minutes, the reaction chamber temperature was 35 degrees Celsius.

Although a few variations have been described in detail above, other modifications or additions are possible. For example, an ultraviolet light reactor can be used for disinfection, for cleaving bonds of material other than hydrogen sulfide (e.g., other binary and tertiary molecules with appropriate bond disassociation energies).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   providing hydrogen sulfide into a first chamber adjacent a second chamber;
   contacting the hydrogen sulfide with microwave energy within the first chamber, the microwave energy generated by a microwave source;
   providing the hydrogen sulfide to the second chamber, the second chamber including an outlet and a waveguide, wherein an ultraviolet light source resides within the waveguide of the second chamber;
   contacting the hydrogen sulfide with ultraviolet light within the second chamber, the ultraviolet light generated by the ultraviolet light source, wherein contacting of the hydrogen sulfide with the ultraviolet light results in hydrogen gas and sulfur; and
   separating at least a portion of the hydrogen gas from the sulfur using a gas permeable membrane to allow the separated hydrogen gas to ventilate through the outlet of the second chamber, wherein the gas permeable membrane resides within the second chamber.

2. The method of claim 1, wherein the microwave source is further configured to radiate the microwave energy into the waveguide of the second chamber such that the microwave energy contacts the ultraviolet light source, the ultraviolet light source including an internal gas that generates the ultraviolet light upon contact with the microwave energy.

3. The method of claim 1, wherein the waveguide includes an end configured such that the microwave energy forms a standing wave within the waveguide.

4. The method of claim 1, wherein the second chamber further includes:
   a first electrode configured to have a negative charge; and
   a second electrode configured to have a positive charge, the first electrode and the second electrode being external to the ultraviolet light source and internal to the waveguide.

5. The method of claim 1, wherein the hydrogen sulfide is provided to a plurality of tube assemblies adjacent the first chamber, each of the plurality of tube assemblies including a tube assembly outlet, a plurality of ultraviolet light sources each residing within a respective one of the plurality of tube assemblies,
   wherein the microwave source is configured to radiate the microwave energy into the first chamber and into the plurality of tube assemblies such that the microwave energy contacts the plurality of ultraviolet light sources, the plurality of ultraviolet light sources including the internal gas that generates ultraviolet light upon contact with the microwave energy.

6. The method of claim 1, further comprising:
   separating, using a gas-solid separator, the sulfur from the hydrogen gas.

7. The method of claim 1, wherein the ultraviolet light source radiates the ultraviolet light having a wavelength that ranges from about 280 nm to 300 nm.

8. The method of claim 1, wherein the second chamber is elongate and extends along a primary axis, the ultraviolet light source is elongate along the primary axis and resides within the second chamber along the primary axis, wherein the second chamber further includes:
   a first electrode configured to have a negative charge; and
   a second electrode configured to have a positive charge, the first electrode and the second electrode being external to the ultraviolet light source and internal to the waveguide;
   wherein the first electrode is elongate along the primary axis and is arranged above the ultraviolet light source and the second electrode is elongate along the primary axis and is arranged below the ultraviolet light source.

9. The method of claim 1, wherein a temperature for decomposing the hydrogen sulfide is performed at a temperature range of about 0 to 125 degrees Celsius.

10. The method of claim 1, wherein the hydrogen sulfide is provided into the first chamber at a pressure of about 0.1 to 10 atm.

11. The method of claim 1, wherein the ultraviolet light and the microwave energy is contacted with the hydrogen sulfide for about 0.01 seconds to 15 minutes.

12. The method of claim 1, further comprising collecting the hydrogen sulfide from natural gas or processing petroleum oil to generate the hydrogen sulfide.

13. The method of claim 1, wherein the second chamber forms a hydrocyclone.

14. The method of claim 13, wherein the ultraviolet light source resides on a vortex finder located within the hydrocyclone.

* * * * *